US012420869B2

(12) United States Patent
Odhekar et al.

(10) Patent No.: US 12,420,869 B2
(45) Date of Patent: Sep. 23, 2025

(54) METHOD TO REDUCED LATERAL DEFLECTION OF LONGITUDINAL MEMBERS IN SIDE IMPACT

(71) Applicant: Canoo Technologies Inc., Torrance, CA (US)

(72) Inventors: Digvijay Odhekar, Torrance, CA (US); Balasaheb Budhekar, Torrance, CA (US); William J. Rohr, Torrance, CA (US); Kurtis Ray Horner, Rancho Palos Verdes, CA (US); Sangjoon Han, Fullerton, CA (US); Vidyadhar Katkar, San Pedro, CA (US)

(73) Assignee: CANOO TECHNOLOGIES INC., Torrence, CA (US)

( * ) Notice: Subject to any disclaimer, the term of this patent is extended or adjusted under 35 U.S.C. 154(b) by 280 days.

(21) Appl. No.: 18/061,297

(22) Filed: Dec. 2, 2022

(65) Prior Publication Data
US 2023/0102921 A1   Mar. 30, 2023

Related U.S. Application Data

(63) Continuation-in-part of application No. 17/646,656, filed on Dec. 30, 2021, now Pat. No. 12,168,475, (Continued)

(51) Int. Cl.
*B62D 25/02* (2006.01)
*B60K 1/02* (2006.01)
(Continued)

(52) U.S. Cl.
CPC ......... *B62D 21/157* (2013.01); *B62D 25/025* (2013.01); *B62D 27/023* (2013.01);
(Continued)

(58) Field of Classification Search
CPC .. B62D 25/025; B62D 25/20; B62D 25/2036; B62D 27/023; B62D 21/157; B60K 1/00; B60K 2001/0438
(Continued)

(56) References Cited

U.S. PATENT DOCUMENTS 1,526,481 A   2/1925   Krieger
2,467,516 A   4/1949   Almdale
(Continued)

FOREIGN PATENT DOCUMENTS

AU   2002323246 A1   3/2003
AU   2002332561 A1   3/2003
(Continued)

OTHER PUBLICATIONS

Notification of the First Office Action dated Dec. 7, 2023, in connection with Chinese Application No. 202080079746.X, 16 pages.
(Continued)

*Primary Examiner* — Dennis H Pedder
(74) *Attorney, Agent, or Firm* — ALLEN, DYER, DOPPELT, + GILCHRIST, P.A.

(57) ABSTRACT

A support plate and reinforcement member may be mounted within a hollow side sill between a rocker and crossmembers for a vehicle framework. The support plate may include flanges along either edge and a straight, projecting face between the flanges. The reinforcement member, mounted on the support plate proximate to an outer surface of the side sill, may include flanges along either edge and a wavy projecting face between the flanges. Contact portions of the projecting face for the reinforcement member may contact an interior of the side sill at regions aligned with where the side sill mounts to the crossmembers, with intervening portions of the projecting face, in areas adjacent energy
(Continued)

absorbing crush cans, extending less far from the flanges. The intervening portions may also be laterally offset from the contact portions, to provide larger weld areas.

20 Claims, 37 Drawing Sheets

Related U.S. Application Data which is a continuation of application No. 16/920,375, filed on Jul. 2, 2020, now Pat. No. 11,318,995.

(60) Provisional application No. 62/869,823, filed on Jul. 2, 2019.

(51) Int. Cl.
  *B62D 21/15*   (2006.01)
  *B62D 27/02*   (2006.01)
  *B62D 27/06*   (2006.01)
  *B60K 1/04*    (2019.01)

(52) U.S. Cl.
  CPC .............. *B62D 27/065* (2013.01); *B60K 1/02* (2013.01); *B60K 2001/0438* (2013.01)

(58) Field of Classification Search
  USPC .................... 296/209, 204, 187.12, 29, 30
  See application file for complete search history.

(56) References Cited

U.S. PATENT DOCUMENTS

| | | |
|---|---|---|
| 2,673,512 A | 3/1954 | Henney |
| 2,873,994 A | 2/1959 | Omps |
| 3,170,682 A | 2/1965 | Eggers |
| 3,429,566 A | 2/1969 | Rosendale |
| 3,951,450 A | 4/1976 | Gambotti |
| 4,148,505 A | 4/1979 | Jensen et al. |
| 4,307,865 A | 12/1981 | MacCready |
| 4,458,918 A | 7/1984 | Rumpel |
| 4,460,215 A | 7/1984 | Chamberlain et al. |
| 4,527,828 A | 7/1985 | Groce et al. |
| 4,541,654 A | 9/1985 | Jonasson |
| 4,557,500 A | 12/1985 | Collard et al. |
| 4,619,466 A | 10/1986 | Schaible et al. |
| 4,779,917 A | 10/1988 | Campbell et al. |
| 4,799,632 A | 1/1989 | Baymak et al. |
| 4,887,841 A | 12/1989 | Cowburn et al. |
| 5,015,545 A | 5/1991 | Brooks |
| 5,039,124 A | 8/1991 | Widmer |
| 5,069,306 A | 12/1991 | Inoue et al. |
| 5,141,209 A | 8/1992 | Sano et al. |
| 5,501,289 A | 3/1996 | Nishikawa et al. |
| 5,807,205 A | 9/1998 | Odaka et al. |
| 5,827,149 A | 10/1998 | Sponable |
| 6,029,987 A | 2/2000 | Hoffman et al. |
| 6,299,210 B1 | 10/2001 | Ruehl et al. |
| 6,488,791 B1 | 12/2002 | Powers, II |
| 6,512,347 B1 | 1/2003 | Hellmann et al. |
| 6,672,662 B1 | 1/2004 | Balk |
| 6,688,586 B1 | 2/2004 | Moore |
| 6,705,668 B1 | 3/2004 | Makita et al. |
| 6,710,916 B1 | 3/2004 | Bolshtyansky |
| 6,712,164 B2 | 3/2004 | Chernoff et al. |
| 6,726,438 B2 | 4/2004 | Chernoff et al. |
| 6,733,040 B1 | 5/2004 | Simboli |
| 6,766,873 B2 | 7/2004 | Chernoff et al. |
| 6,768,932 B2 | 7/2004 | Claypole et al. |
| 6,811,169 B2 | 11/2004 | Schroeder et al. |
| 6,830,117 B2 | 12/2004 | Chernoff et al. |
| 6,836,943 B2 | 1/2005 | Chernoff et al. |
| 6,843,336 B2 | 1/2005 | Chernoff et al. |
| 6,845,839 B2 | 1/2005 | Chernoff et al. |
| 6,857,498 B2 | 2/2005 | Vitale et al. |
| 6,880,856 B2 | 4/2005 | Chernoff et al. |
| 6,889,785 B2 | 5/2005 | Chernoff et al. |
| 6,899,194 B2 | 5/2005 | Chernoff et al. |
| 6,905,138 B2 | 6/2005 | Borroni-Bird et al. |
| 6,923,281 B2 | 8/2005 | Chernoff et al. |
| 6,923,282 B2 | 8/2005 | Chernoff et al. |
| 6,935,449 B2 | 8/2005 | Chernoff et al. |
| 6,935,658 B2 | 8/2005 | Chernoff et al. |
| 6,938,712 B2 | 9/2005 | Chernoff et al. |
| 6,948,226 B2 | 9/2005 | Chernoff et al. |
| 6,959,475 B2 | 11/2005 | Chernoff et al. |
| 6,968,918 B2 | 11/2005 | Chernoff et al. |
| 6,976,307 B2 | 12/2005 | Chernoff et al. |
| 6,986,401 B2 | 1/2006 | Chernoff et al. |
| 6,991,060 B2 | 1/2006 | Chernoff et al. |
| 7,000,318 B2 | 2/2006 | Chernoff et al. |
| 7,004,502 B2 | 2/2006 | Borroni-Bird et al. |
| 7,025,409 B2 | 4/2006 | Riley et al. |
| 7,028,791 B2 | 4/2006 | Chernoff et al. |
| 7,029,017 B2 | 4/2006 | Zandbergen et al. |
| 7,036,848 B2 | 5/2006 | Chernoff et al. |
| 7,083,016 B2 | 8/2006 | Chernoff et al. |
| 7,096,986 B2 | 8/2006 | Borroni-Bird et al. |
| 7,104,581 B2 | 9/2006 | Chernoff et al. |
| 7,111,900 B2 | 9/2006 | Chernoff et al. |
| 7,213,673 B2 | 5/2007 | Shabana et al. |
| 7,237,829 B2 | 7/2007 | Latimer, III et al. |
| 7,275,609 B2 | 10/2007 | Chernoff et al. |
| 7,281,600 B2 | 10/2007 | Chernoff et al. |
| 7,292,992 B2 | 11/2007 | Chernoff et al. |
| 7,303,033 B2 | 12/2007 | Chernoff et al. |
| 7,303,211 B2 | 12/2007 | Borroni-Bird et al. |
| 7,360,816 B2 | 4/2008 | Chernoff et al. |
| 7,370,886 B2 | 5/2008 | Luttinen et al. |
| 7,373,315 B2 | 5/2008 | Chernoff et al. |
| 7,398,846 B2 | 7/2008 | Young et al. |
| 7,441,615 B2 | 10/2008 | Borroni-Bird et al. |
| 7,469,956 B2 | 12/2008 | Yasuhara et al. |
| 7,520,355 B2 | 4/2009 | Chaney |
| 7,597,169 B2 | 10/2009 | Borroni-Bird et al. |
| 7,681,943 B2 | 3/2010 | Murata et al. |
| 7,753,428 B2 | 7/2010 | Kato et al. |
| 7,936,113 B2 | 5/2011 | Namuduri et al. |
| 8,143,766 B2 | 3/2012 | Namuduri et al. |
| 8,253,281 B2 | 8/2012 | Namuduri et al. |
| 8,308,148 B2 | 11/2012 | Shand |
| 8,448,696 B2 | 5/2013 | Johnston et al. |
| 8,484,930 B2 | 7/2013 | Ruehl |
| 8,485,543 B2 | 7/2013 | Richardson et al. |
| 8,556,282 B2 | 10/2013 | Pollmeyer et al. |
| 8,640,806 B2 | 2/2014 | Worup et al. |
| 8,708,392 B2 | 4/2014 | Otsuka et al. |
| 8,757,719 B2 | 6/2014 | Hayakawa |
| 8,881,883 B2 | 11/2014 | Barton et al. |
| 8,936,265 B2 | 1/2015 | Ehrlich et al. |
| 8,940,425 B2 | 1/2015 | Toepfer |
| 8,998,296 B2 | 4/2015 | Eipper |
| 9,162,546 B2 | 10/2015 | Girelli Consolaro et al. |
| 9,457,746 B1 | 10/2016 | Baccouche et al. |
| 9,566,840 B2 | 2/2017 | Seethaler et al. |
| 9,580,176 B2 | 2/2017 | Ehlers et al. |
| 9,627,721 B2 | 4/2017 | Kosaki et al. |
| 9,676,418 B1 | 6/2017 | Mohammed et al. |
| 9,682,727 B2 | 6/2017 | Tanaka et al. |
| 9,751,565 B2 | 9/2017 | Tatsuwaki et al. |
| 9,796,424 B2 * | 10/2017 | Sakaguchi ......... B62D 25/2036 |
| 9,988,100 B2 | 6/2018 | Kim et al. |
| 10,131,381 B2 | 11/2018 | Ashraf et al. |
| 10,293,860 B1 | 5/2019 | Cooper et al. |
| 10,336,369 B2 | 7/2019 | Viaux et al. |
| 10,421,424 B2 | 9/2019 | Sabu et al. |
| 10,486,513 B2 | 11/2019 | Battaglia et al. |
| 10,597,084 B2 * | 3/2020 | Ayukawa ............. B62D 21/157 |
| 10,632,857 B2 | 4/2020 | Matecki et al. |
| 10,741,809 B2 | 8/2020 | Kim et al. |
| 11,292,326 B2 | 4/2022 | McCarron et al. |
| 11,833,895 B2 | 12/2023 | McCarron et al. |
| 11,958,533 B2 * | 4/2024 | Kuipers ............... B62D 21/157 |
| 2002/0005268 A1 | 1/2002 | Noda et al. |

(56) References Cited

U.S. PATENT DOCUMENTS

| | | |
|---|---|---|
| 2002/0149490 A1 | 10/2002 | Butler et al. |
| 2003/0037427 A1 | 2/2003 | Chernoff et al. |
| 2003/0037967 A1 | 2/2003 | Chernoff et al. |
| 2003/0037968 A1 | 2/2003 | Chernoff et al. |
| 2003/0037970 A1 | 2/2003 | Chernoff et al. |
| 2003/0037971 A1 | 2/2003 | Chernoff et al. |
| 2003/0037972 A1 | 2/2003 | Chernoff et al. |
| 2003/0037973 A1 | 2/2003 | Chernoff et al. |
| 2003/0037974 A1 | 2/2003 | Chernoff et al. |
| 2003/0037975 A1 | 2/2003 | Chernoff et al. |
| 2003/0037982 A1 | 2/2003 | Chernoff et al. |
| 2003/0037987 A1 | 2/2003 | Chernoff et al. |
| 2003/0038442 A1 | 2/2003 | Chernoff et al. |
| 2003/0038467 A1 | 2/2003 | Chernoff et al. |
| 2003/0038468 A1 | 2/2003 | Chernoff et al. |
| 2003/0038469 A1 | 2/2003 | Chernoff et al. |
| 2003/0038470 A1 | 2/2003 | Chernoff et al. |
| 2003/0038509 A1 | 2/2003 | Chernoff et al. |
| 2003/0040827 A1 | 2/2003 | Chernoff et al. |
| 2003/0040828 A1 | 2/2003 | Chernoff et al. |
| 2003/0040933 A1 | 2/2003 | Chernoff et al. |
| 2003/0040977 A1 | 2/2003 | Chernoff et al. |
| 2003/0040979 A1 | 2/2003 | Borroni-Bird et al. |
| 2003/0046802 A1 | 3/2003 | Chernoff et al. |
| 2003/0047362 A1 | 3/2003 | Chernoff et al. |
| 2003/0080577 A1 | 5/2003 | Roberts et al. |
| 2003/0089536 A1 | 5/2003 | Chernoff et al. |
| 2003/0094318 A1 | 5/2003 | Chernoff et al. |
| 2003/0094319 A1 | 5/2003 | Chernoff et al. |
| 2003/0094320 A1 | 5/2003 | Chernoff et al. |
| 2003/0116374 A1 | 6/2003 | Chernoff et al. |
| 2003/0141736 A1 | 7/2003 | Chernoff et al. |
| 2003/0159866 A1 | 8/2003 | Claypole et al. |
| 2003/0164255 A1 | 9/2003 | Borroni-Bird et al. |
| 2003/0168267 A1 | 9/2003 | Borroni-Bird et al. |
| 2003/0168844 A1 | 9/2003 | Borroni-Bird et al. |
| 2003/0184075 A1 | 10/2003 | Freeman et al. |
| 2004/0060750 A1 | 4/2004 | Chernoff et al. |
| 2004/0066025 A1 | 4/2004 | Borroni-Bird et al. |
| 2004/0069545 A1 | 4/2004 | Chernoff et al. |
| 2004/0069556 A1 | 4/2004 | Chernoff et al. |
| 2004/0129487 A1 | 7/2004 | Shabana et al. |
| 2004/0163859 A1 | 8/2004 | Chernoff et al. |
| 2004/0163875 A1 | 8/2004 | Chernoff et al. |
| 2004/0164577 A1 | 8/2004 | Shabana et al. |
| 2004/0189054 A1 | 9/2004 | Chernoff et al. |
| 2004/0194280 A1 | 10/2004 | Borroni-Bird et al. |
| 2004/0194313 A1 | 10/2004 | Chernoff et al. |
| 2004/0195014 A1 | 10/2004 | Chernoff et al. |
| 2005/0049944 A1 | 3/2005 | Chernoff et al. |
| 2005/0082872 A1 | 4/2005 | Rich et al. |
| 2005/0121926 A1 | 6/2005 | Montanvert et al. |
| 2005/0161981 A1 | 7/2005 | Chernoff et al. |
| 2005/0168016 A1 | 8/2005 | Svartvatn |
| 2005/0263332 A1 | 12/2005 | Chernoff et al. |
| 2006/0027406 A1 | 2/2006 | Borroni-Bird et al. |
| 2006/0048994 A1 | 3/2006 | Young et al. |
| 2006/0061080 A1 | 3/2006 | Luttinen et al. |
| 2006/0102398 A1 | 5/2006 | Mizuno |
| 2007/0222251 A1 | 9/2007 | Abraham |
| 2008/0169671 A1 | 7/2008 | Hedderly |
| 2009/0058134 A1 | 3/2009 | Hiraishi et al. |
| 2009/0236877 A1 | 9/2009 | Peschansky et al. |
| 2010/0025131 A1 | 2/2010 | Gloceri et al. |
| 2010/0219720 A1 | 9/2010 | Namuduri et al. |
| 2010/0219721 A1 | 9/2010 | Namuduri et al. |
| 2010/0219798 A1 | 9/2010 | Namuduri et al. |
| 2010/0242513 A1 | 9/2010 | Nishino et al. |
| 2010/0273411 A1 | 10/2010 | Kakizaki et al. |
| 2010/0314905 A1 | 12/2010 | Mori |
| 2011/0212355 A1 | 9/2011 | Essinger et al. |
| 2011/0259657 A1 | 10/2011 | Fuechtner |
| 2011/0296855 A1 | 12/2011 | Johnston et al. |
| 2012/0049664 A1 | 3/2012 | Yokoyama et al. |
| 2012/0169089 A1 | 7/2012 | Rawlinson et al. |
| 2012/0174602 A1 | 7/2012 | Olivier et al. |
| 2012/0175899 A1 | 7/2012 | Gadhiya et al. |
| 2012/0183815 A1 | 7/2012 | Johnston et al. |
| 2013/0088045 A1 | 4/2013 | Charbonneau et al. |
| 2013/0300138 A1 | 11/2013 | Banasiak et al. |
| 2013/0341882 A1 | 12/2013 | Ehrlich et al. |
| 2014/0308551 A1 | 10/2014 | Schroeder et al. |
| 2014/0353937 A1 | 12/2014 | Girelli Consolaro et al. |
| 2015/0142245 A1 | 5/2015 | Cuddihy et al. |
| 2015/0258955 A1 | 9/2015 | Jayasuriya et al. |
| 2015/0298741 A1 | 10/2015 | Winberg et al. |
| 2016/0003553 A1 | 1/2016 | Campbell |
| 2016/0023532 A1 | 1/2016 | Gauthier |
| 2016/0107501 A1 | 4/2016 | Johnston |
| 2016/0107506 A1 | 4/2016 | Johnston |
| 2016/0164055 A1 | 6/2016 | Saitou |
| 2016/0207370 A1 | 7/2016 | Moeller et al. |
| 2016/0318409 A1 | 11/2016 | Rawlinson |
| 2017/0001507 A1 | 1/2017 | Ashraf et al. |
| 2017/0001667 A1 | 1/2017 | Ashraf et al. |
| 2017/0057546 A1 | 3/2017 | Dressel et al. |
| 2017/0225588 A1 | 8/2017 | Newman |
| 2017/0225714 A1 | 8/2017 | Ito |
| 2017/0305248 A1 | 10/2017 | Hara et al. |
| 2017/0369112 A1 | 12/2017 | Ashraf et al. |
| 2018/0050606 A1 | 2/2018 | Sugitate et al. |
| 2018/0050607 A1 | 2/2018 | Matecki et al. |
| 2018/0065678 A1 | 3/2018 | Tutzer |
| 2018/0072131 A1 | 3/2018 | Lee et al. |
| 2018/0086224 A1 | 3/2018 | King |
| 2018/0097265 A1 | 4/2018 | Tarlau et al. |
| 2018/0105062 A1 | 4/2018 | Fees et al. |
| 2018/0108891 A1 | 4/2018 | Fees et al. |
| 2018/0215245 A1 | 8/2018 | Sudhindra et al. |
| 2018/0229628 A1 | 8/2018 | Minato et al. |
| 2018/0261899 A1 | 9/2018 | Milton et al. |
| 2018/0281864 A1 | 10/2018 | Nishigaki et al. |
| 2018/0337377 A1 | 11/2018 | Stephens et al. |
| 2018/0337378 A1 | 11/2018 | Stephens et al. |
| 2018/0361819 A1 | 12/2018 | Ryu et al. |
| 2019/0023321 A1 | 1/2019 | Ayukawa |
| 2019/0054956 A1 | 2/2019 | Stenvall |
| 2019/0070924 A1 | 3/2019 | Mancini et al. |
| 2019/0092113 A1 | 3/2019 | Girelli Consolaro et al. |
| 2019/0131602 A1 | 5/2019 | Hilfrich et al. |
| 2019/0135065 A1 | 5/2019 | Wolf-Monheim |
| 2019/0160903 A1 | 5/2019 | Schramm et al. |
| 2019/0210470 A1 | 7/2019 | Thomas et al. |
| 2019/0225051 A1 | 7/2019 | Zenner et al. |
| 2019/0308669 A1 | 10/2019 | Aitharaju et al. |
| 2020/0079177 A1 | 3/2020 | Ferraris et al. |
| 2020/0079431 A1 | 3/2020 | Stainer et al. |
| 2020/0114973 A1 | 4/2020 | Takahashi et al. |
| 2020/0152926 A1 | 5/2020 | Wynn et al. |
| 2020/0156486 A1 | 5/2020 | Howard et al. |
| 2020/0215943 A1 | 7/2020 | Hayashi |
| 2020/0231218 A1 | 7/2020 | Arvidsson et al. |
| 2020/0339197 A1 | 10/2020 | Kecalevic et al. |
| 2020/0369140 A1 | 11/2020 | McCarron et al. |
| 2020/0398732 A1 | 12/2020 | Glatfelter et al. |
| 2021/0001924 A1 | 1/2021 | Charbonneau et al. |
| 2021/0091352 A1 | 3/2021 | Weicker et al. |
| 2021/0122223 A1 | 4/2021 | McCarron et al. |
| 2021/0273285 A1 | 9/2021 | Bluemel |
| 2022/0123397 A1 | 4/2022 | Weicker et al. |
| 2022/0126922 A1 | 4/2022 | Charbonneau et al. |
| 2022/0234435 A1 | 7/2022 | McCarron et al. |
| 2023/0102921 A1 | 3/2023 | Odhekar et al. |
| 2024/0092427 A1* | 3/2024 | Nakamura ......... B62D 25/2036 |

FOREIGN PATENT DOCUMENTS

| | | |
|---|---|---|
| CN | 1675092 A | 9/2005 |
| CN | 1695050 A | 11/2005 |
| CN | 1791519 A | 6/2006 |
| CN | 100379612 C | 4/2008 |
| CN | 201217453 Y | 4/2009 |
| CN | 102275521 A | 12/2011 |
| CN | 102548780 A | 7/2012 |

(56) References Cited

FOREIGN PATENT DOCUMENTS

| | | |
|---|---|---|
| CN | 103183053 B | 7/2013 |
| CN | 204150116 U | 2/2015 |
| CN | 104417303 A | 3/2015 |
| CN | 105522888 A | 4/2016 |
| CN | 106240637 A | 12/2016 |
| CN | 106458123 A | 2/2017 |
| CN | 205916190 U | 2/2017 |
| CN | 106573651 A | 4/2017 |
| CN | 206287960 U | 6/2017 |
| CN | 107074051 A | 8/2017 |
| CN | 206417059 U | 8/2017 |
| CN | 107651021 A | 2/2018 |
| CN | 107709074 A | 2/2018 |
| CN | 107792185 A | 3/2018 |
| CN | 107813674 A | 3/2018 |
| CN | 108357565 A | 8/2018 |
| CN | 108860040 A | 11/2018 |
| CN | 108891248 A | 11/2018 |
| CN | 208069806 U | 11/2018 |
| CN | 109204462 A | 1/2019 |
| CN | 109291747 A | 2/2019 |
| CN | 110053451 A | 7/2019 |
| CN | 210149098 U | 3/2020 |
| DE | 3430129 A1 | 2/1986 |
| DE | 10154353 A1 | 5/2002 |
| DE | 10297137 T5 | 8/2004 |
| DE | 102006021149 A1 | 11/2007 |
| DE | 102008052937 A1 | 5/2009 |
| DE | 10297133 B4 | 5/2013 |
| DE | 102017005938 B3 | 12/2018 |
| DE | 102018123357 A1 | 3/2019 |
| DE | 102018122854 A1 | 3/2020 |
| DE | 102020101867 A1 | 7/2020 |
| EP | 0770517 A1 | 5/1997 |
| EP | 0857590 A1 | 8/1998 |
| EP | 1245436 A1 | 10/2002 |
| EP | 1446645 A2 | 8/2004 |
| EP | 1448969 A1 | 8/2004 |
| EP | 2392486 A2 | 12/2011 |
| EP | 3088230 A1 | 11/2016 |
| FR | 8239 E | 2/1908 |
| FR | 2821046 A1 | 8/2002 |
| FR | 2938475 A1 | 5/2010 |
| FR | 2972169 A1 | 9/2012 |
| GB | 191217101 A | 6/1913 |
| GB | 2568538 A | 5/2019 |
| JP | S63-52588 U | 4/1988 |
| JP | S63-151515 A | 6/1988 |
| JP | H01-158206 U | 11/1989 |
| JP | H03-91867 U | 9/1991 |
| JP | H04-83926 U | 7/1992 |
| JP | H05-19010 U | 3/1993 |
| JP | H11-78966 A | 3/1999 |
| JP | H11-348815 A | 12/1999 |
| JP | 2001-47828 A | 2/2001 |
| JP | 2001-047828 A | 2/2001 |
| JP | 2002-229656 A | 8/2002 |
| JP | 2002-370544 A | 12/2002 |
| JP | 2004-338421 A | 12/2004 |
| JP | 2005500940 A | 1/2005 |
| JP | 2007-106320 A | 4/2007 |
| JP | 2007-303680 A | 11/2007 |
| JP | 2008-512627 A | 4/2008 |
| JP | 2008149914 A | 7/2008 |
| JP | 2010-221991 A | 10/2010 |
| JP | 4840196 B2 | 12/2011 |
| JP | 2013-136308 A | 7/2013 |
| JP | 2014-127338 A | 7/2014 |
| JP | 2015-074244 A | 4/2015 |
| JP | 2017001441 A | 1/2017 |
| JP | 2018-176790 A | 11/2018 |
| KR | 10-2003-0046824 A | 6/2003 |
| KR | 10-1286675 B1 | 7/2013 |
| WO | 199104875 A1 | 4/1991 |
| WO | 03018337 A2 | 3/2003 |
| WO | 03018358 A2 | 3/2003 |
| WO | 03018359 A2 | 3/2003 |
| WO | 03018373 A1 | 3/2003 |
| WO | 03019309 A1 | 3/2003 |
| WO | 03050498 A1 | 6/2003 |
| WO | 03054500 A2 | 7/2003 |
| WO | 2005084985 A1 | 9/2005 |
| WO | 2006029415 A2 | 3/2006 |
| WO | 2011134815 A1 | 11/2011 |
| WO | 2014173476 A1 | 10/2014 |
| WO | 2015128430 A1 | 9/2015 |
| WO | 2015136476 A1 | 9/2015 |
| WO | 2015151064 A1 | 10/2015 |
| WO | 2017136351 A2 | 8/2017 |
| WO | 2017207125 A1 | 12/2017 |
| WO | 2017215857 A1 | 12/2017 |
| WO | 2018149762 A1 | 8/2018 |
| WO | 2018158363 A1 | 9/2018 |
| WO | 2019169080 A1 | 9/2019 |
| WO | 2020236913 A1 | 11/2020 |

OTHER PUBLICATIONS

Final Office Action dated Aug. 1, 2024, in connection with U.S. Appl. No. 17/646,656, 9 pages.
Notice of Reasons for Rejection dated Aug. 6, 2024, in connection with Japanese Application No. 2023-114857, 11 pages.
Third Office Action dated Jul. 25, 2024, in connection with Chinese Application No. CN202080073120.8, 23 pages.
Notice of Reasons for Refusal dated Jun. 25, 2024, in connection with Japanese Application No. 2023-101515, 9 pages.
Notice of Allowance dated Jun. 19, 2024, in connection with Taiwanese Application No. 109116751, 3 pages.
Application Found Allowable dated May 24, 2024, in connection with Canadian Application No. 3, 155, 162, 1 page.
Notification of the Second Office Action dated Jan. 18, 2024, in connection with Chinese Application No. 202080048116.6, 14 pages.
Notice of Grant dated Apr. 1, 2024, in connection with Chinese Application No. 202080052476.3, 8 pages.
Communication pursuant to Article 94(3) EPC dated Feb. 21, 2024, in connection with European Application No. 20920386.8, 10 pages.
Supplementary European Search Report dated Jul. 24, 2023, in connection with European Patent Application No. 20809867.3, 24 pages.
Decision to Grant a Patent dated Aug. 15, 2023, in connection with Japanese Application No. 2021-577866, 5 pages.
Non-final Office Action dated Sep. 9, 2024, in connection with U.S. Appl. No. 17/761,997, 17 pages.
Supplemental European Search Report dated Nov. 8, 2023, in connection with European Application No. 20863787.6, 10 pages.
Supplemental European Search Report dated Nov. 8, 2023, in connection with European Application No. 20865403.8, 13 pages.
Decision to Grant a Patent dated Jun. 20, 2023, in connection with Japanese Application No. 2021-568853, 6 pages.
Notice of Allowance dated Jul. 6, 2023, in connection with U.S. Appl. No. 16/879,235, 10 pages.
Commissioners Notice—Application Found Allowable dated Feb. 19, 2024, in connection with Canadian Application No. 3,145,383, 1 page.
Commissioners Notice—Application Found Allowable dated Feb. 8, 2024, in connection with Canadian Application No. 3,153,952, 1 page.
Notification of Second Office Action dated Mar. 5, 2024, in connection with Chinese Application No. 202080073120.8, 6 pages.
Notification of Second Office Action dated Mar. 5, 2024, in connection with Chinese Application No. 202080080584.1, 14 pages.
International Search Report and Written Opinion of the International Searching Authority dated Mar. 8, 2024, in connection with International Application No. PCT/US2023/080393, 9 pages.
Final Office Action dated Mar. 12, 2024, in connection with United States U.S. Appl. No. 17/646,653, 17 pages.

(56) References Cited

OTHER PUBLICATIONS

Commissioner's Notice—Application Found Allowable dated Feb. 12, 2024, in connection with Canadian Application No. 3,163,499, 1 page.
Supplementary European Search Report dated Dec. 5, 2023, in connection with European Application No. 20864821.2, 13 pages.
Office Action dated Nov. 2, 2023, in connection with Canadian Application No. 3,155,162, 7 pages.
Non-final Office Action dated Dec. 20, 2023, in connection with U.S. Appl. No. 17/646,653, 14 pages.
Office Action dated Jan. 12, 2023 in connection with Canadian Patent Application No. 3,141,572, 3 pages.
Supplementary European Search Report dated Dec. 9, 2022 in connection with European Patent Application No. 20920386.8, 27 pages.
Notice of Reasons for Refusal dated Dec. 13, 2022 in connection with Japanese Patent Application No. 2021-577866, 16 pages.
Final Office Action dated Feb. 1, 2023 in connection with U.S. Appl. No. 16/879,235, 12 pages.
International Search Report and Written Opinion for International Application No. PCT/US2020/050013, Search completed Nov. 4, 2020, mailed Nov. 30, 2020, 10 pages.
International Search Report and Written Opinion for International Application No. PCT/US2020/051870, Search completed Jan. 6, 2021, mailed Feb. 4, 2021, 13 pages.
International Search Report and Written Opinion for International Application No. PCT/US2020/051505, completed Jan. 12, 2021, mailed Feb. 5, 2021, 12 pages.
International Search Report and Written Opinion for International Application No. PCT/US2020/033769, Completed Jul. 15, 2020, mailed Sep. 2, 2020, 30 pages.
International Search Report and Written Opinion for International Application No. PCT/US2020/051879, Search completed Nov. 24, 2020, mailed Dec. 14, 2020, 8 pages.
International Search Report and Written Opinion for International Application No. PCT/US2020/040788, Search completed Nov. 19, 2020, mailed Dec. 22, 2020, 14 pages.
Non-final Office Action for U.S. Appl. No. 17/027,626, dated Jul. 20, 2021, 20 pages.
Notice of Allowance for U.S. Appl. No. 17/142,889, dated Jul. 1, 2021, 7 pages.
Notice of Allowance for U.S. Appl. No. 17/027,626, dated Sep. 28, 2021, 7 pages.
Corrected Notice of Allowability for U.S. Appl. No. 17/027,626, dated Jan. 18, 2022, 7 pages.
Notice of Allowance for U.S. Appl. No. 16/920,375, dated Dec. 17, 2021, 9 pages.
Notice of Allowance for U.S. Appl. No. 17/491,217, dated Nov. 29, 2021, 10 pages.
Cropley, Steve, "Williams reveals electric vehicle skateboard chassis," Autocar Industry News, Haymarket Media Group, Sep. 6, 2017, 5 pages.
Final Office Action dated Aug. 4, 2022, in connection with U.S. Appl. No. 16/879,235, 12 pages.
Non-final Office Action dated Jun. 7, 2022, in connection with U.S. Appl. No. 16/879,235, 14 pages.
Non-final Office Action dated Sep. 14, 2022, in connection with U.S. Appl. No. 17/016,299, 14 pages.
Notice of Allowance dated Nov. 7, 2022, in connection with U.S. Appl. No. 17/016,299, 5 pages.
Notice of Allowance dated Oct. 31, 2022, in connection with U.S. Appl. No. 17/027,600, 7 pages.
Non-final Office Action dated Oct. 7, 2022, in connection with U.S. Appl. No. 17/027,600, 7 pages.
Non-final Office Action dated Oct. 20, 2022, in connection with U.S. Appl. No. 16/879,235, 11 pages.
Notice of Reasons for Refusal dated Nov. 22, 2022, in connection with Japanese Application No. 2021-568853, 12 pages.
Non-final Office Action dated Jul. 17, 2024, in connection with U.S. Appl. No. 17/646,653, 15 pages.
Rejection Decision dated Nov. 11, 2024, in connection with Chinese Application No. 202080073120.8, 28 pages.
Notification to Grant Patent Right for Invention dated Dec. 1, 2024, in connection with Chinese Application No. 202080048116.6, 3 pages.
Notice of Reasons for Refusal dated Dec. 3, 2024, in connection with Japanese Application No. 2023-101515, 8 pages.
Decision of Refusal dated May 9, 2023, in connection with Japanese Application No. 2021-577866, 9 pages.
Invitation pursuant to Rule 63(1) EPC dated May 12, 2023, in connection with European Application No. 20809867.3, 7 pages.
Office Action dated Aug. 10, 2023, in connection with Canadian Application No. 3,163,502, 3 pages.
Office Action dated Aug. 15, 2023, in connection with Canadian Application No. 3,163,499, 6 pages.
Notification of the First Office Action dated Aug. 16, 2023, in connection with Chinese Patent Application No. 202080080584.1, 20 pages.
Notice of Allowance dated Apr. 22, 2024, in connection with U.S. Appl. No. 17/651,221, 10 pages.
Non-Final Office Action dated Apr. 24, 2024, in connection with U.S. Appl. No. 17/646,656, 11 pages.
Rejection Decision dated May 27, 2024, in connection with Chinese Application No. 202080048116.6, 12 pages.
Notification to Grant Patent Right for Invention dated Jun. 10, 2024, in connection with Chinese Application No. 202080079746.X, 4 pages.
Notification to Grant Patent Right for Invention dated Jun. 20, 2024, in connection with Chinese Application No. 202080080584.1, 6 pages.
Notification of the First Office Action dated Aug. 29, 2023, in connection with Chinese Patent Application No. 202080052476.3, 20 pages.
Notification of the First Office Action dated Sep. 1, 2023, in connection with Chinese Patent Application No. 202080073120.8, 17 pages.
Notification of the First Office Action dated Aug. 30, 2023, in connection with Chinese Patent Application No. 202080048116.6, 20 pages.
Notice of Allowance dated Sep. 12, 2023, in connection with Canadian Application No. 3,141,572, 1 page.
Supplementary Partial European Search Report dated Sep. 11, 2023, in connection with European Application No. 20864821.2, 14 pages.
Supplementary Partial European Search Report dated Sep. 19, 2023, in connection with European Application No. 20865142.2, 17 pages.
Office Action dated Feb. 13, 2023 in connection with Canadian Patent Application No. 3,145,383, 4 pages.
Notice of Reasons for Refusal dated Mar. 14, 2023 in connection with Japanese Patent Application No. 2021-568853, 4 pages.
Non-Final Office Action dated Mar. 24, 2023 in connection with U.S. Appl. No. 18/052,460, 8 pages.
Office Action dated Apr. 12, 2023, in connection with Canadian Application No. 3,153,952, 3 pages.
Non-final Office Action dated Jan. 16, 2024, in connection with U.S. Appl. No. 17/646,656, 7 pages.
Notice of review opinion dated Jan. 11, 2024, in connection with Taiwanese Application No. 11320040860, 16 pages.
Supplementary European Search Report dated Jan. 16, 2024, in connection with European Application No. 20865142.2, 16 pages.

* cited by examiner

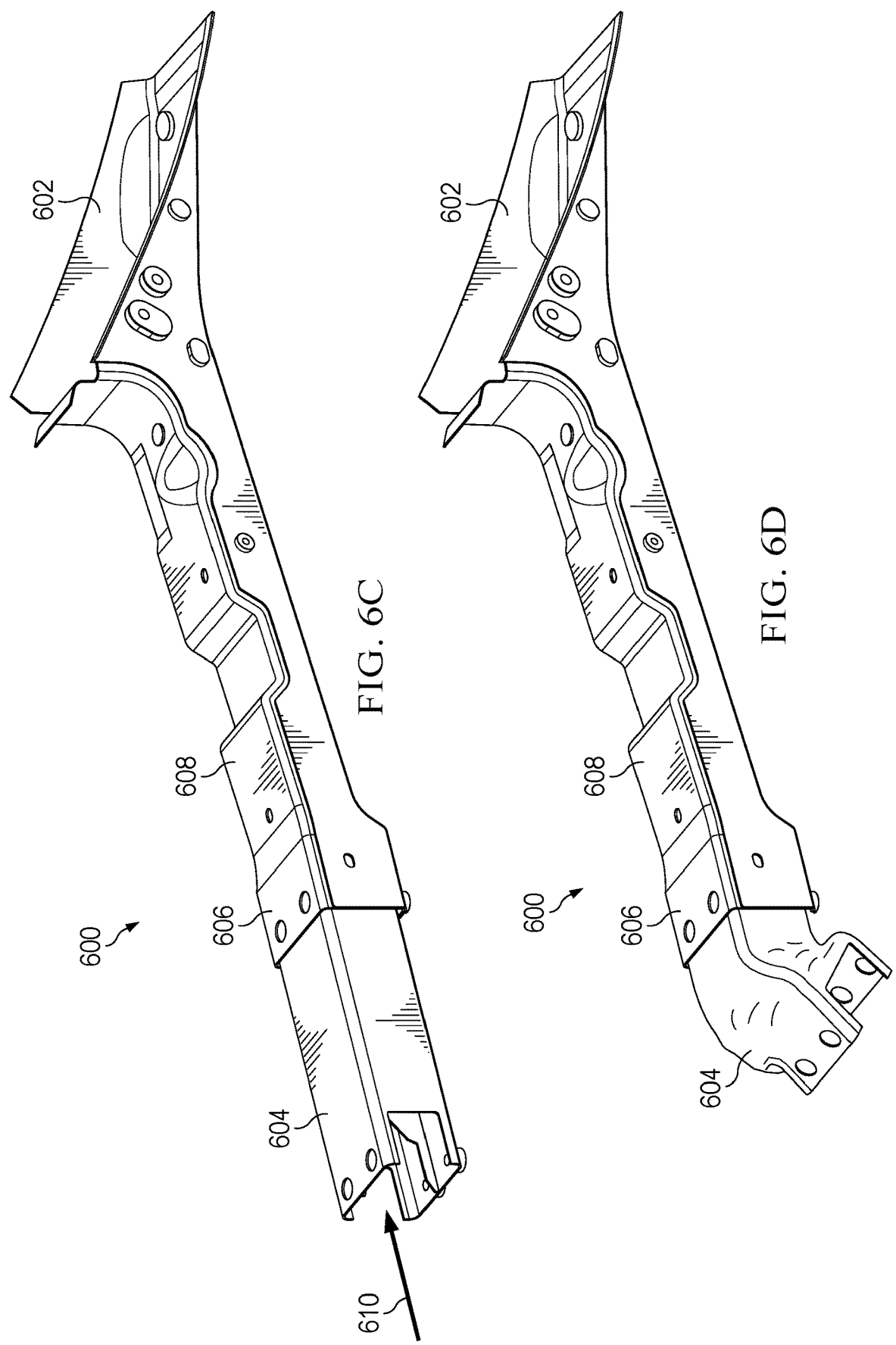

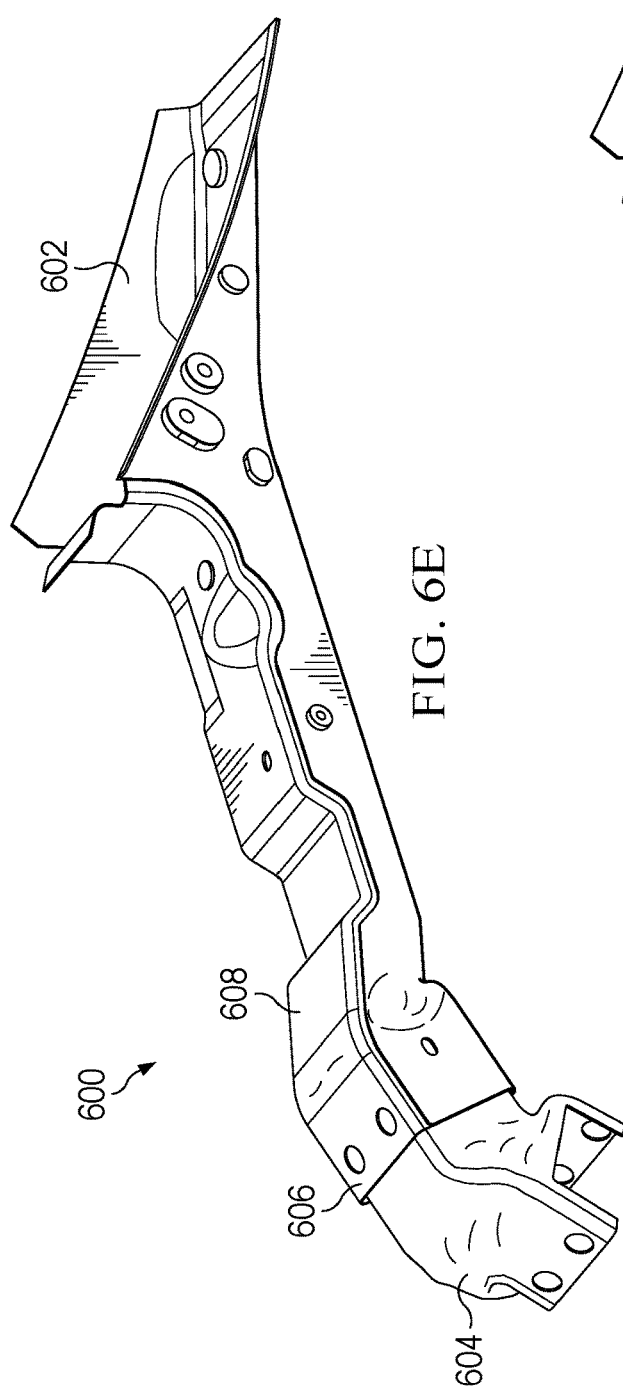
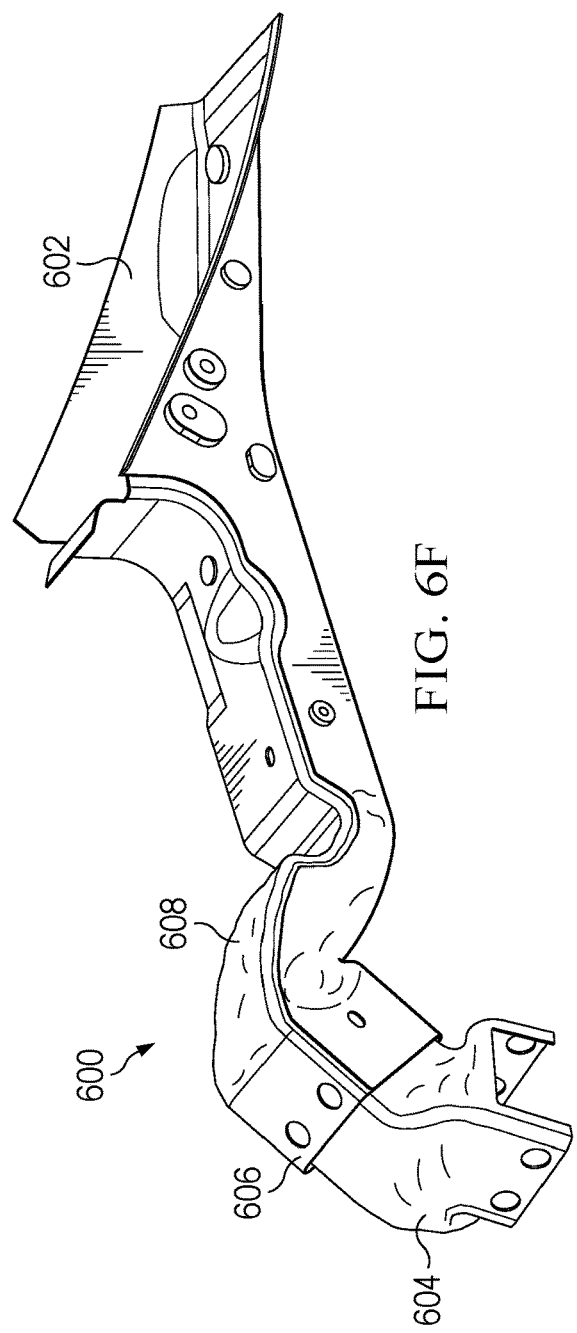
FIG. 6E
FIG. 6F

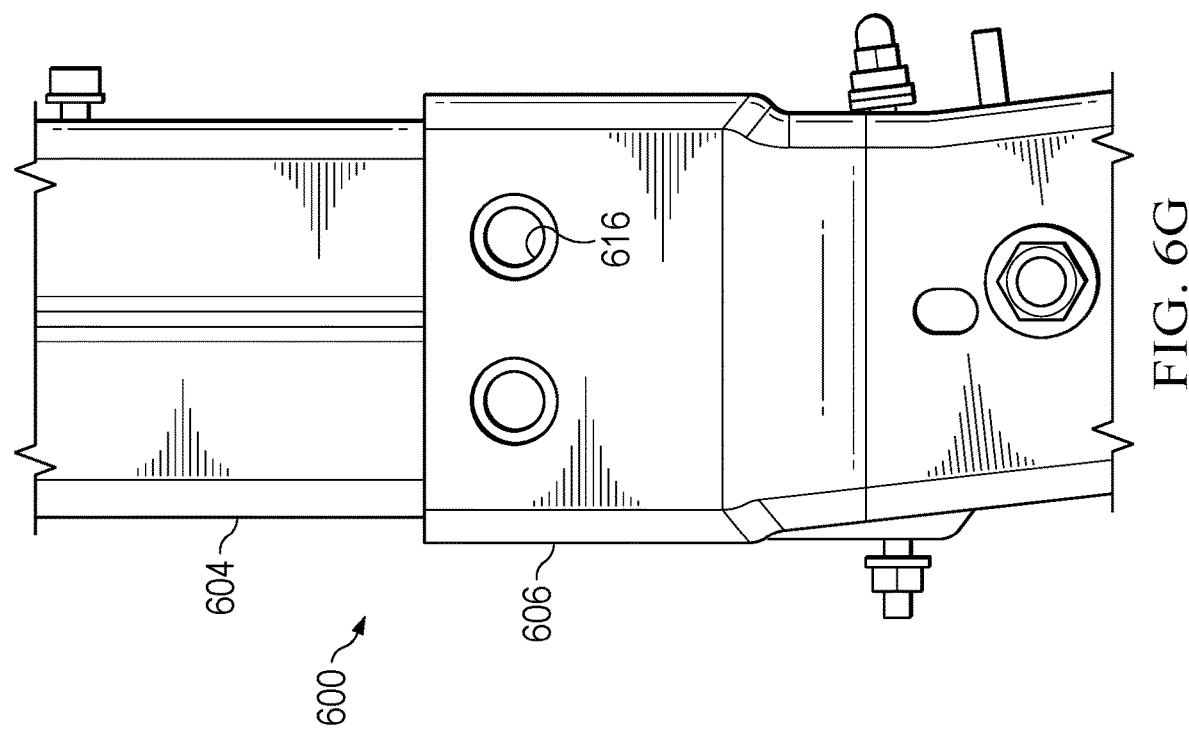

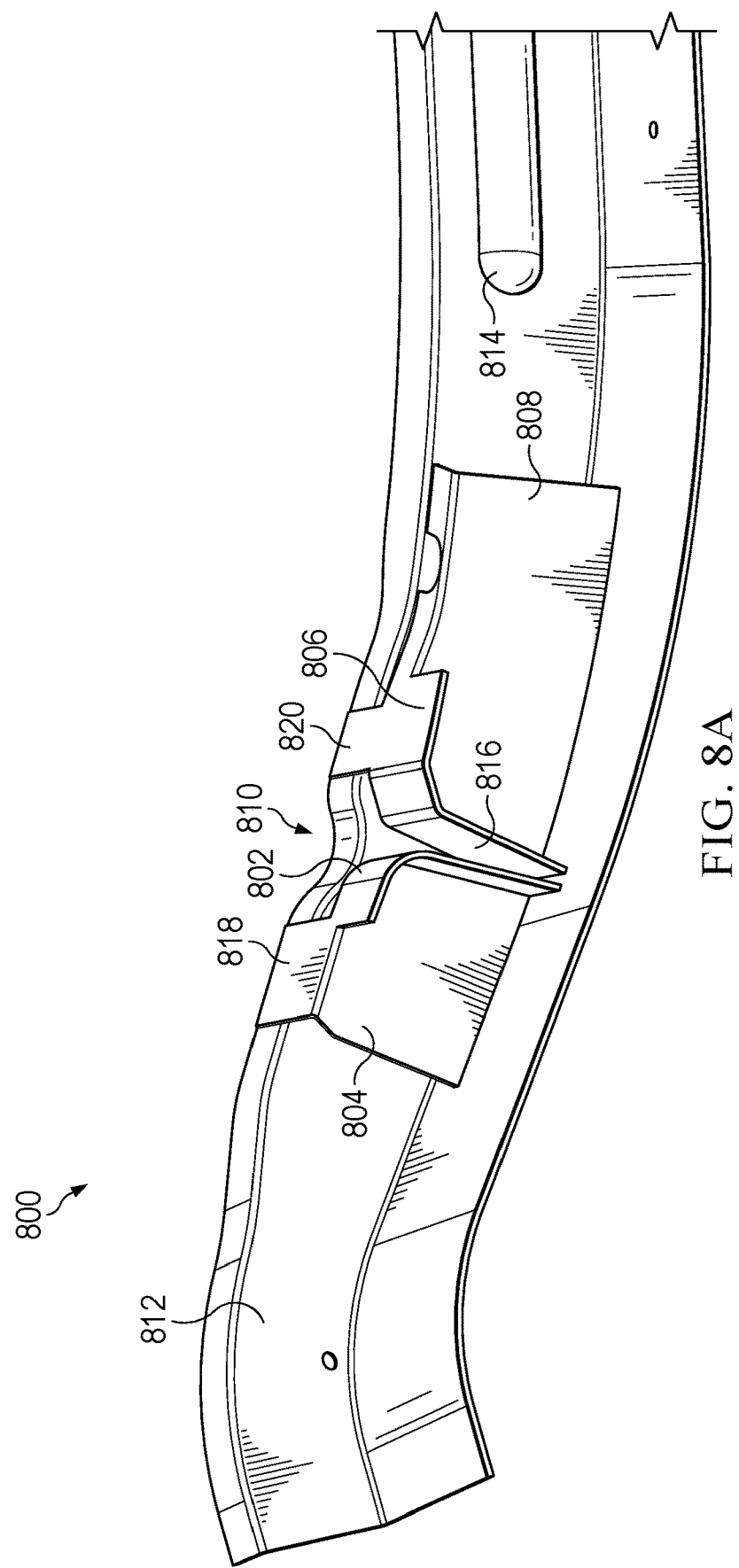

METHOD TO REDUCED LATERAL DEFLECTION OF LONGITUDINAL MEMBERS IN SIDE IMPACT

PRIORITY CLAIM

This application claims priority as a continuation-in-part of U.S. Non-Provisional patent application Ser. No. 17/646,656 filed Dec. 30, 2021, which is a continuation of U.S. Non-Provisional patent application Ser. No. 16/920,375 filed Jul. 2, 2020, now U.S. Pat. No. 11,318,995, and which claims priority to U.S. Provisional Patent Application No. 62/869,823 filed Jul. 2, 2019. The content of the above-identified patent documents is incorporated herein by reference.

TECHNICAL FIELD

This disclosure relates generally to impact features for vehicles. More specifically, this disclosure relates to reducing inward deformation of side impact features for a vehicle experiencing a side impact with a pole.

BACKGROUND

Recent advances in electric motor and battery technologies have made electric vehicles (EVs) practical to manufacture. Electric vehicles have a number of advantages over conventional internal combustion vehicles, but typically weigh as much as ½ to 1 ton more. With the extra weight, combined with (typically) a smaller footprint and overall size, electric vehicles in particular can benefit from lighter structural designs providing improved impact energy absorption. For example, U.S. Pat. No. 11,318,995 and U.S. Patent Application Publication No. 2022/0126922 disclose various impact features for vehicles.

SUMMARY

This disclosure relates to a support plate and reinforcement member mounted within a hollow side sill between a rocker and crossmembers for a vehicle framework. The support plate may include flanges along either edge and a straight, projecting face between the flanges. The reinforcement member, mounted on the support plate proximate to an outer surface of the side sill, may include flanges along either edge and a wavy projecting face between the flanges. Contact portions of the projecting face for the reinforcement member may contact an interior of the side sill at regions aligned with where the side sill mounts to the crossmembers, with intervening portions of the projecting face, in areas adjacent energy absorbing crush cans, extending less far from the flanges. The intervening portions may also be laterally offset from the contact portions, to provide larger weld areas.

In one embodiment, a vehicle side impact absorption structure includes a side sill mounted between a rocker and crossmembers supporting one or more battery packs. The vehicle side impact absorption structure also includes a reinforcement mounted within and along a length of the side sill proximate to an outer surface of the side sill. The reinforcement includes flanges on either side of a projecting portion. The projecting portion projects across an interior of the side sill toward an inner surface of the side sill and comprises first faces aligned with regions of the side sill that mount to the crossmembers and second faces in regions between the first faces. The first faces project further toward the inner surface of the side sill than the second faces.

In another embodiment, a method of forming a vehicle side impact absorption structure includes mounting a side sill between a rocker and crossmembers supporting one or more battery packs. The method includes mounting a reinforcement within and along a length of the side sill proximate to an outer surface of the side sill. The reinforcement includes flanges on either side of a projecting portion. The projecting portion projects across an interior of the side sill toward an inner surface of the side sill and comprises first faces aligned with regions of the side sill that mount to the crossmembers and second faces in regions between the first faces. The first faces project further toward the inner surface of the side sill than the second faces.

For either embodiment, the first faces may each contact an interior surface of the side sill that is aligned with a contact region between the side sill and one of the crossmembers.

For either embodiment, the first faces may be laterally offset from the second faces to provide larger welding areas, the projecting portion forming a structure that is wavy in two directions.

For either embodiment, a support plate may be disposed between the reinforcement and the side sill, the support plate comprising flanges at two opposing edges of the support plate and a straight, projecting face between the flanges.

For either embodiment, the side sill may comprise two U-shaped members forming an enclosure, the reinforcement and the support plate mounted within the enclosure.

For either embodiment, the side sill may be mounted adjacent energy absorbing crush cans.

For either embodiment, the support plate may be stamped and have a first thickness, while the reinforcement may be roll formed and have a second thickness greater than the first thickness.

For either embodiment, a skateboard framework including the vehicle side impact absorption structure includes the crossmembers, and the side sill is mounted to the crossmembers. The skateboard framework may also include one or more battery packs mounted to the crossmembers by brackets, where at least one of the battery packs is positioned proximate to an inner surface of the side sill.

For either embodiment, a vehicle including the vehicle side impact absorption structure may also include a cabin mounted to a framework including the side sill, together with wheels connected to one or more axels mounted to the framework.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following description taken in conjunction with the accompanying drawings, in which like reference numerals represent like parts:

FIGS. 6G-6H illustrate embodiments of a crush control element within a lower load path;

FIGS. 8A and 8B are cross sectional views of a transition rail;

DETAILED DESCRIPTION

FIGS. 1 through 25, described below, and the various embodiments used to describe the principles of this disclosure are by way of illustration only and should not be construed in any way to limit the scope of this disclosure. Those skilled in the art will understand that the principles of this disclosure may be implemented in any type of suitably arranged device or system.

Figure 1:
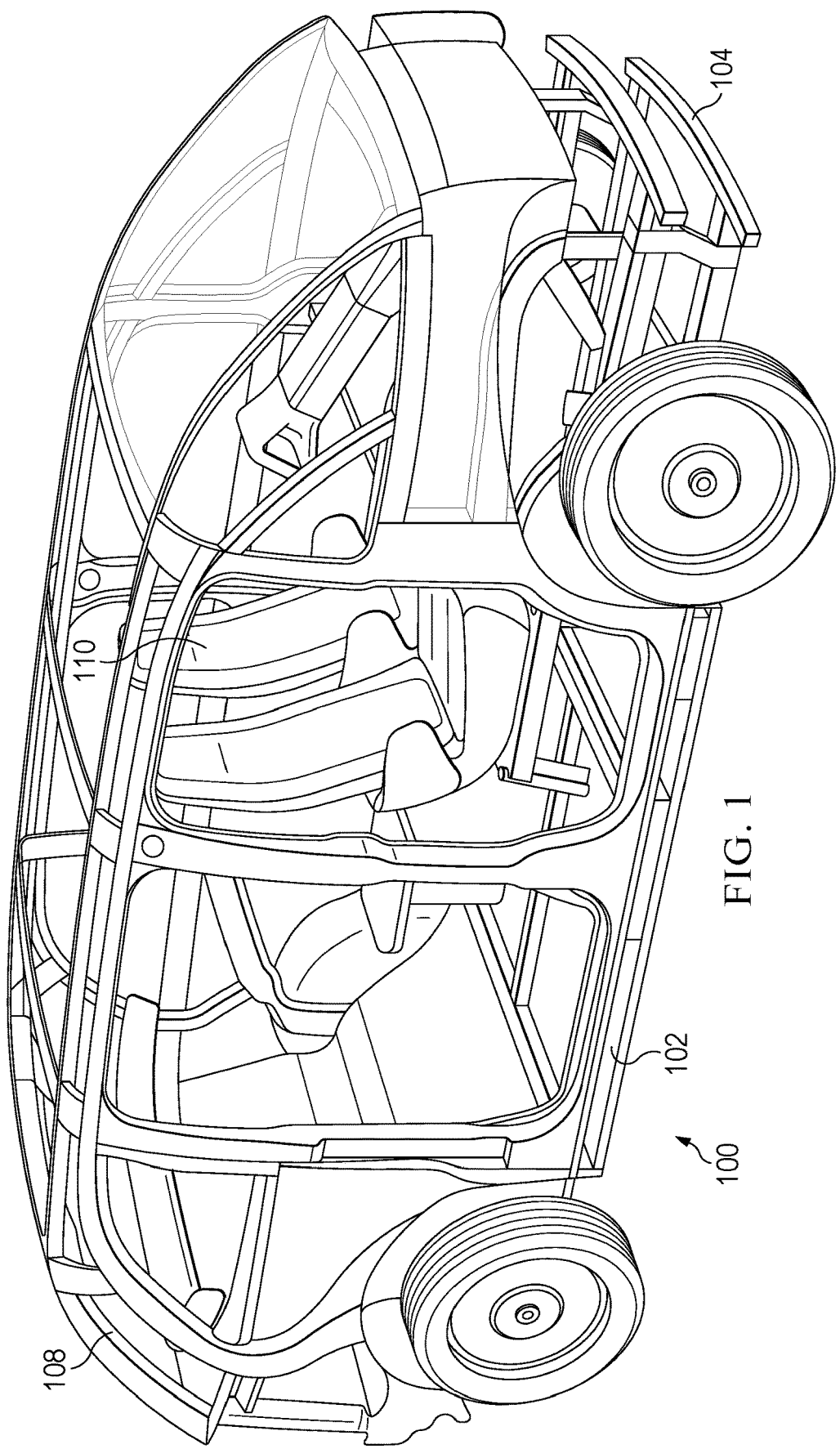
FIG. 1 illustrates an example electric vehicle (EV) within which longitudinal members with reduced lateral deflection during side impact can be implemented in accordance with embodiments of the present disclosure.

FIG. 1 illustrates an example electric vehicle (EV) within which longitudinal members with reduced lateral deflection during side impact can be implemented in accordance with embodiments of the present disclosure. FIG. 1 illustrates an example electric vehicle (EV) framework 100 with a framework structure 102. The embodiment of the EV framework 100 illustrated in FIG. 1 is for illustration and explanation only. FIG. 1 does not limit the scope of this disclosure to any particular implementation of a vehicle.

The EV framework 100 of FIG. 1 has a front and a rear portion. The EV framework 100 incorporates an embodiment of a body structure 108 that has a passenger space 110 that is ultimately the subject of the desired protection against impacts (i.e., with minimal crumple resulting from an impact). The front portion may have a variety of elements such as deflectors and a forward crumple zone that may be designed to absorb frontal impact energy in such a way as to protect the passenger compartment.

Figure 2:
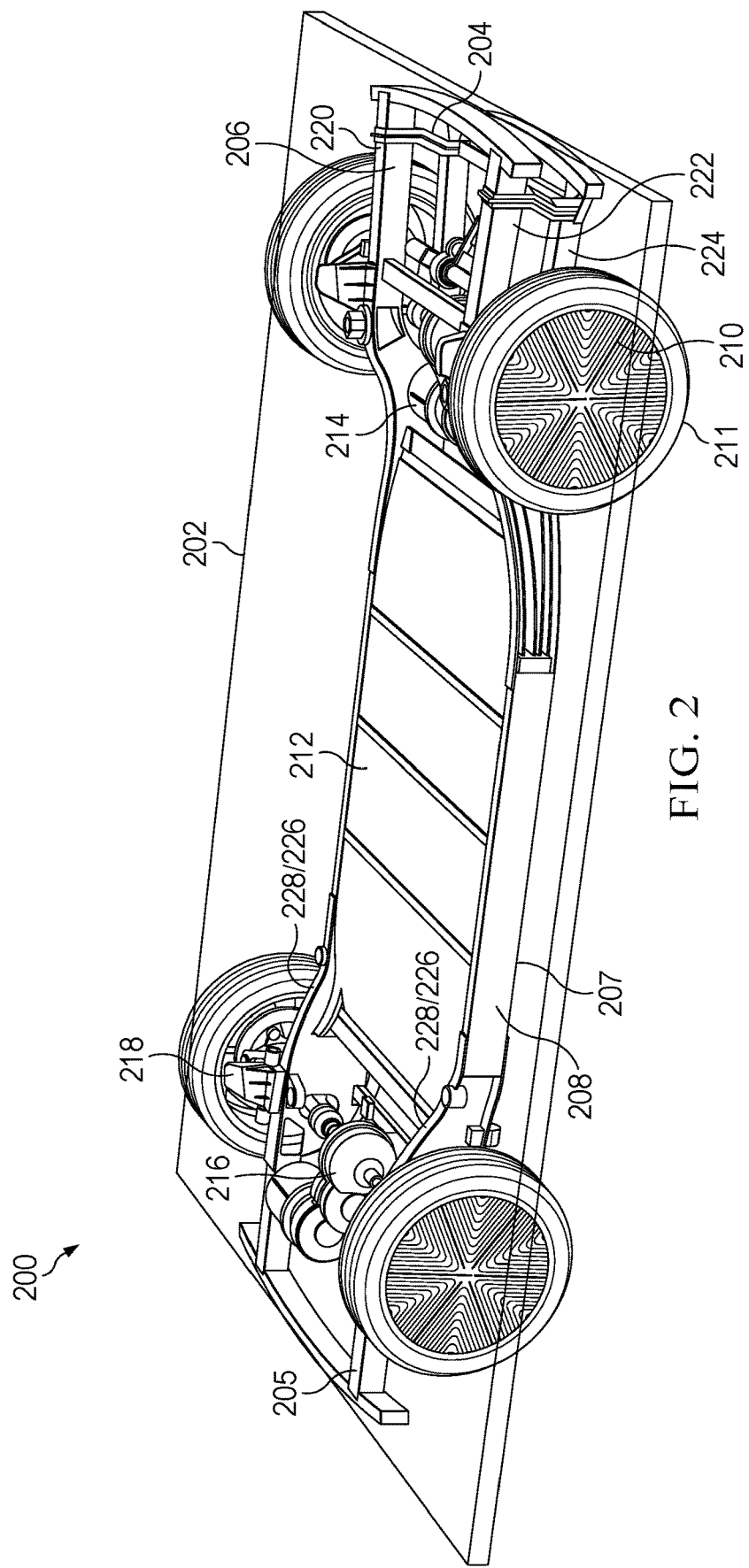
FIG. 2 illustrates the overall layout of a vehicle platform 200 for the EV framework 100 within which longitudinal members with reduced lateral deflection during side impact can be implemented in accordance with embodiments of the present disclosure.

FIG. 2 illustrates the overall layout of a vehicle platform 200 for the EV framework 100 within which longitudinal members with reduced lateral deflection during side impact can be implemented in accordance with embodiments of the present disclosure. Vehicle platform 200 integrates functional systems including energy storage, drive train, suspension, steering, braking, and safety systems, additional other sub-systems and components substantially within the boundaries of the vehicle platform. As used herein, the boundaries of the vehicle platform will be taken to comprise a generally horizontal vehicle platform plane 202 extending the width of the vehicle platform and from the top face 204 of the uppermost frame structure 206 to the bottom face 207 of the frame structure 208. In various other embodiments the boundaries of the vehicle platform may also comprise areas positioned anywhere within the upper and lower dimensions of the wheels 210 and/or tires 211 of the vehicle. With respect to the platform plane, it should be noted that, as shown in FIG. 2, many embodiments of the vehicle platform may comprise a frame having portions disposed at different heights relative to each other (e.g., having front and rear portions elevated relative to a central portion as illustrated in FIG. 2), in such embodiments it will be understood that the platform plane 202 may be described as an undulating plane such that in some embodiments functional components are defined as not extending above an undulating plane defined by an upper face of the subject portion of the vehicle platform frame. Regardless of the specific boundaries of the vehicle platform, it will be understood that in various embodiments functional components within this platform plane may be disposed such that they do not extend within the inner volume defined by a vehicle body when secured atop the vehicle platform.

Vehicle platforms capable of allowing for such self-contained layouts in accordance with embodiments may be described in reference to various internal vehicle platform portions: a central portion generally disposed between the wheels, and front and rear portions extending from the end of the central portion to the front and rear ends of the vehicle. Additionally, many embodiments may have a transition portion that connects the front and rear portions to the central portion. Descriptions of the specific frame elements will be more fully described later. However, as shown in FIG. 2, these portions are subdivided and the systems, subsystems and components are configured within such that a self-contained vehicle platform is realized.

The embodiment shown in FIG. 2 comprises one functional layout suitable for an EV, including an energy storage system (e.g., battery pack(s)) 212, front 214 and rear 216 drive trains (e.g., electric motors and associated power electronics, transmissions, etc.), and control systems, such as suspension, steering and braking 218. As can also be seen from the embodiment of FIG. 2, the drive train elements may be positioned in-line with the wheels and close to the front and/or rear portions of the vehicle platform frame 206, thereby allowing for increased passenger space within the vehicle cabin. In addition to the propulsion systems and suspension systems that may be incorporated into the vehicle platform 200, many embodiments may incorporate a variety of other components such as control systems designed to operate a variety of other subsystems (e.g., brakes, steering, cooling, etc.). In many embodiments, the frame 206 of the vehicle platform 200 also comprises a variety of safety systems or safety-related features that are incorporated within the frame 206 of the platform 200. For example, the front portion of the frame 206 that surrounds or houses the front drive train 214 may be provided with a protective feature (e.g., crumple zone) 220 with an upper load path 222 and a lower 224 load path configuration designed to absorb the impact energy in a variety of manners.

Additionally, the rear portion of the frame 206 may be equipped with a variety of safety features or safety-related elements such as a reinforcement patch 228 that may be positioned over any number of frame element attachment points 226, to add additional strength to the frame 206. Furthermore, in some embodiments the reinforcement patches 228 may be adjusted in length, width, and/or other physical dimensions to accommodate a number of different impact forces.

Figure 3A:
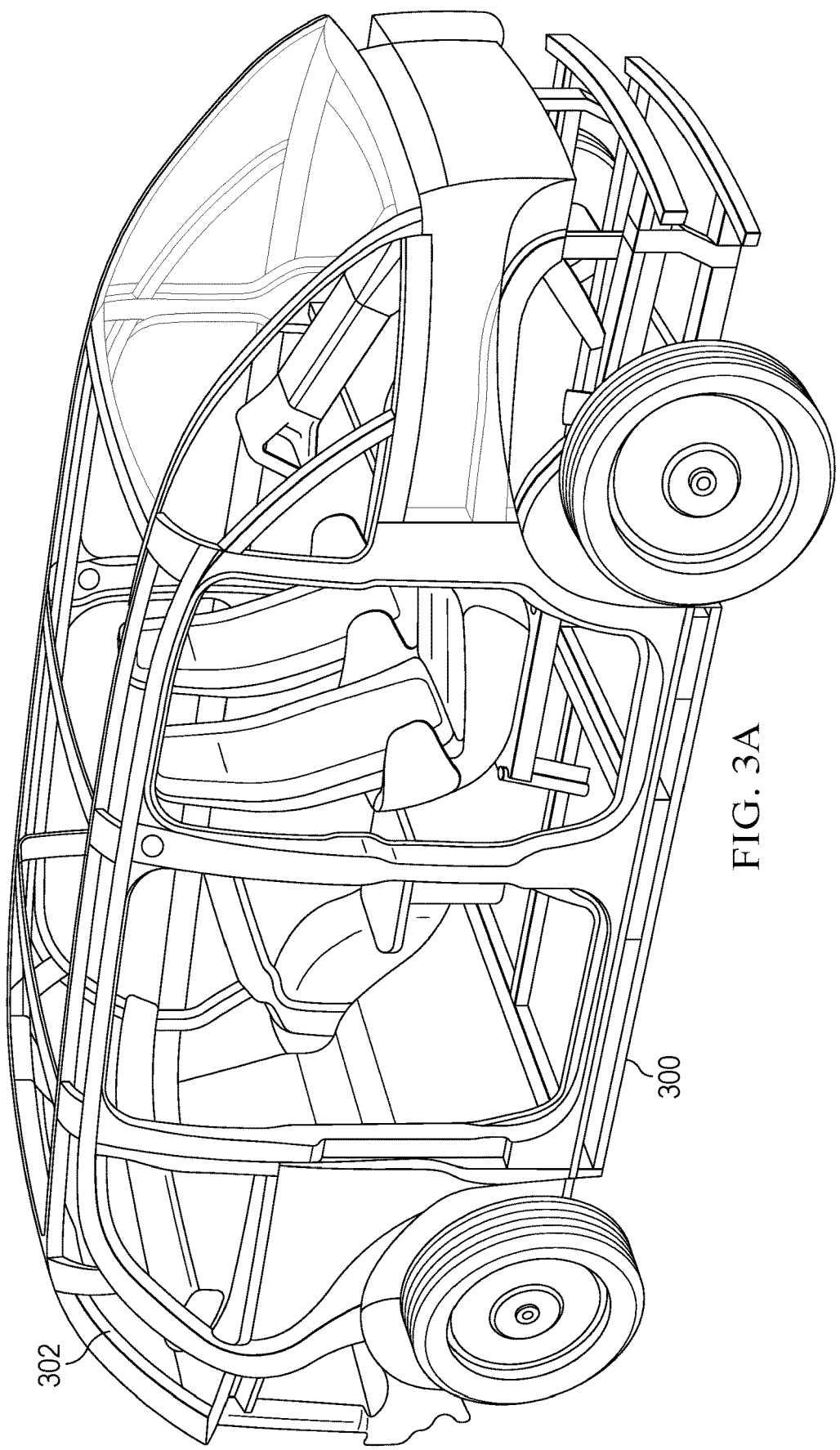
FIGS. 3A to 3D illustrate several embodiments of body structures that can have different effects on the underlying vehicle platform from a functional and a safety standpoint.
Figure 3B:
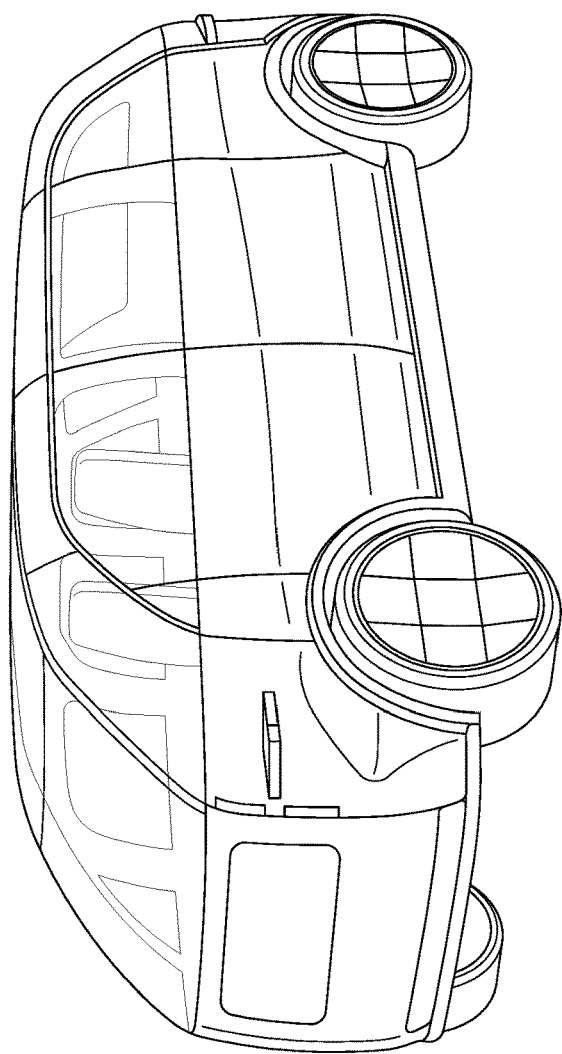
Figure 3C:
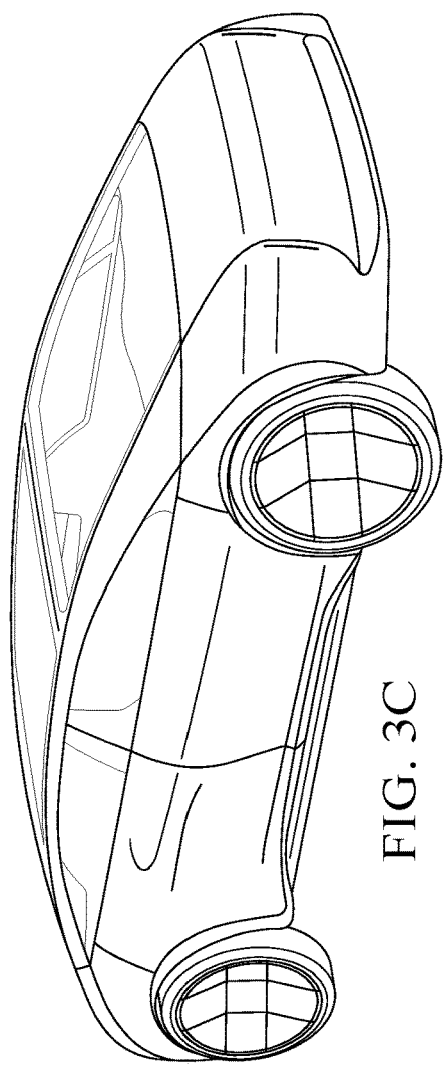
Figure 3D:
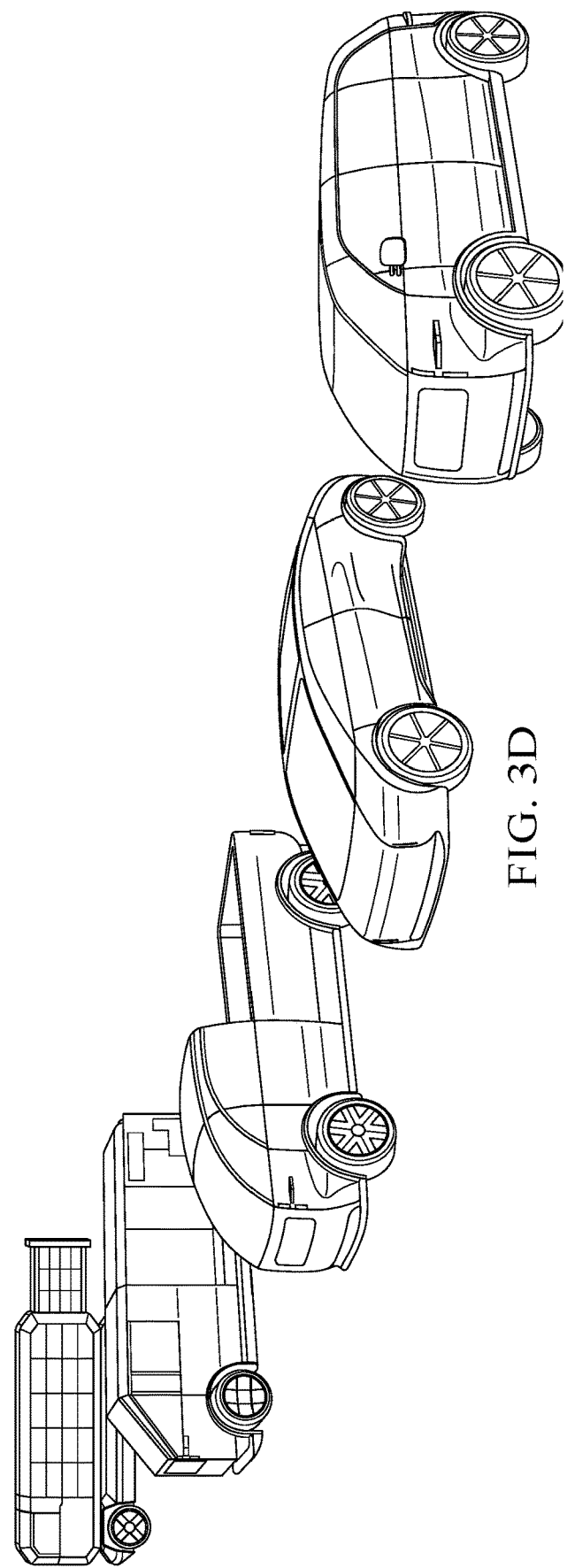

Since many embodiments may be incorporated into any number of vehicle body structures, it is important to understand how and why the various safety systems described herein can be used and/or tuned to the various vehicle bodies to ensure optimal passenger safety. For example, FIGS. 3A to 3D illustrate several embodiments of body structures that can have different effects on the underlying vehicle platform from a functional and a safety standpoint. FIGS. 3A and 3B illustrate an embodiment of a vehicle with a taller and more open concept body or top hat structure that can be dramatically different in terms of impact loads that the vehicle may see in any number of crash scenarios over the embodiment illustrated in FIG. 3C. Likewise, FIG. 3D illustrates other embodiments of vehicles with top hat structures designed for a number of different uses such as cargo transport. Accordingly, such embodiments may be subject to different loads during use which may be subject to different impact scenarios. Thus, the impact features of the embodiments illustrated in FIGS. 3A-3D may necessarily be different even though the underlying platform may have a similar form and structure. Hence, a need for modularity can be required in the different structures.

Figure 4:
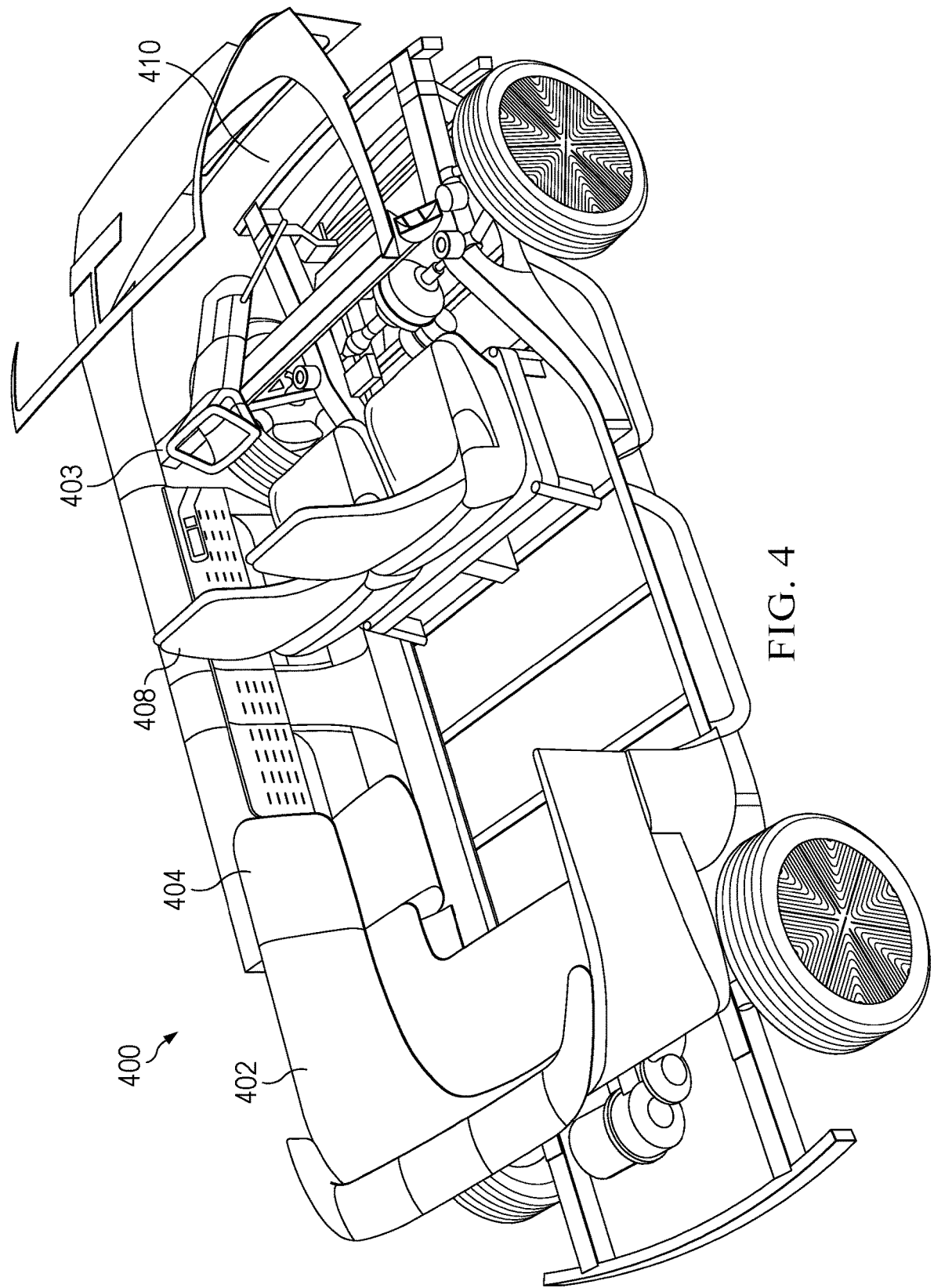
FIG. 4 illustrates a specific example of a passenger compartment in accordance with embodiments.

FIG. 4 illustrates a specific example of a passenger compartment in accordance with embodiments. In accordance with advancements in electric vehicles, many embodiments may incorporate an open passenger compartment 400 where the front portion 410 is relatively minimalistic in that very few interactive components may exist. A steering column 403 may be present with a minimalized dash panel. In some contexts, a minimalist design approach can be beneficial. However, such embodiments can present unique challenges from a safety standpoint that may require further adaptability and tuning to accommodate the various internal design types. As previously discussed, passenger safety is the primary function of the safety features and ensuring that the passenger compartment is not compromised or at least minimal penetration occurs in the event of an accident. Therefore, many embodiments incorporate a variety of features that can help to reduce and or redirect the impact energy seen by the vehicle in any number or crash scenarios with any number of vehicle body types.

Figure 5:
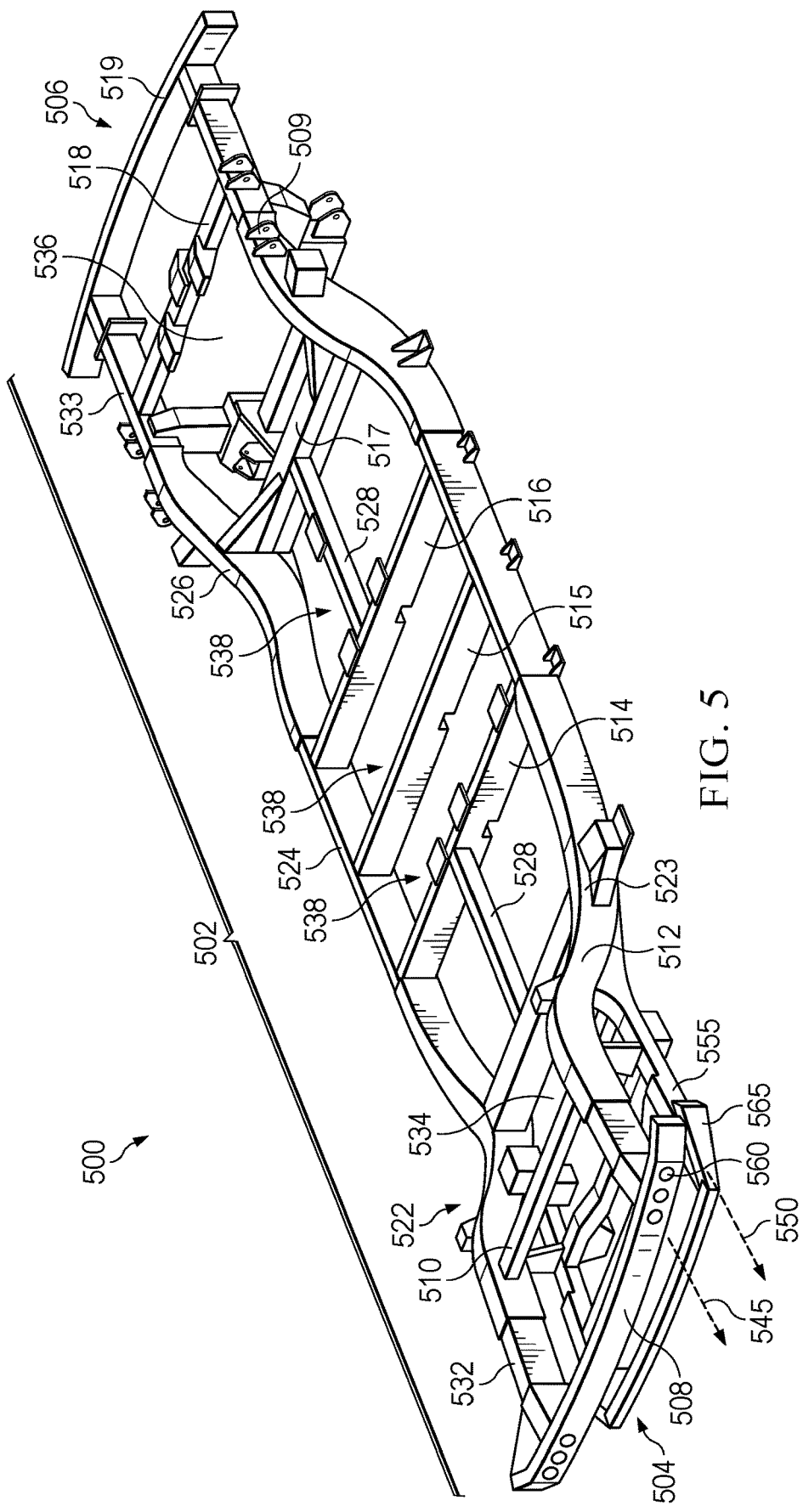
FIG. 5 illustrates an embodiment of a vehicle platform frame.

Referring to FIG. 5 an embodiment of a vehicle platform frame 500 is illustrated. Within the frame 500, are a plurality of interconnected frame elements that may also include a variety of features designed to provide strength and support to the frame, the integrated functional elements of the vehicle platform, as well as the overlying body structure. Additionally, the various interconnected elements may provide strength and rigidity that can be factored into the overall safety of the vehicle. Generally, these structural elements can be divided between left and right frame rails 502 that extend from the front 504 to the rear 506 of the vehicle and define the length of the vehicle, and a plurality of lateral structural cross member elements (e.g., 508, 510, 512, 514, 515, 516, 517, 518, 519) that extend between the frame rails and define the interior width of the vehicle. Although these frame rails and lateral structural elements are described collectively, it will be understood that in accordance with many embodiments they may and are often formed of multiple interconnected structural elements.

In various embodiments, as shown in FIG. 5, the frame rails 502 may be divided into a number of either unitary or separate and interconnected structural members that extend longitudinally between the front and rear ends of the car. Starting at the front 504 of the vehicle platform, left and right front frame rails 522 may extend backward from the vicinity of the front motor support cross member 510. Rearward of the front motor support cross members 510 the front frame rails angle outward and extend rearward passing through the front torque box 523 to meet the left and right mid-body side rails 524. Rearward of the mid-body side rails, left and right rear frame rails 526 (which are either extensions of or joined together with the mid-body side rails) angle inward and extend to the vicinity of the rear motor support cross member 518. For added strength and rigidity a number of laterally disposed cross member structural elements 512, 514, 515, 516 and 517 may extend between the mid-body side and front/rear frame rails (e.g., 522, 524, 526). Although a specific number of lateral cross member structural elements are shown spanning the mid-body side rails in FIG. 5, it will be understood that embodiments may incorporate any number of such cross member structural elements in any number of positions suitable to provide sufficient lateral support to the vehicle platform frame. Furthermore, many of the lateral structural elements can be tuned or adjusted dimensionally to provide additional impact support in the event of a collision. In addition, further inner longitudinal structural members 528 may be provided to further strengthen the inner spaces of the mid-body from collapse in case of front or rear impact. In various embodiments, rails and structural members may be formed of a common structural member (e.g., elements 524 and 538) such that the tooling required for manufacture of the various structural members may be reduced.

Although specific arrangements of structural members, materials and methods of manufacture are described, it will be understood that many possible arrangements of structural members may be implemented that result in the creation of a plurality of inner frame volumes. Specifically, as shown in FIG. 5, lateral structural elements 508 to 512 extending between right and left front frame rail elements 522 define a front body space 534 in and around the front axle of the vehicle platform. Likewise, lateral structural elements 517 to 519 extending between left and right rear frame rail elements 526 define a rear body space 536 in and around the rear axle of the vehicle platform. Between the front and rear body space lateral elements 512 to 517 extending between side rails 522 to 526 define a mid-body space 538, which itself in many embodiments may be formed of a plurality of separate volumes by internal lateral and longitudinal structural elements (as shown by elements 514, 515, 516, and 528 in the embodiment illustrated in FIG. 5). In various embodiments, portions of the front 522 and rear 526 rail elements and respective front 534 and rear 536 body spaces may be elevated relative to the rest of the vehicle frame to accommodate functional drive train components as well as set the optimal height for the impact absorption region. The frame may also include other elements to surround and protect an energy conversion system. Where portions of the vehicle platform frame are disposed at different elevations relative to each other, it will be understood that the horizontal platform plane may take on an undulating conformation, as previously discussed.

Additionally, in order to provide adequate safety of the passengers, embodiments of the vehicle platform frame 500 may incorporate a variety of front/rear and side impact crumple zones. For example, frame rails in the front 532 and rear 533 in conjunction with front 508 and rear 519 crossmembers may work in concert as impact absorption/deflection zones to absorb or redirect an impact that occurs on either the front or rear of the vehicle. The impact absorption/deflection zones may incorporate a variety of features that are known in the art including, but not limited to, being made of an energy absorbing material, or being otherwise configured to crumple or deform when subject to an impact. Various materials may be used in the manufacture of the vehicle platform frame 500 including, for example, steel, aluminum, titanium, metal alloys, composite material, carbon fiber, and various combinations thereof. Some embodiments may utilize a honeycomb pattern and/or structure to provide additional energy absorption zones. Many embodiments may utilize a variety of bonding techniques to connect the various components, such as, for example, welding and/or bolting. Additionally, some components may be manufactured in any manner suitable to produce a portion of the framework that meets the desired outcome in terms of strength, function, and/or appearance. Furthermore, it should be understood that many embodiments described herein may be adaptable or tuned to accommodate a variety of different vehicle configurations that may require different loads as well as a unique number and combination of safety features.

The various embodiments described herein illustrate a vehicle platform that dramatically increases design flexibility while maintaining essential comfort and safety requirements. Embodiments further illustrate the adaptability of the vehicle platform to a variety of operational environments that may require a variety of different safety features. While the current disclosure may focus on a number of different functional and safety elements as individual sections for clarity, it will be understood that vehicle platforms according to embodiments may combine, include or omit any of the described functional and safety elements as desired by a specific vehicle design Embodiments Implementing Front Impact Zones Referring to the front 504 and rear 506 spaces, many embodiments may incorporate a variety of safety features and/or elements designed to absorb the energy from an impact. For example, the front space 504 may have an upper load path 545 and a lower load path 550 each of which will take on a different load in the event of a vehicle impact. The load paths as described herein refer to the path in which energy is directed during an impact event. As a vehicle can be exposed to any number of impact types, the different load paths can be designed to operate in a variety of manners to help absorb and deflect the energy of the impact. For example, in the United States, the Insurance Institute of Highway Safety (IIHS), as well as the National Highway Traffic Safety Administration (NHTSA), routinely performs a number of vehicle impact tests to evaluate the safety features on vehicles. A zero degree full frontal impact test as well as partial overlap tests are generally performed on the front passenger and driver sides of the vehicle. The IIHS evaluates, among other things, the amount of passenger compartment penetration in such tests and looks at the various structural elements that helped prevent or failed to prevent such penetration. Additionally, the IIHS performs similar side impact tests looking at similar penetration aspects. Regulators in other countries perform similar safety tests applicable to vehicles sold or distributed in those jurisdictions.

The many frontal impact tests illustrate that the front portion of a vehicle can experience high-energy absorption and thus many embodiments may require higher energy absorption over a short distance when the front motor compartment length is reduced. Thus, many embodiments may implement a rigid barrier such as the upper rail elements 532 to perform the high-energy absorption early on in a frontal impact. However, it is undesirable for the load path to experience the stack-up resulting when energy absorption has bottomed out or reached peak during the impact event. Therefore, many embodiments may utilize an additional lower load path structural element 555 configured to engage at the beginning of the impact event and stay engaged up to a desired point from which it can then disengage from the impact direction. The disengagement can aid in removing the vehicle from the direction of the impact, for example, by deflection of the impact and direct the vehicle away from the impact.

The lower load path element 555, in accordance with many embodiments, may function atypical from that of a traditional feature. Traditional features tend to be designed to break away from the framework and act as deflectors by disconnecting from the frame. In contrast, many embodiments may utilize a lower load path that can maintain a connection with the vehicle framework structure while absorbing impact energy and deflecting impact energy. The deflection component can work in conjunction with the frontal impact component during a full frontal impact as well as deflecting during an offset or partial offset impact.

Figure 6A:
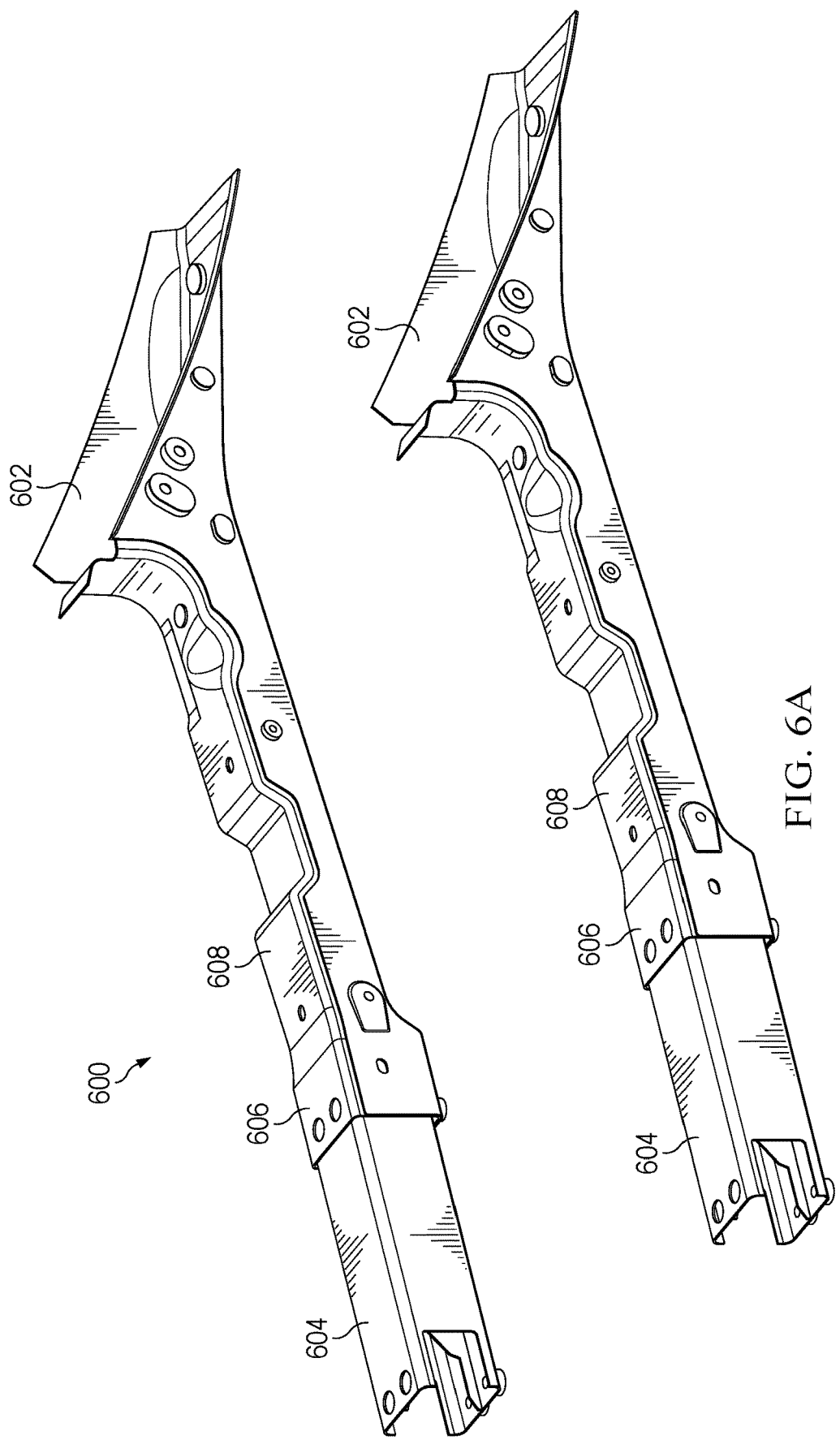
FIGS. 6A and 6B illustrate an embodiment of a lower load path element, while FIGS. 6C-6F provide an illustration of a sequence of impact energy absorption that may occur during a vehicle crash
Figure 6B:
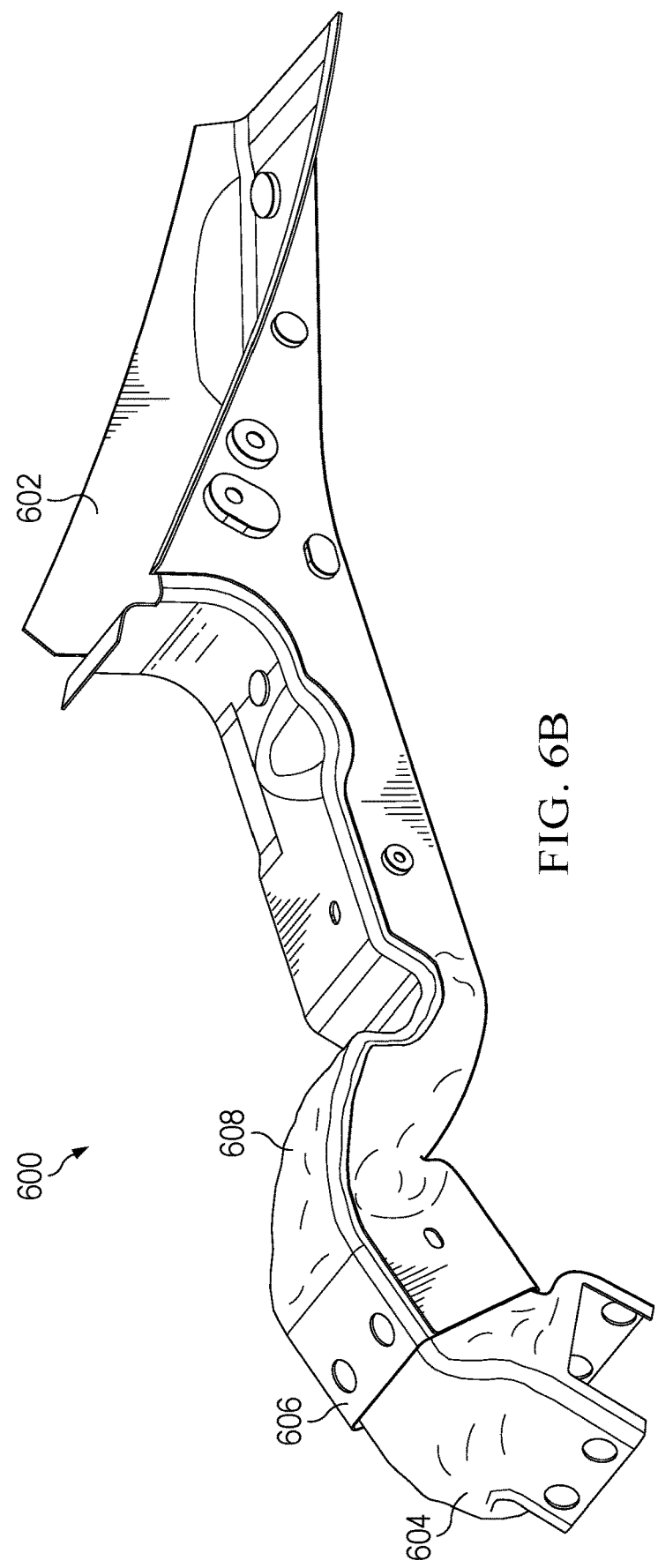

Referring now to FIGS. 6A and 6B, an embodiment of a lower load path element 600 is presented. In many embodiments, the lower load path element 600 may be connected to and removable from a portion of the frame 602 that has a fixed length and the lower load path element may have multiple key elements designed to absorb the energy from an impact in different ways. For example, the front portion of the lower load path may be configured with a lower load path crush zone element 604 that is designed to crush during an impact. The crush zone element 604 may have a controlled deformation similar to a traditional crumple zone; however, the crushing may only occur over a desired range or distance. In accordance with many embodiments, the desired crush distance can be controlled by various elements such as the material, overall shape and design, and some embodiments may utilize a crush control element 606. The crush control element 606, in accordance with many embodiments, is designed to keep the crushing within a desired crush zone before transmitting the impact forces into any additional element. This can help to prevent the undesirable stack up that can often occur in a typical crumple zone. In accordance with some embodiments, the crush control element 606 can be tuned or adjusted in dimensions and/or materials in order to achieve the desired level of stack up. Once the lower load path crush zone 604 has reached the desired crush distance a bending element 608 can then designed to bend the lower load path element 600 in a direction that can help move or adjust the vehicle away from the direction of impact. Furthermore, such elements can help to reduce or eliminate the impact on the frame structure 602 thereby allowing for increased safety. As previously mentioned, the lower load path element can be removable from the framework. Such adaptability and modularity of elements can be appreciated from a variety of viewpoints including different vehicle body designs as well as vehicle maintenance.

In accordance with many embodiments, the length of the crush zone 604 and control element 606 can be adjusted or tuned to account for the change in forces that may vary with the number of top hat configurations that the vehicle may assume. FIG. 6B illustrates a lower load path element 600 after it has undergone an impact. It can be seen the crush zone 604 is compacted and the bending element 608 has been deformed in such a way to minimize damage to the vehicle. This can be an important part of frontal crash elements. Accordingly, many embodiments of frontal crash elements may incorporate different configurations of lower path crush elements to reduce the amount of impact that occurs and reduce the risk of an impact affecting the passenger compartment.

FIGS. 6C-6F provide an illustration of a sequence of impact energy absorption that may occur during a vehicle crash. For example, FIG. 6C illustrates a lower load path 600 prior to the introduction of impact energy and an arrow 610 that indicates the direction of the impact energy. FIG. 6D illustrates the initial crumpling that may occur in the crush zone 604 and how the control element 606 can limit the amount of crumpling that can occur before the energy is transferred into the bending element 608. FIG. 6E further illustrates the bending element 608 allowing for bending to occur over a desired range such that the impact energy does not adversely affect the portion of the frame structure 602. This can be important in the function for any vehicle since frame damage can have lasting effect on vehicle functionality. Furthermore, by reducing the effects of the impact on the frame, the use of crush zones, control elements, and bending elements, can help reduce the effects on the passenger compartment. Finally, FIG. 6F illustrates an embodiment of a final state of the lower load path after the absorption of the impact energy 610. It can be appreciated, that numerous embodiments can incorporate impact control features along lower load paths to help protect the frame and passenger compartment.

The lower load path element illustrated in FIGS. 6A-6F can help to take advantage of many things found in an electric vehicle and/or an electric vehicle platform as described in the many embodiments illustrated herein. For example, as illustrated in some embodiments the upper body can be expanded to the near extremes of the platform and increase the volume of space within the passenger compartment. Such expansion can be supported by the modularity of the various embodiments described herein. Furthermore, the lower load path element, in many embodiments, can help to prevent passenger compartment penetration over a shortened distance from a shorter motor compartment. This can allow for a smaller overall footprint of a vehicle yet capitalize on the available space within that footprint and drastically improve the design capabilities of a body for the platform.

Figure 6H:
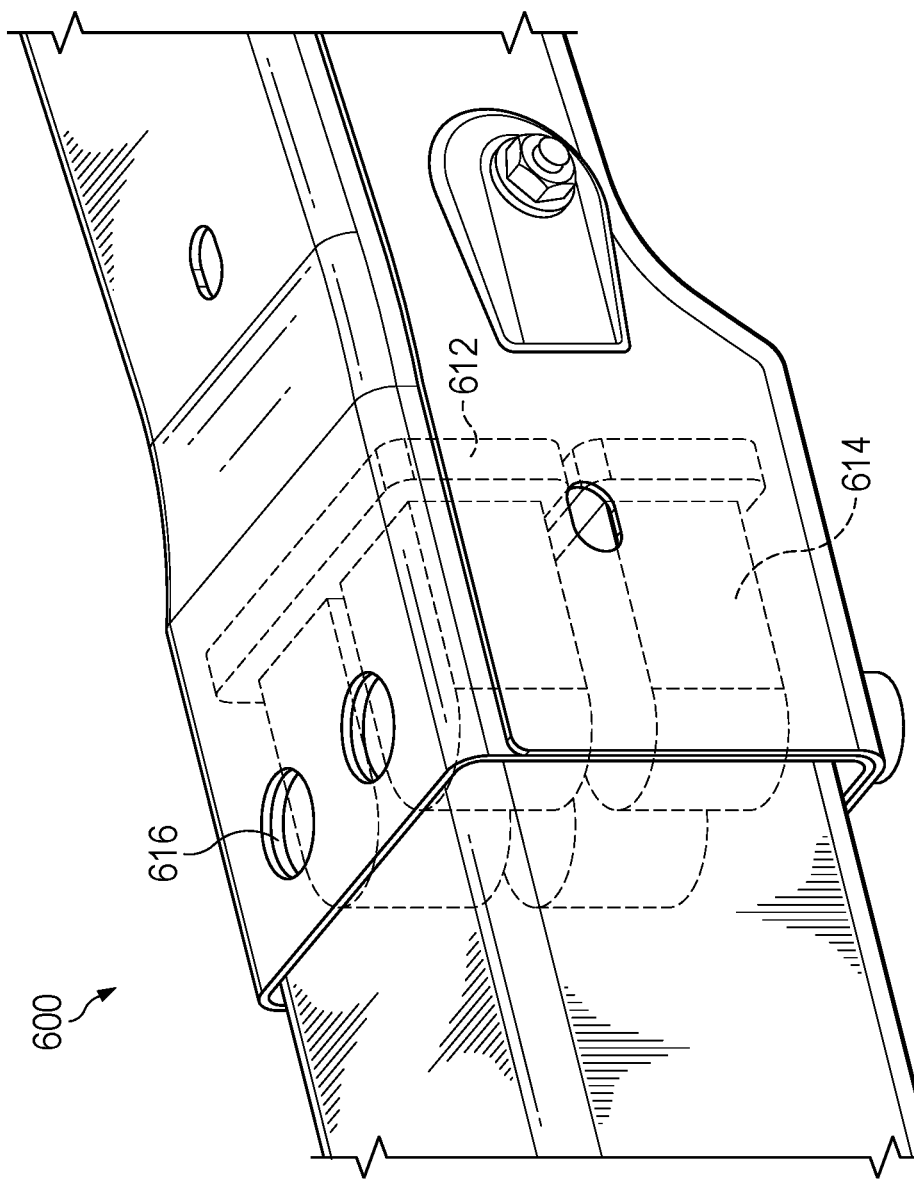

Turning now to FIGS. 6G-6H, embodiments of a crush control element 606 can be seen within a lower load path. As described above, the crush control element 606 may be positioned within the lower load path 600 such that it aids in reducing the amount of compaction that the portions of the vehicle frame will ultimately see during impact. In many embodiments, the control element 606 is placed in an interface between the crush zone 604 and the bending element. As can be appreciated, some embodiments may incorporate an overlapping interface such that a portion of either the crush zone 604 or bending element cooperatively engages with the other. In many embodiments, the control element 606 may be placed within that engagement section.

Additionally, as previously discussed the length and/or size of the crush control element 606 can be adjustable to account for the variety of different vehicle configurations. For example, in some embodiments, the crush control element may be comprised of an upper 612 and a lower 614 component. Each of the upper 612 and lower 614 components can be configured to have a variety of designs that allow for reduced weight and improved strength in accordance with many embodiments. Additionally, many embodiments may incorporate one or more mounting holes 616 that run through the crush control elements such that the crush control element 606 can aid in securing the crush zone portion 604 to portions of the vehicle frame along the lower load path. In some embodiments, the crush control element 606 can be secured with bushings or bolts or any number of securing elements sufficient for the desired operation of the crush zone. It can be appreciated that the mounting method and/or position of mounting holes can vary depending on the configuration of the crush control element 606 and the overall desired impact resistance of the lower load path. It can be appreciated that various embodiments may use any number of materials and/or material combinations for the various elements of the lower load path structure such as metal, plastic, and/or composite.

Referring back to FIG. 5, many embodiments of the front zone of the frame 504 may, as previously described, have a variety of crash features or impact protection features. For example, the upper load path 545 may have crumple zone or crush components built into the various structural elements such as the upper front frame rails 532. Such elements can be essential to a frontal impact and having multiple crush elements can help to quickly absorb the energy from a frontal impact. However, as mentioned some impacts can occur at an offset to the front of the vehicle. As such, the IIHS performs offset crash tests to evaluate the impact on the passenger compartment. Accordingly, many embodiments may incorporate deflector elements (560 and 565) into the upper and lower load path components. The deflectors, according to many embodiments can absorb a portion of the impact along the load path but then act primarily to deflect the vehicle away from the primary direction of the impact. It is more desirable to limit the interaction with a shallow offset rigid barrier and disengage the vehicle from the barrier as quickly as possible. Therefore, many embodiments may implement a deflector system.

Figure 7:
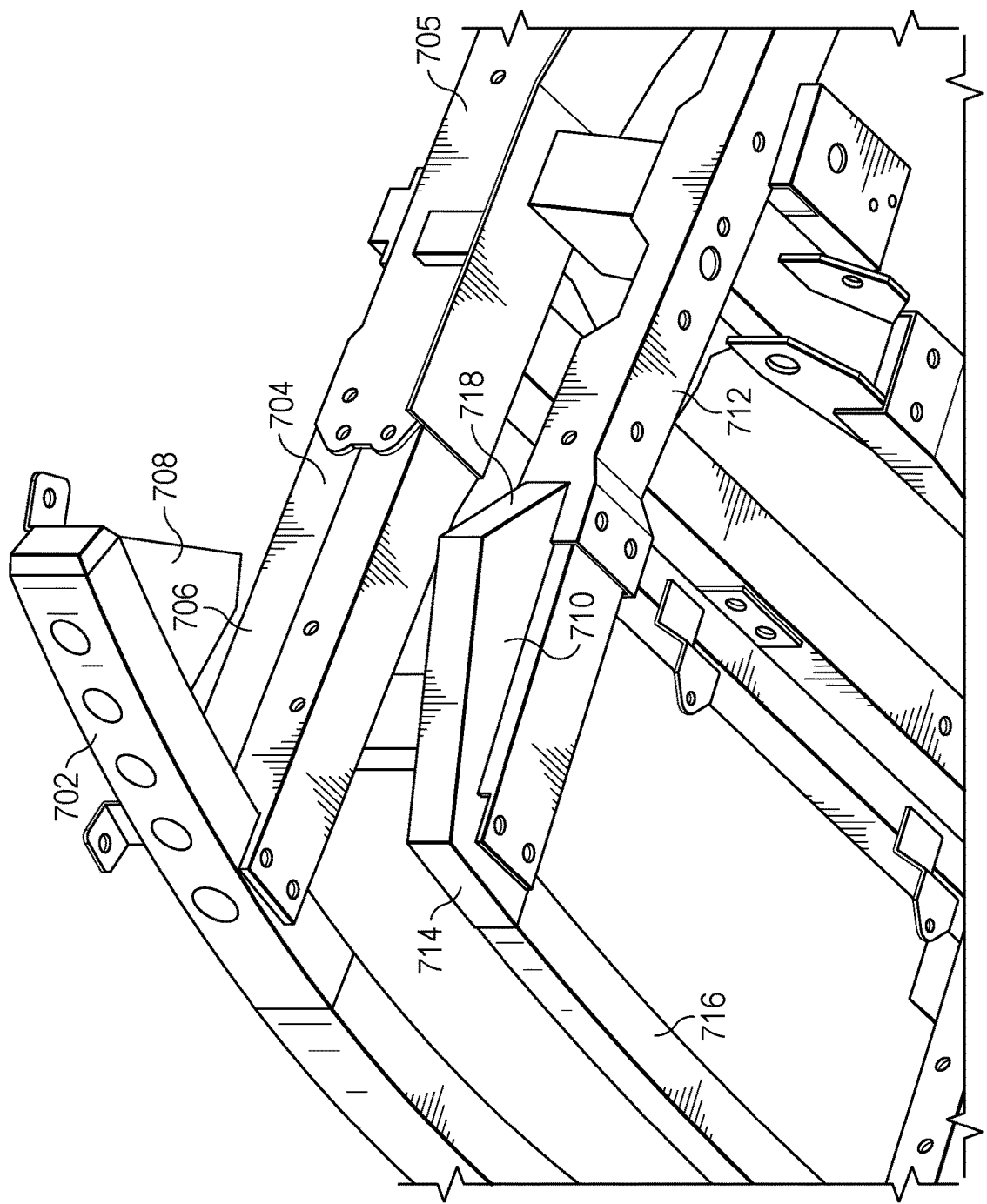
FIG. 7 illustrate embodiments of a front portion of a framework for an electric vehicle platform.

Referring now to FIG. 7, embodiments of a front portion of a framework for an electric vehicle platform can be seen. FIG. 7 illustrates a closer view of an embodiment of an upper and lower load path deflector 702. The upper deflector 702, in many embodiments, may be attached to and extend outward from an upper impact beam 704 or away from the centerline of the vehicle. In many embodiments, the upper impact beam 704 may be connected to a portion of the vehicle framework 705 by some type of fastening mechanism such as welding, bolts, or other suitable connector. It can be appreciated that many embodiments may use a removable fastener method to allow for the improved modularity of the design and further allow the upper impact beams to be removed or replaced if damaged or if a new vehicle design is desired. Additionally, the upper impact beam 704 may be configured to receive a number of different impact loads and in accordance with various embodiments may be designed to crush or crumple a certain distance and minimize the impact to the vehicle framework 705. Accordingly, similar to the lower load path element illustrated in FIGS.

6A-6G, embodiments of the upper load path may incorporate an upper crush control element that sits at an interface between the framework 705 and the upper impact beam 704. It can be appreciated that various embodiments may use any number of materials and/or material combinations for the various elements of the upper load path structure such as metal, plastic, and/or composite In many embodiments, the upper deflector 702 can be contoured to match the body of the vehicle. As shown in FIG. 7 many embodiments may keep a space 706 between the outer portion of the upper deflector 702 and the upper impact beams 704. In some embodiments, this space 706 may be reduced by way of a spacer element 708. The spacer element 708 in many embodiments may be a rigid element that may be formed or attached to the upper deflector 702. The spacer 708 may take on any number of desired shapes such as a triangular shape as an example. The intent of the spacer is to allow for the impact energy from an offset impact to instigate a bending moment on the upper deflector to the point where the spacer influences the upper impact beams. Having absorbed some energy, the impact between the spacer 708 and the upper impact beams 704 can then act to redirect the energy from the overall impact to deflect or push the vehicle away from the source of the impact such as a rigid barrier.

Figure 8B:
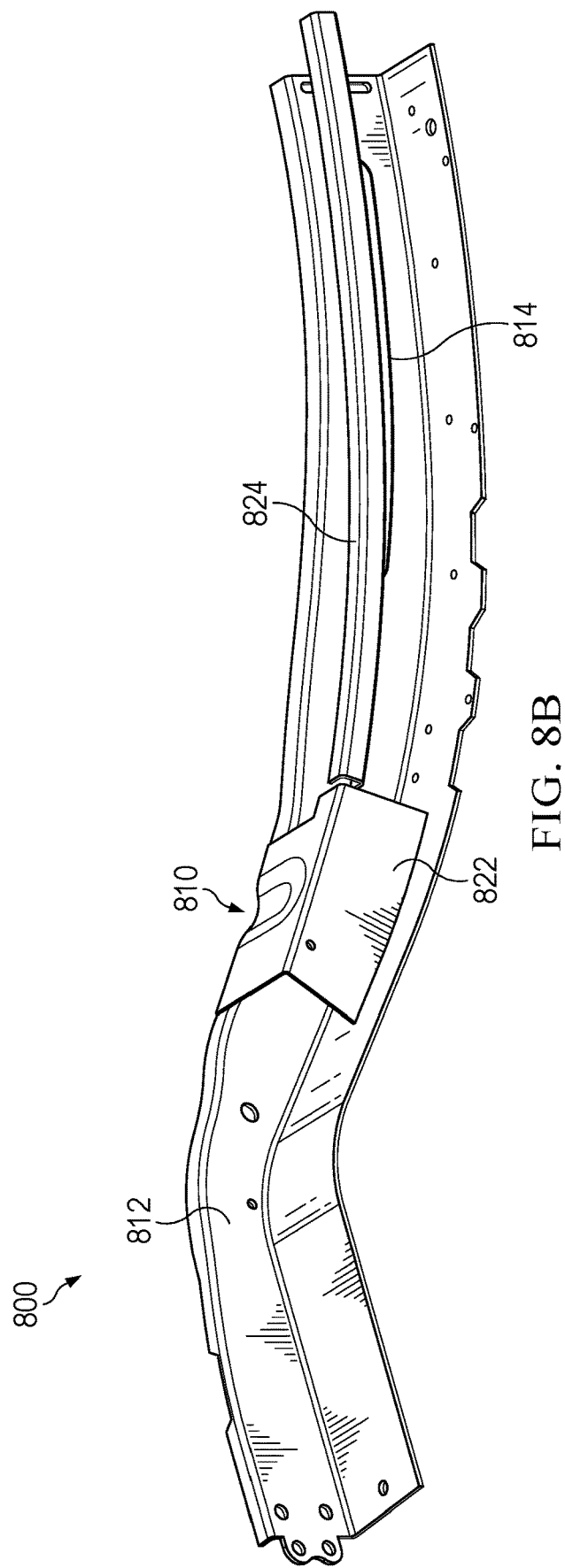

The upper deflector 702 in some embodiments may be designed to act in conjunction with the lower deflector 710. The lower deflector 710, in many embodiments, may be a rigid element that is attached to the lower load path impact beams 712. In many embodiments, the lower deflector 710 may have a pre-shaped portion 714 that engages with the front portion of the lower load path impact beam 712, may be connected with a front crossbeam 716, and may extend rearward and outward at an angle away from the front of the vehicle. In some embodiments, the lower deflector 710 may be attached to the lower load path impact beam 712 by way of a connection bracket 718. It can be appreciated that both the upper and lower deflectors 702 & 710 can be removed as needed. Additionally, in some embodiments the lower deflector may have a variety of different shapes that may coincide with the shape of the upper deflector 702. Many embodiments of the lower deflector may be designed to redirect the energy from an offset impact to push the vehicle off the impact source as quickly as possible. In many embodiments, the angle of the lower deflector may be parallel to the angle of the bent upper deflector. In other words, when the upper deflector 702 has been deformed or bent to the point in which the spacer 708 affects the upper impact beam, the brunt of any remaining impact force can then be directed to the lower deflector 710 and lower impact beam. Alternatively, when the lower deflector 710 is engaged first the upper deflector 702 can be configured to bend in conjunction with the contact. Once the engagement with the lower deflector is nearing completion, the upper deflector spacer 708 may contact the body elements and continue to deflect the vehicle. Pairing the angles of the upper and lower deflectors can help to quickly push the vehicle away from the source of impact smoothly between two separate but sequential pushes between the lower and upper deflectors. This can ultimately help to reduce the potential penetration into the passenger compartment. Although, a specific embodiment of deflectors is shown, it should be understood that the deflectors could be tuned to accommodate any number of impact loads that may be seen in accordance with any number of upper body component used. Additionally, in accordance with many embodiments, the impact components such as the spacer 708 and other deflector elements can be manufactured from any number of materials including metal, composite, carbon fiber, etc. Moreover, in many embodiments may have elements manufactured of materials similar to other portions of the framework. It should be appreciated that many embodiments of an electrical vehicle platform may incorporate one or more impact features described in relation to the front impact zone. It can be appreciated that various embodiments may use any number of materials and/or material combinations for the various elements of the upper and lower deflectors such as metal, plastic, and/or composite Referring back to FIG. 5, some embodiments may also incorporate additional crash or impact protection elements that may be incorporated into the rear and/or front frame rails (522 and 526 respectively). For example, referring now to FIGS. 8A and 8B, cross sectional views of a transition rail 800 is presented. The transition rail 800 may serve as a transition between the front/rear portions of the vehicle framework and the center section. In numerous embodiments of a vehicle framework structure, the transition rails 800 can be configured to absorb impact energy in a variety of ways. For example, some embodiments, as illustrated in FIG. 8A, may include a number of bulkhead elements (802, 804, 806, & 808) that are positioned central to the rail elements near a transition point 810 between the upper rail portion 812 and a mid-body rail portion 814. The transition element can be a predefined stress reducer to allow for some minimal compaction to allow impact energy to be transferred to the bulkhead elements. The bulkhead elements (802, 804, 806, & 808) may be positioned such that there is a space 816 between each of the bulkheads positioned in the transition region. The bulkheads, in accordance with many embodiments, can act as a stopping mechanism that reduces the bending or crumpling from an impact. For example, a frontal impact may cause a bending or crumpling to occur along the length of the rails. The bulkheads, in many embodiments can add strength and stiffness to the rails such that during the impact, the front and rear bulkhead can be designed to touch or connect by filling the space 816 between the bulkheads. This can aid in stopping or reducing the effects of the impact. Essentially, the bulkheads can help to control and reduce the intrusion into the passenger compartment. Although a certain spacing between the front and rear bulkhead elements is shown, it should be recognized that the spacing might be adjusted by any number of methods to accommodate a variety of impact loads. Accordingly, as the body of the vehicle changes the space as well can be adjusted.

As illustrated in FIG. 8A, the bulkheads may be comprised of multiple components. The front bulkhead may have two parts (802, 804) that are designed to cooperatively engage one with the other yet in the event of an impact the front two bulkhead elements (802, 804) may barely contact or not contact at all. In other embodiments, the two bulkhead components may be bonded together in such a manner that they remain in contact with each other before and during the impact. In some embodiments, the two front bulkhead components may have one or more flanges (818, 820) designed to overlap various interconnection points between the two components. For example, one or both may have a flange portion that overlaps a portion of the rail such that it may form a connection point between the bulkhead elements and the rails. Such attachment flanges may be present on both the front and the rear bulkhead elements. Although a specific design of the front and rear bulkhead elements is illustrated, it should be understood that the design, overlap, layout, connections, and/or material used for the bulkheads could vary in accordance with the safety requirements. Moreover, it can be appreciated that many embodiments may adjust the configuration, size, shape, and/or position of the bulkhead elements to account for any number of impaction loads. Similar to the other frontal impact elements, the use of bulkhead elements within the rails can help maintain desired safety requirements while taking advantage of the many characteristics of electric vehicles including maximizing the use of space in the passenger compartment.

Other embodiments may implement additional or modified bulkhead elements within the rails. For example, FIG. 8B illustrates a cross sectional view of rail elements with modified bulkhead components 822. Some embodiments may incorporate the transition point 810 or a bending point within the modified bulkhead. The bending point 810 may be an indentation within the rail and/or the bulkhead 822 or some other feature that is intended to allow for bending so as to transfer the impact load away from the main structure. In various embodiments, the modified bulkhead can extend between the upper and mid-body rails (812 & 814) thereby acting as a connection element that can serve as both a strengthening component as well as an impact absorption device within the rails. Some embodiments may also use a longitudinal bulkhead 824 that runs along a longitudinal axis of the rail. In other embodiments, the longitudinal bulkhead 824 may be placed in any one of the rails where a potential impact may occur. Moreover, although many embodiments exhibit vehicle impact features that may be included or omitted in vehicle platforms as described in the application, it will be understood that various combinations of such features may be used in any number of vehicle designs. Thus, it can be appreciated that many embodiments may utilize a variety of different bulkhead elements and bulkhead configurations to reduce the overall effects of a vehicle impact. It can be appreciated that various embodiments may use any number of materials and/or material combinations for the various elements of bulkhead support structures, such as metal, plastic, and/or composite The above-discussion has focused on highlighting the characteristic features of embodiments of front impact zones suitable for applications in a wide-variety of vehicle designs. In the sections that follow, focus will be placed on embodiments of specific configurations of rear and side impact safety components that may be implemented separately and in combination to achieve the desired functionality and safety performance Embodiments Implementing Rear Impact Zones Referring back to FIG. 5 in relation to the overall frame of a vehicle platform, many embodiments have rear crush rails 533 and left and right rear frame rails 526 that are designed to absorb and/or deflect the energy from a rear impact. A rear impact can come from any number of events, including an oncoming vehicle while one is moving or stopped or the rearward movement into another moving or stationary object. Accordingly protecting the passenger compartment from rearward penetration can be just as important as from the front. This is especially true under the context of many embodiments of the vehicle platform that maximizes the occupant space. As previously mentioned, the maximization of space creates shorter front and rear drive train compartments that present unique challenges in designing adequate safety features. The forward and the rearward portions 504, 506 may in some embodiments be strengthened to provide increased safety but without the added weight that can dramatically affect the efficiency of the vehicle operation.

Figure 9A:
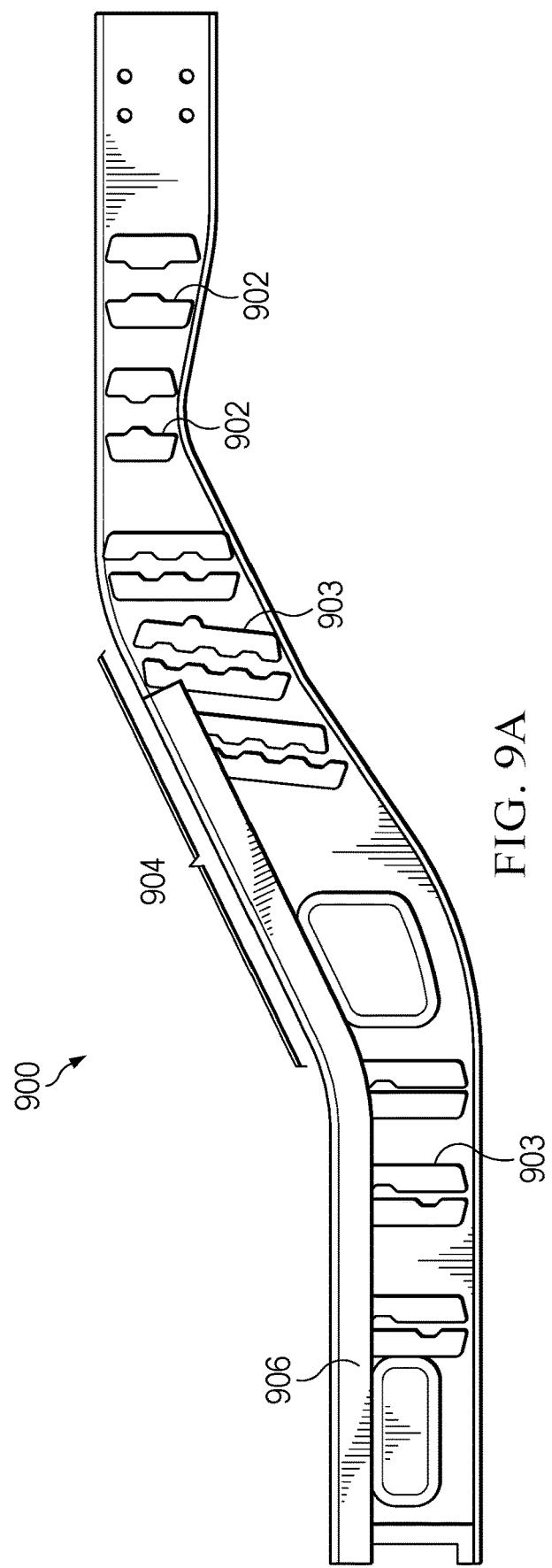
FIGS. 9A and 9B illustrate an embodiment of the rear frame rails.
Figure 9B:
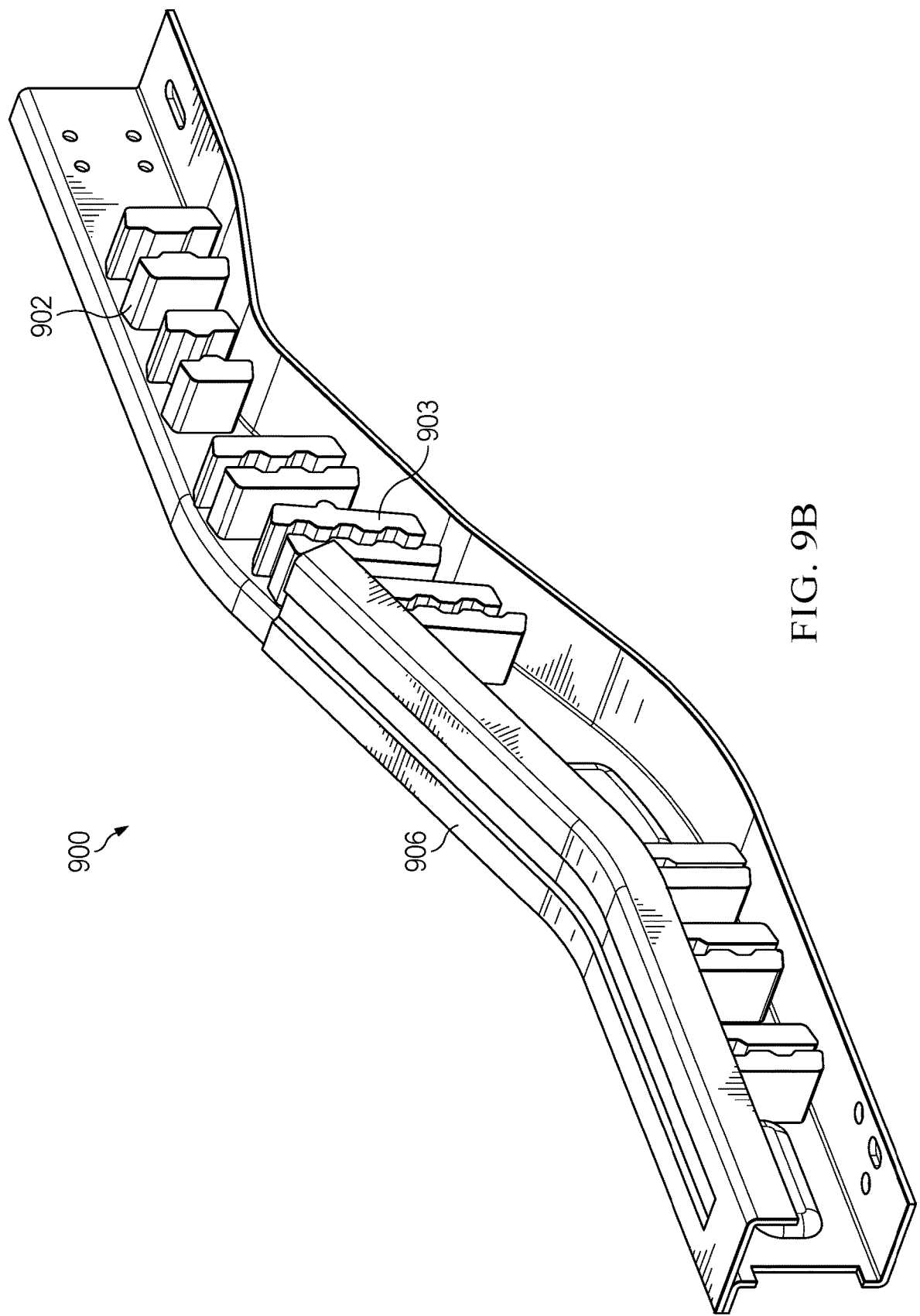
Figure 10:
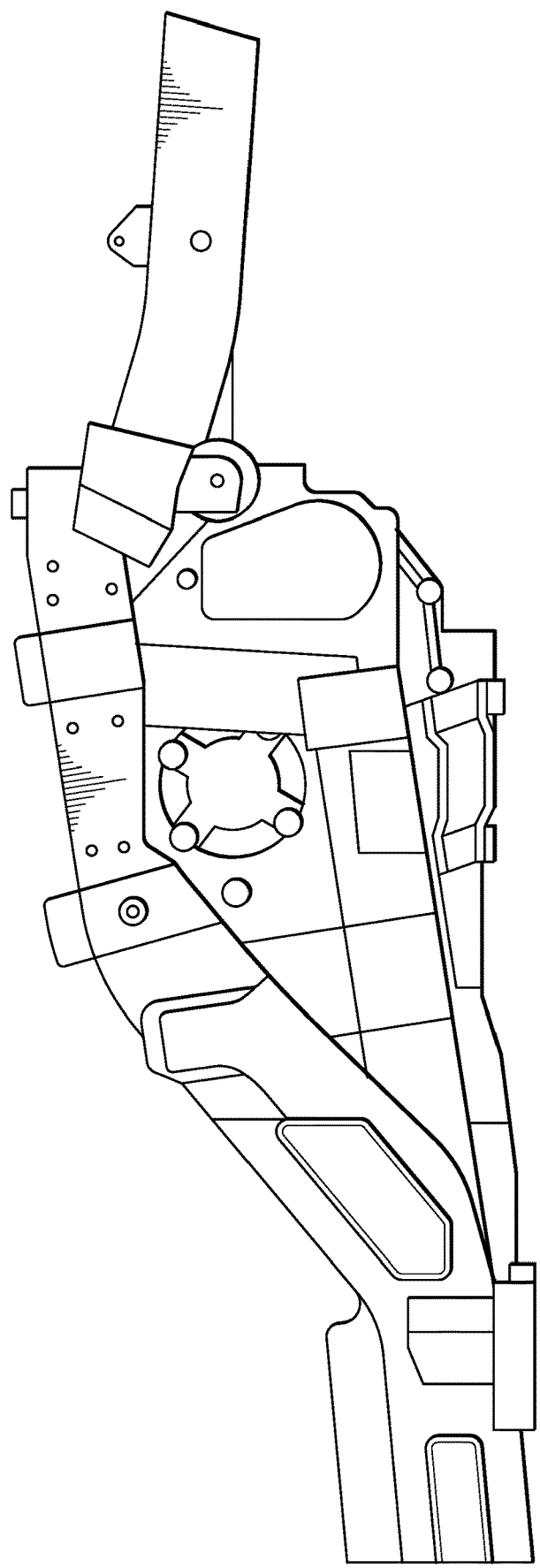
FIG. 10 illustrates the effectiveness of a reinforcement patch.

Referring now to FIGS. 9A and 9B, an embodiment of the rear frame rails is illustrated in several cross sectional views. In some embodiments, it may be desirable to reduce the overall weight of the vehicle platform while maintaining the necessary strength to functional components of the overall vehicle. Some embodiments may incorporate multiple reinforcement bulkheads 902 along the length of the inner portion of the rear frame rails 900. The reinforcement bulkhead 902 according to embodiments can help to strengthen and stiffen the frame rails 900 in two different scenarios. First, the bulkheads 902 that may be positioned near the rear of the vehicle can be positioned such that they provide added stiffness and strength to the rails 900 to support the rear suspension system. Additionally, the rear most bulkheads can add stiffening material to help absorb impact energy from a rear impact. Likewise, the other bulkheads 903 that run forward along the length of the rear frame rail 900 may be positioned at various intervals to add strength and stiffness to the rear frame rail 900. The additional bulkheads, in accordance with many embodiments, can add additional strength and stiffness to the rear rails to minimize bending and compaction along the length of the rails during a rear impact. It can be appreciated from FIGS. 9A and 9B that the reinforcement bulkheads 902/903 may be positioned along the centerline of the rail 900 and may be sandwiched between an outer wall and an inner wall. Although a specific arrangement of bulkheads is illustrated, it can be appreciated that any configuration of bulkheads within the rear frame rail 900 may be used to strengthen and stiffen the rails without dramatically increasing the weight of the vehicle. In many embodiments, the bulkheads may be manufactured by a variety of methods including stamping, molding, casting, and/or forming both cold and hot. Likewise, the bulkheads may be made from any number of materials including metallic, carbon fiber, composite, etc. Furthermore, many embodiments may utilize a variety of combinations of bulkhead elements within the rail. For example, some bulkheads may be concentrated within the rear most portion while other embodiments may place more emphasis in the undulation or central portion of the rail. This can allow for a wide range of impact scenarios to be considered and can allow for a wide range of vehicle configurations to be achieved.

The impact energy can be absorbed in any number of ways and through a variety of components during an impact. Therefore, as has been emphasized throughout, the protection of the passenger compartment is a key element in the safety features of a vehicle. Illustrated in FIGS. 9A and 9B the rear frame rails have an offset undulation 904 along the length of the rail 900. This can also be true for embodiments of the front portion of the vehicle as shown in FIG. 5. The undulation 904, in accordance with various embodiments, can help to increase the space in the passenger compartment while providing adequate space in the vehicle platform to support addition functional elements. However, the undulation 904 can create a stress point along the length of the frame rails 900 and may require additional stiffness. While traditional vehicles may add thickness to the rails, many embodiments of the platform may incorporate an overlapping reinforcement patch 906. The reinforcement patch 906 can act as a stiffener to the rail 900 in the event of a rear impact. In some embodiments, one or more reinforcement patches can be used to improve the overall strength of the undulation or offset. It can be further appreciated that the reinforcement patch 906 can have any number of configurations. For example, some embodiments may have one or more elongated patches. Additionally, various embodiments may vary the length of one or all of the reinforcement patches 906 to adjust the energy absorption capabilities of the rear impact zone.

The added stiffness, in many embodiments can help prevent the rear drive train and other functional components from bending up and into the passenger compartment. Likewise, such patches can help to reduce the buckling seen by the rails in a rear crash. In accordance with many embodiments, the effectiveness of a reinforcement patch can be illustrated by FIG. 10. As shown, a small buckling zone or minimized buckling is illustrated in the undulation of the frame after a simulated rear impact. Such reduction in buckling is highly desirable with respect to prevention of damage to the passenger compartment. Many embodiments, function to improve impact energy absorption and thus reduce the effect of the impact on the passenger compartment. This helps to ensure a safer vehicle for the passengers. Moreover, although many embodiments exhibit vehicle impact features for the rear of the vehicle. It will be understood that various combinations of such features may be included or omitted as required by the specific vehicle design.

Embodiments of the Battery Compartment Impact Protection

Figure 11:
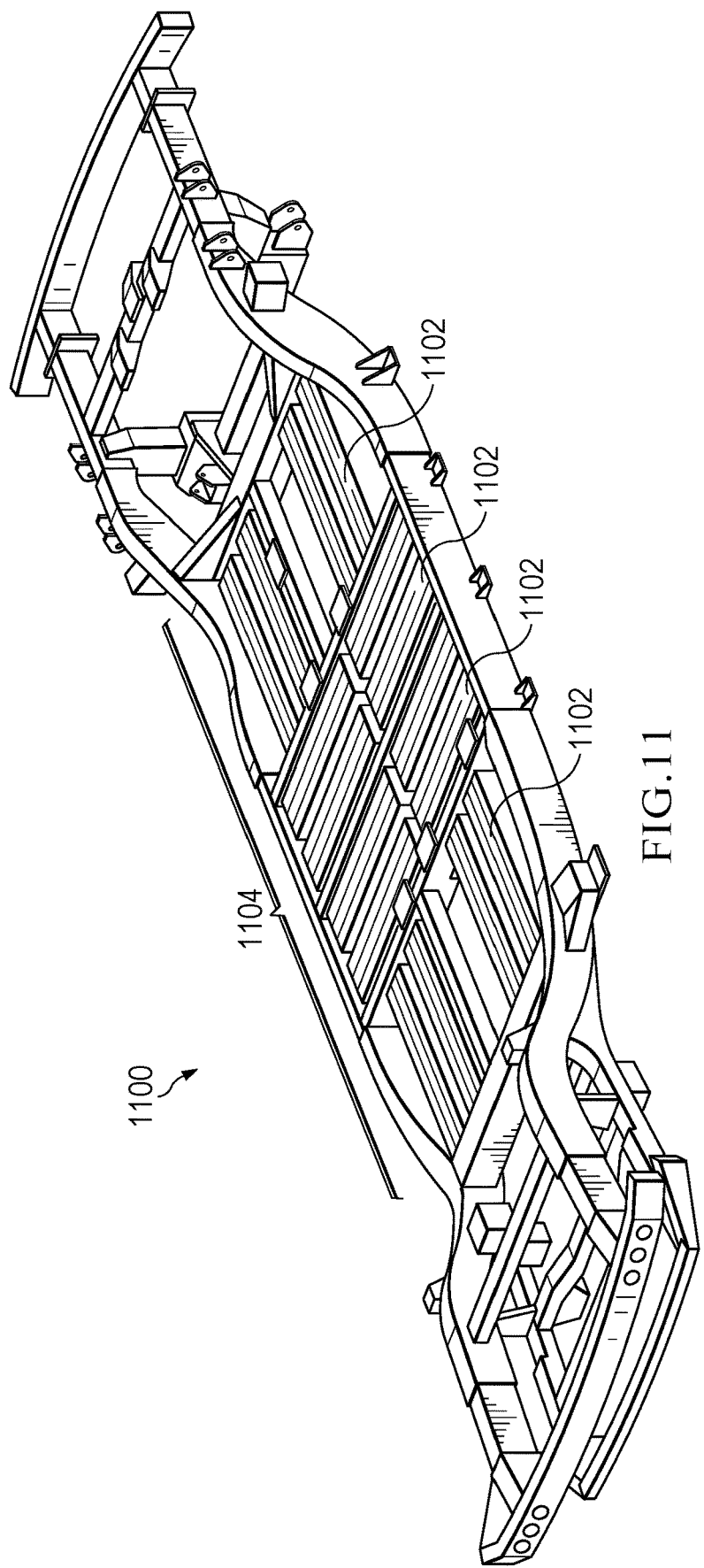
FIGS. 11 to 16 illustrate elements and components configured for the protection of the battery compartment in a vehicle platform.

In addition to implementing impact control features in the front and rear of a vehicle, it can be of even higher importance to consider the potential for a side impact of a vehicle. As discussed above, in many embodiments of a vehicle platform, the battery compartment or energy storage compartment can be positioned in an interior space and can be vulnerable from side impact. Referring now to FIGS. 11 to 16, elements and components configured for the protection of the battery compartment in a vehicle platform are presented. FIG. 11 illustrates an electric vehicle platform fame 1100 with an energy storage system 1102 located on an interior space 1104 of the framework. Such placement, on the mid-point of the vehicle and at the vehicles lowest point is advantageous for a number of reasons. The energy storage system for most alternative fuel vehicles (whether pure electric or fuel cell) typically comprises a large proportion of the weight of the vehicle. By placing this heavy component mid-vehicle and as close to the ground as possible, the center of gravity of the vehicle is shifted closer to the road. This low center of gravity tends to improve the handling characteristics and roll over resistance of the vehicle. However, placing the energy storage system this close to the ground also creates potential hazards. In both fuel cell and battery, electric vehicles the energy storage components can combust if they are damaged, either during a collision or through impact resulting from a road hazard, such as penetration of an object into the containment vessel.

Figure 12:
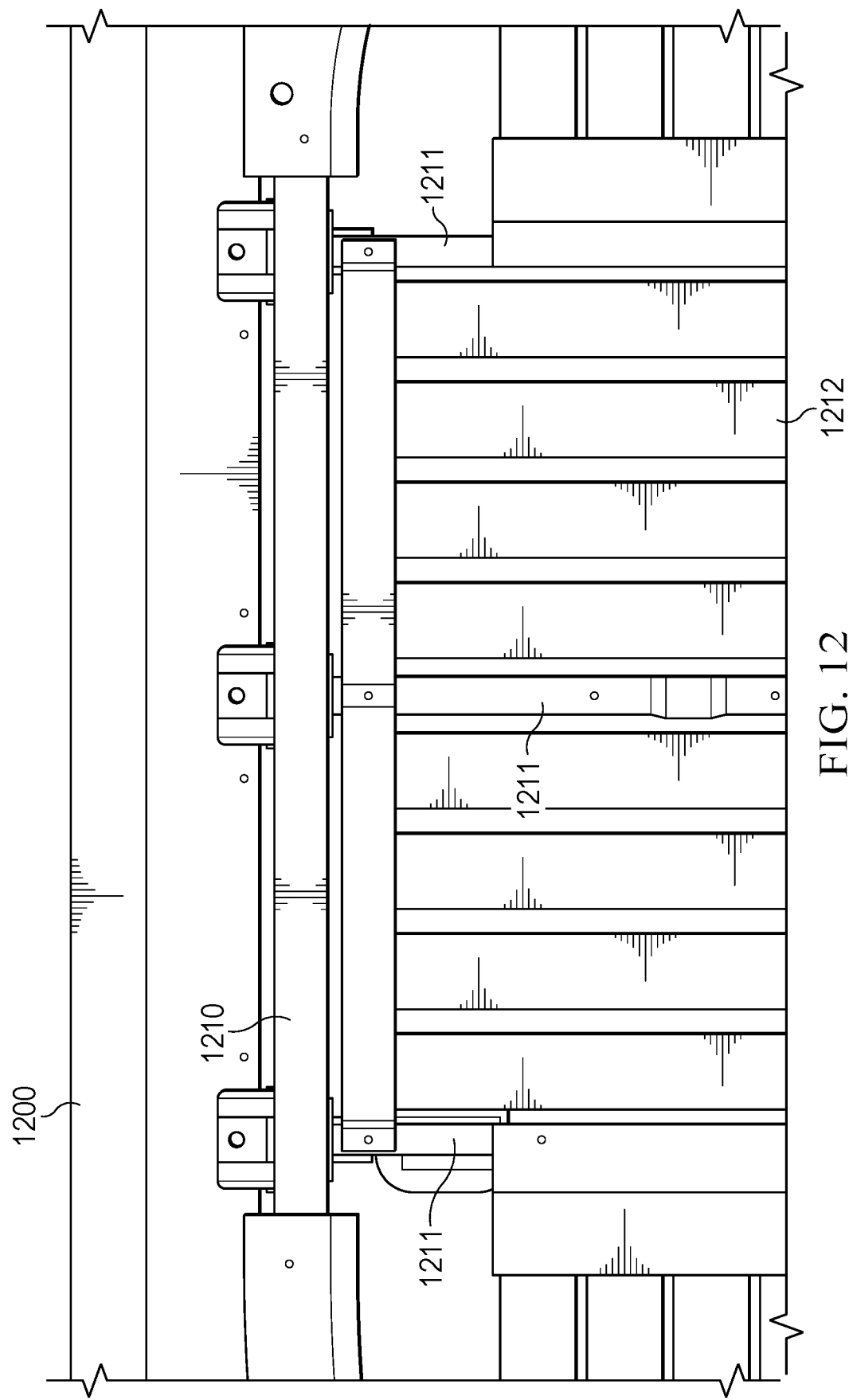

To address this issue, many electric vehicle manufacturers design energy storage systems as a monolithic pre-sealed unit, which is inserted into and separately sealed within a mid-body interior space of the frame. While this double hull construction does increase the force required to penetrate the battery compartment, and the frame of the energy storage system vessel may serve as a rigid lateral stabilizing element within the large open frame, the drawback is that inclusion of such a vessel into the vehicle adds greatly to the weight of the energy storage system, which ultimately can have a negative impact on vehicle range with minimal improvement to vehicle safety. Likewise, traditional electric vehicles may implement traditional impact absorption materials in and around the pre-sealed battery component. Additionally, some manufactures may add additional strengthening materials near or around the battery compartment. For example, FIG. 12 illustrates a view of a battery compartment with additional impact beams 1210 added to the rockers 1200, on the side proximate to the battery modules 1212. These additional elements can help with side impact energy absorption; however, the additional impact beams can also add significant amounts of weight to the vehicle and reduce vehicle energy efficiency.

Referring back to FIG. 11, an embodiment of a vehicle platform frame similar to FIG. 5 is illustrated. Specifically, FIG. 11 illustrated a vehicle platform frame with an energy storage system 1102 (e.g., a compartmentalized battery pack) disposed within the interior spaces of the mid-body space 1104 of the vehicle platform 1100. As previously discussed in relation to FIG. 5, the internal spaces of the vehicle platform can take on any number of configurations. Likewise, the placement of the energy storage system can have any number of configurations in accordance with many embodiments. Numerous embodiments may not incorporate a pre-sealed battery unit but rather modular units positioned within the framework of the vehicle platform such that any number of vehicle configurations can be achieved. Accordingly, many different embodiments of safety measures may be taken to keep the battery compartment sealed and protected in the event of an impact.

Figure 13:
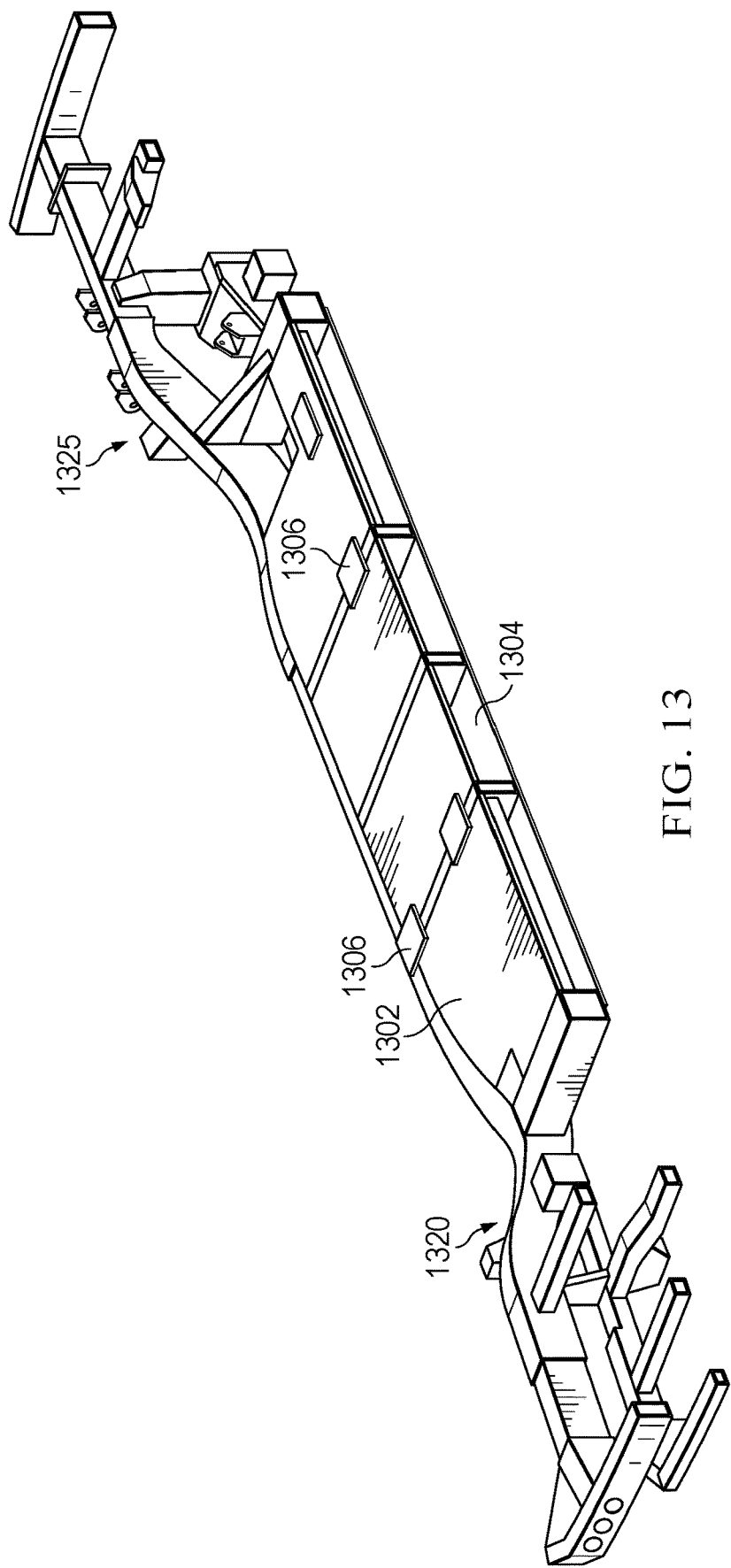

In accordance with numerous embodiments, the battery compartment may be sealed using an upper plate 1302 and a lower plate 1304 as illustrated in the cross sectional view of the platform frame of FIG. 13. As can be appreciated in FIG. 13, the upper plate 1302 may be positioned between the front 1320 and rear 1325 rails and extend laterally across the vehicle platform. Although not fully discussed herein, the upper plate 1302 may be configured with a number of attachment points 1306 that can allow for a body or other upper components to be attached to the vehicle platform.

Figure 14:
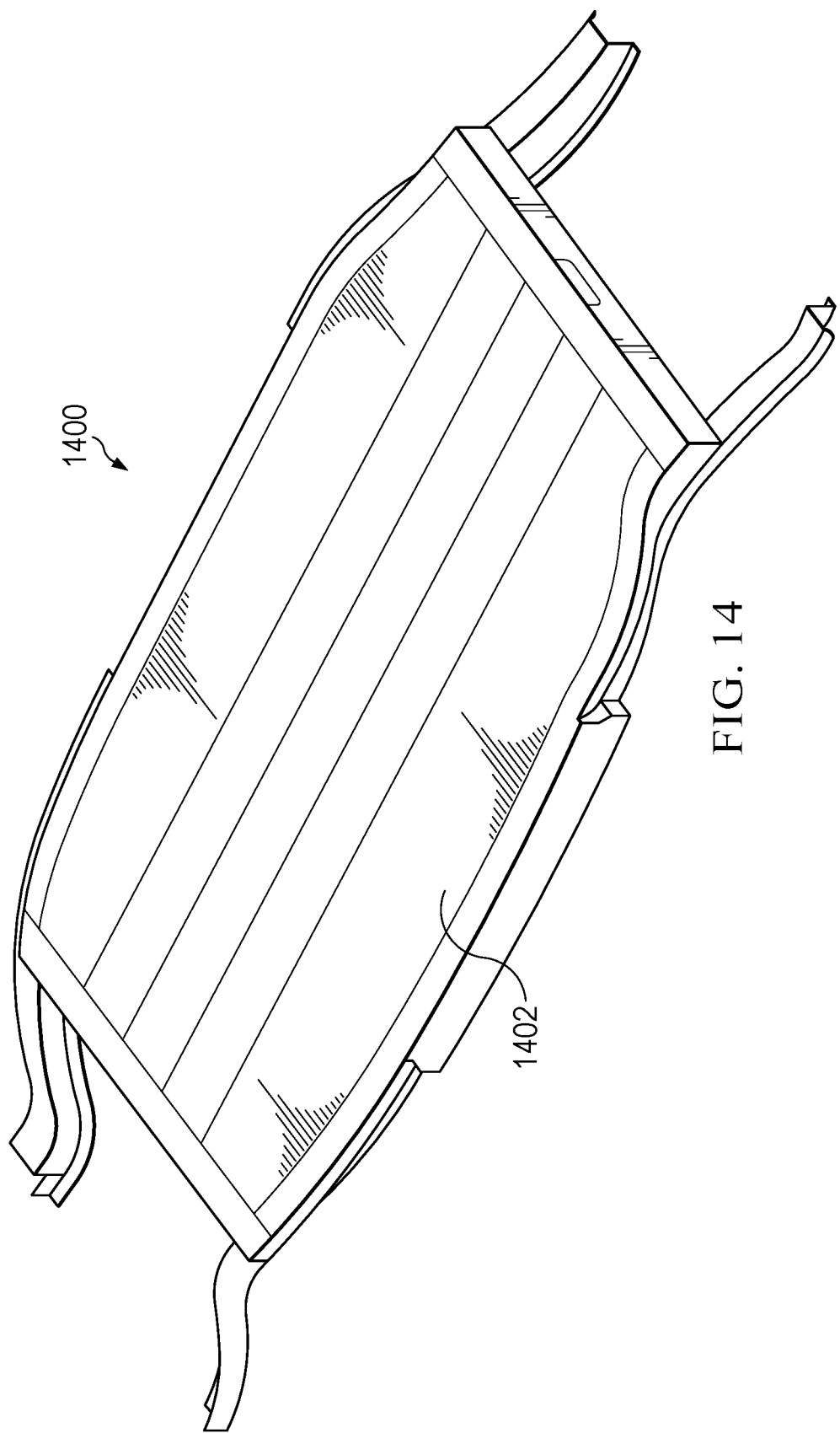

Since many embodiments may position the battery compartment lower in the vehicle for various reasons, it can be necessary to ensure the protection of the battery compartment from the vehicle undercarriage. For example, FIG. 14 illustrates a view of a vehicle platform framework 1400 with a bottom cover plate 1402 connected to at least portions of the framework 1400. In addition, since the bottom cover plate 1402 serves as the only protection from intrusion of objects into the energy storage system space, additional safety features may be incorporated. The conventional approach is to install a bottom cover plate sufficiently thick to absorb the energy of an impact completely, however, this solution results in high mass penalties. Accordingly, various embodiments may employ a sacrificial shear panel/layer attached under the energy storage system compartment that is configured to shear off when the bottom cover plate 1402 is impacted, as illustrated in FIG. 14. In many such embodiments, the bottom cover plate 1402 may be formed of two or more plies of material bonded together. In such embodiments the bottom layer is configured to be a sacrificial layer that shears off the bottom cover plate when impacted resulting in minimal damage to the bottom cover plate.

The side impact of a vehicle is a significant safety concern in any vehicle design. However, in an electric vehicle, such impacts can present unique design challenges because the majority of such vehicles house the battery compartment near the bottom of the vehicle for various reasons previously discussed. Accordingly, not only is side impact a crucial consideration for passenger compartment penetration, but it also presents an issue in preventing penetration into the battery compartment, as the battery elements have the potential to explode or ignite when damaged. As previously discussed, many electric vehicle manufacturers use pre-sealed battery components and subsequently add bulky heavy additional material to the side portions of the frame. Referring back to FIG. 12, prior art illustrates additional material thickness in the rocker or side portion of the frame protecting the battery compartment. Such protection may be simply adding additional bulkhead supports within the rocker portion which are traditionally made of steel thereby adding to the weight and reducing the efficiency of the vehicle. Therefore, a lightweight solution would be needed to improve vehicle efficiency and maintain safety.

Figure 15A:
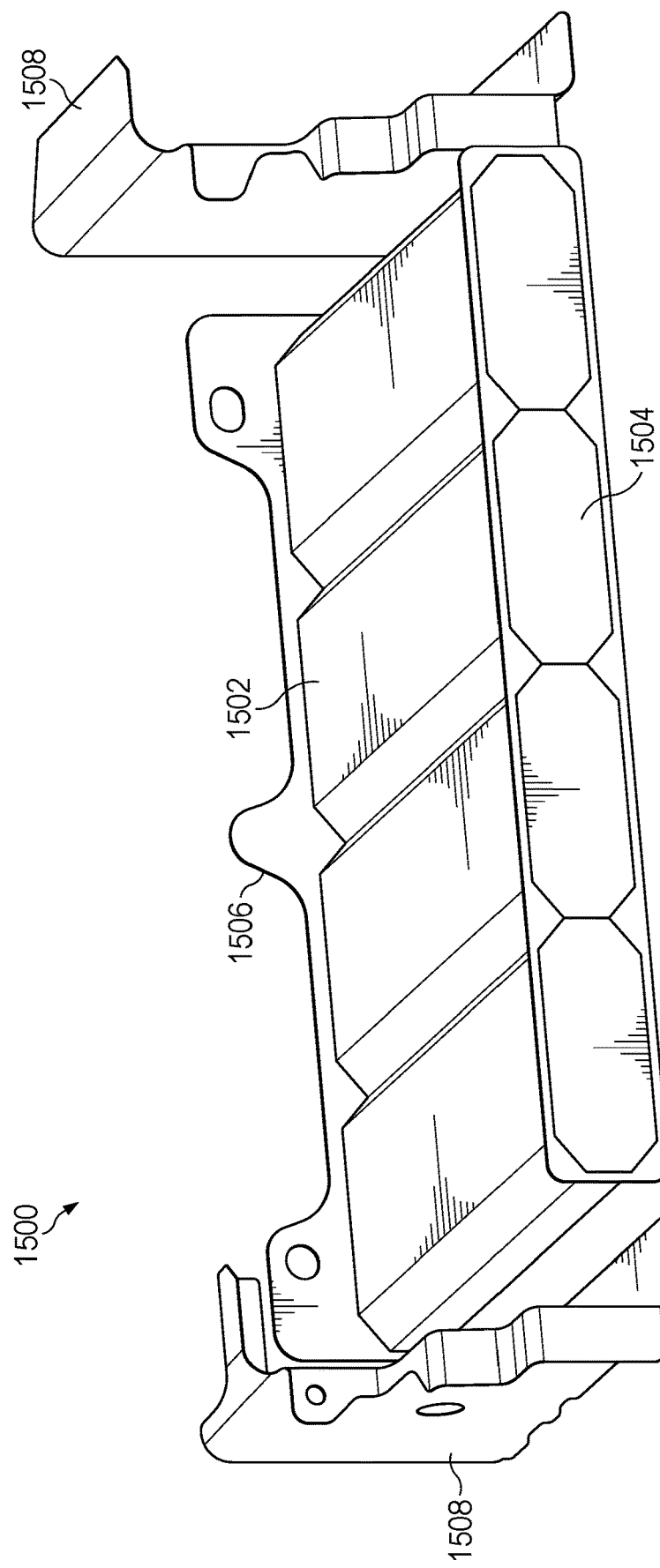

For example, FIG. 15A illustrates an embodiment of a side impact energy absorption unit that can help in reducing unnecessary bulk and weight in the overall design of the vehicle platform. In accordance with many embodiments, a vehicle may be configured with one or more modular energy absorption modules 1500 as illustrated in FIG. 15A. In accordance with many embodiments, the energy absorption module 1500 can be made up of various components that allow for the ease of installation, modulation, and improved side impact resistance. For example, in numerous embodiments of the module 1500, the main component may have one or more pre-designed crush cans 1502 that are contained between a front 1504 and a rear 1506 backing plate. Additionally, the module may be positioned between one or more bulkhead elements 1508 that can add additional impact resistance.

Figure 15B:
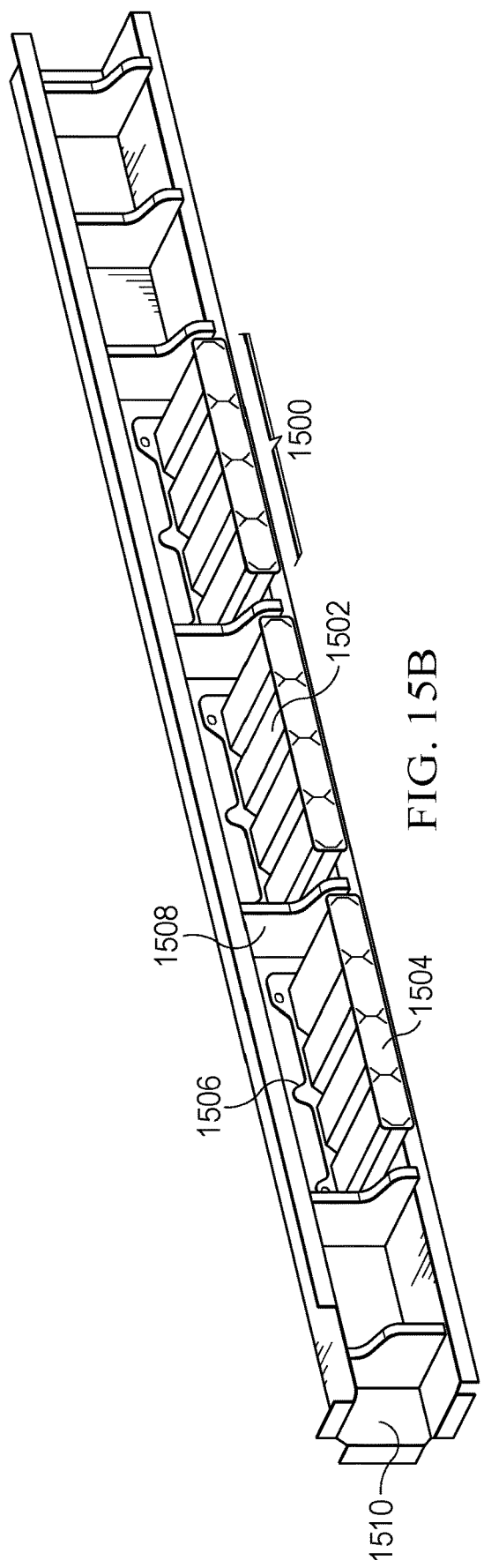
Figure 15C:
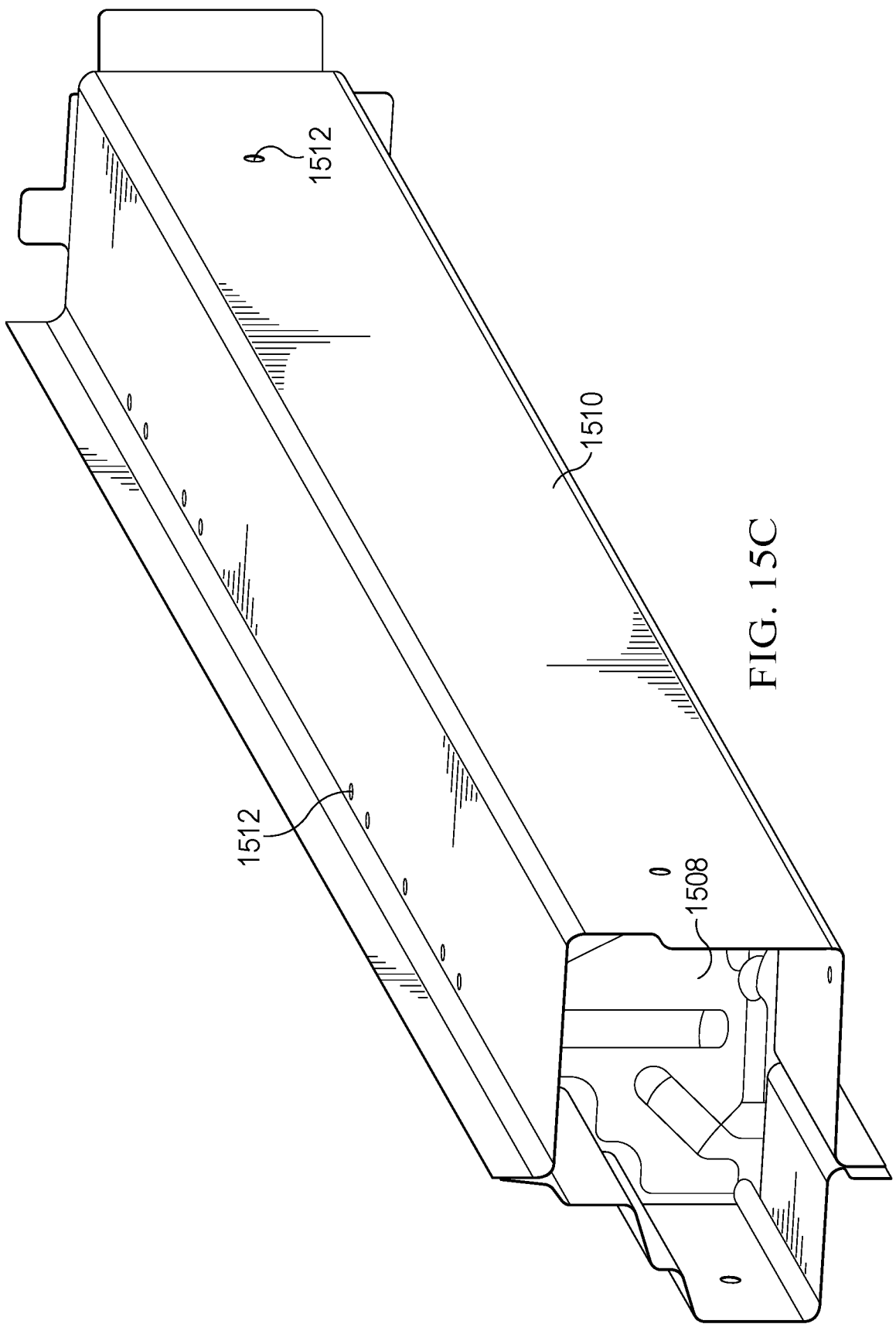

As can be appreciated the energy absorption module can be configured with multiple crush cans based on the overall design of the vehicle. For example, while the module 1500 shown in FIG. 15A has four crush cans 1502 displayed horizontally within a unit, the number of cans horizontally as well as vertically can be adjusted to accommodate a different level of energy absorption. Accordingly, the front 1504 and rear 1506 crush can backing plates could be modified to coordinate with the number of crush cans 1502 disposed between them. Additionally, the length of the crush cans can be tuned to the desired level of energy absorption, although some limits may apply based on the design of the selected body. Likewise, the thickness of the crush cans 1502 may be adjusted to be thinner or thicker depending on the level of impact resistance or compaction desired. Furthermore, as illustrated in FIG. 15A through 15C some embodiments may encapsulate the ends of the energy absorption unit with one or more bulkhead elements 1508. The tunability of the crush can elements in accordance with many embodiments can allow for the incorporation of various vehicle configurations while still maintaining the required level of safety and protection of the battery compartment.

As can be appreciated, the crush cans 1502 can be tuned in terms of cross sectional aspect ratio (length, width, height, as well as cross sectional shape), thickness, and size to accommodate a variety of safety levels or impact absorption levels. The ultimate goal of embodiments of the crush cans 1502 is to prevent the intrusion into the battery compartment while reducing the weight of the vehicle. Accordingly, many embodiments of the crush cans 1502 may be designed to withstand a certain force necessary to protect the battery compartment from penetration. Such embodiments may be configured to withstand a wide range of impact forces. Although some embodiments may be configured to such levels it should be understood that the crush cans 1502 can be tuned accordingly to any desired level of force compatibility.

FIG. 15B illustrates an embodiment of a pre-packaged energy absorption unit that has a plurality of energy absorption modules 1500 located within a generalized casing 1510. As previously mentioned, each of the energy absorption modules 1500 can contain multiple crush cans 1502 and subsequent elements surrounding the crush cans (1504, 1506, and 1508). In many embodiments, the casing 1510 can act as a housing that surrounds or partially surrounds the energy absorption modules 1500 as well as the additional support structures like the bulkheads 1508. Additional bulkheads 1508 can be placed along the length of the casing 1510 to provide additional strength and can also serve to reduce noise and vibration in the vehicle. Although a certain configuration is illustrated, it should be understood by the modular nature of the crush cans 1502 that any variation or configuration of crush cans 1502 and bulkheads 1508 could be used for the desired level of impact energy absorption. FIG. 15C illustrates an energy absorption unit in accordance with embodiments illustrating the full casing element 1510 around the bulkhead 1508 and crush can (not shown). It should also be understood that many embodiments of the casing 1510 can be outfitted with a number of attachment holes 1512 that allow for the ease of installation. This can be beneficial during the installation of the energy absorption units. Additionally, it can be appreciated that the attachment holes 1512 can provide for an improved maintenance process. Given the modularity of the side impact features, it can be appreciated that when an energy absorption unit is damaged it can be easily replaced with a new modular unit. Additionally, the modularity of the components means that only the damaged units will need to be replaced rather than all of the units.

The modularity of the unit increases the flexibility when embodiments of a vehicle incorporate a different body for the vehicle platform. For example, the vehicle can be configured with multiple energy absorption units, either along the length of the rocker or stacked vertically within the rocker (not shown) which can allow for any number of vehicle configurations to be obtained based on the desired body of the vehicle in accordance with many embodiments. Additionally, it should be understood that embodiments of the energy absorption unit might be manufactured from any number of materials including metal, such as aluminum or steel, composites, carbon fiber, etc. It can be largely appreciated that any such configuration could be used to accommodate the variety of vehicle bodies that may be used.

Figure 16:
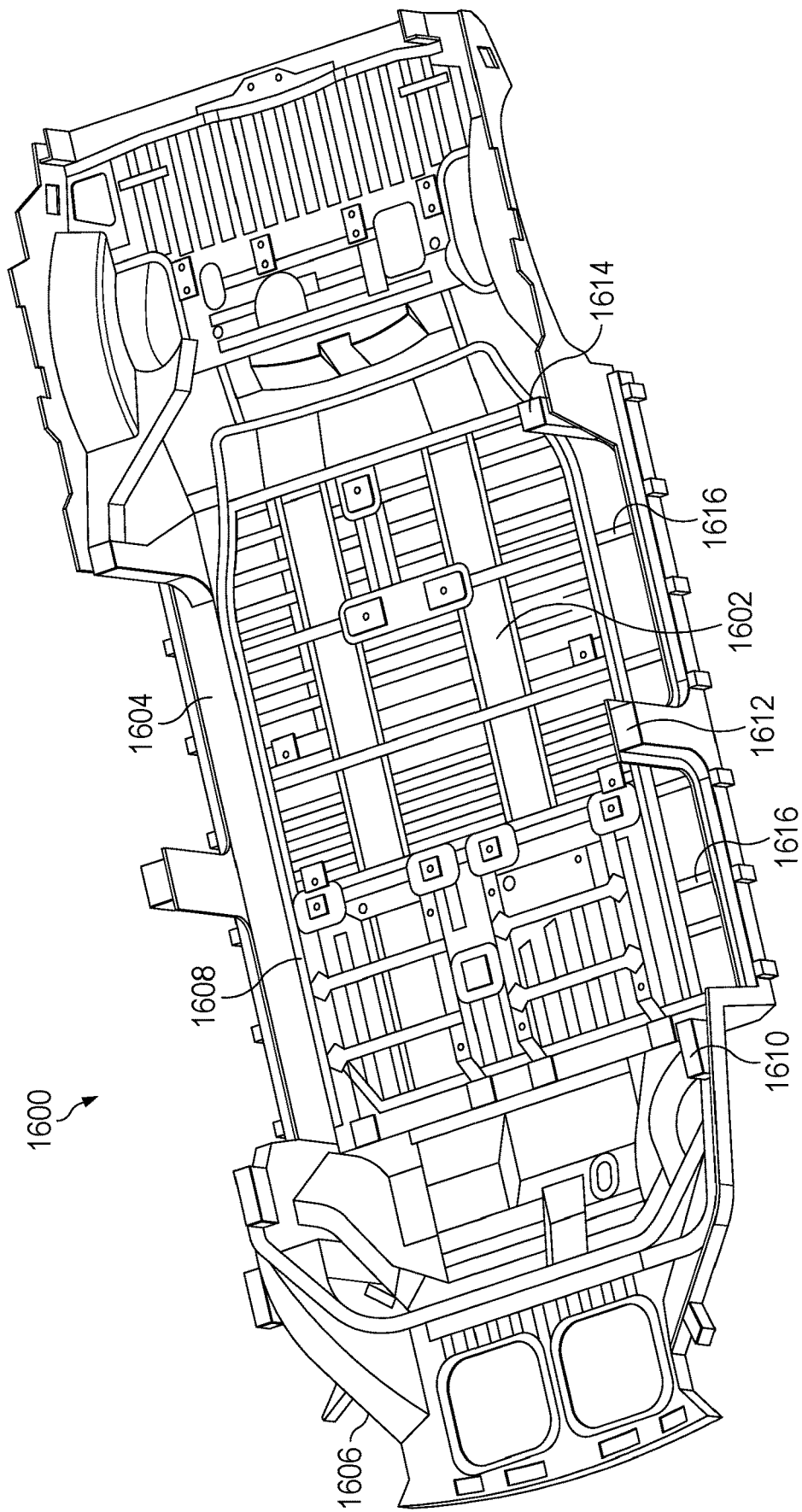

Turning now to FIG. 16, a cross section of an embodiment of a vehicle body platform 1600 giving view to the floor of the vehicle as well as the underlying frame is illustrated. Along both sides of the battery compartment 1602 an embodiment of a side impact energy absorption unit 1604 is provided. It can be seen that the energy absorption unit 1604 can be positioned between the body of the vehicle 1606 and the frame 1608 of the vehicle platform. Generally, the body of the vehicle 1606 may also incorporate other side impact features such as strengthened A, B, and C pillars (1610, 1612, 1614). Accordingly, many such embodiments may configure the energy absorption unit 1604 to be strengthened at each of those locations to provide some additional structural support to protect the passenger compartment as well as the battery compartment. To further illustrate this point, several bulkhead elements 1616 are represented in one of the side energy absorption units 1604. As previously mentioned, the side energy absorption units 1604 can be configured with multiple bulk heads 1616 and as discussed herein the bulk heads 1616 can be aligned with various other sections of the vehicle body for additional impact resistance. Additionally, the crush can modules (not shown) can be configured in any number of ways to fit between any number of bulkhead 1616 positions. The use of modular crush cans and an endless arrangement of bulkheads can help to reduce the amount of heavy material along the outer edges of a battery compartment and thus reduce the overall weight of the vehicle. Even though such elements can add to the total number of parts, the cost savings in weight reduction and vehicle efficiency can outweigh the complications created by increasing the number of parts for production.

Figure 17:
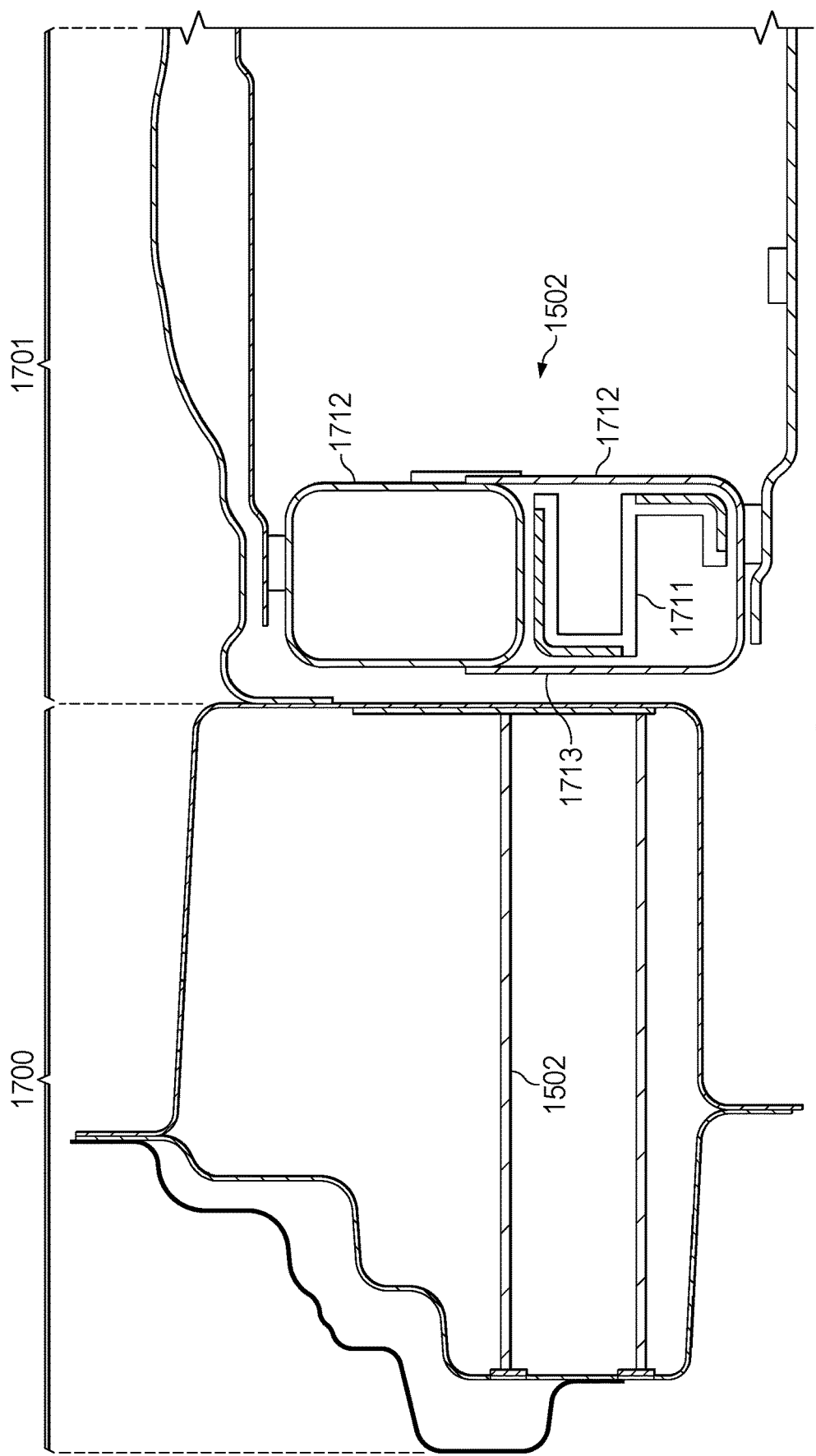
FIG. 17 illustrates a sectional view of combined rocker and side sill with one reinforcement design.

Referring back to FIG. 12, as discussed above, additional impact beams 1210 may be added between the rockers 1200 and the battery modules 1212. Those additional impact beams 1210 are referred to herein as "side sills" or "sills" or "skateboard sills." FIGS. 12, 15B, 16 and 17 show the components used in load path for side pole impact conditions. This design has a crush can assembly 1502 within the body-in-white rocker that acts an energy absorber. That energy absorber is supported by stiffener 1711 inside the skateboard sill 1210. Skateboard sill 1710 is supported by cross-members 1211 and battery modules 1212 are mounted on the skateboard using battery mounting brackets. FIG. 17 illustrates a sectional view of combined rocker and side sill with one reinforcement design. Region 1700 is a rocker assembly with energy absorber member 1502, and region 1701 is a sectional view of side sill 1210. As shown in FIG. 17, stiffener 1711 provides internal reinforcement designed to maximize the reinforcement geometry to gain maximum stiffness. This skateboard stiffener 1711 is touching both the inner face 1712 and the outer face 1713 of the side sill section.

Figure 18:
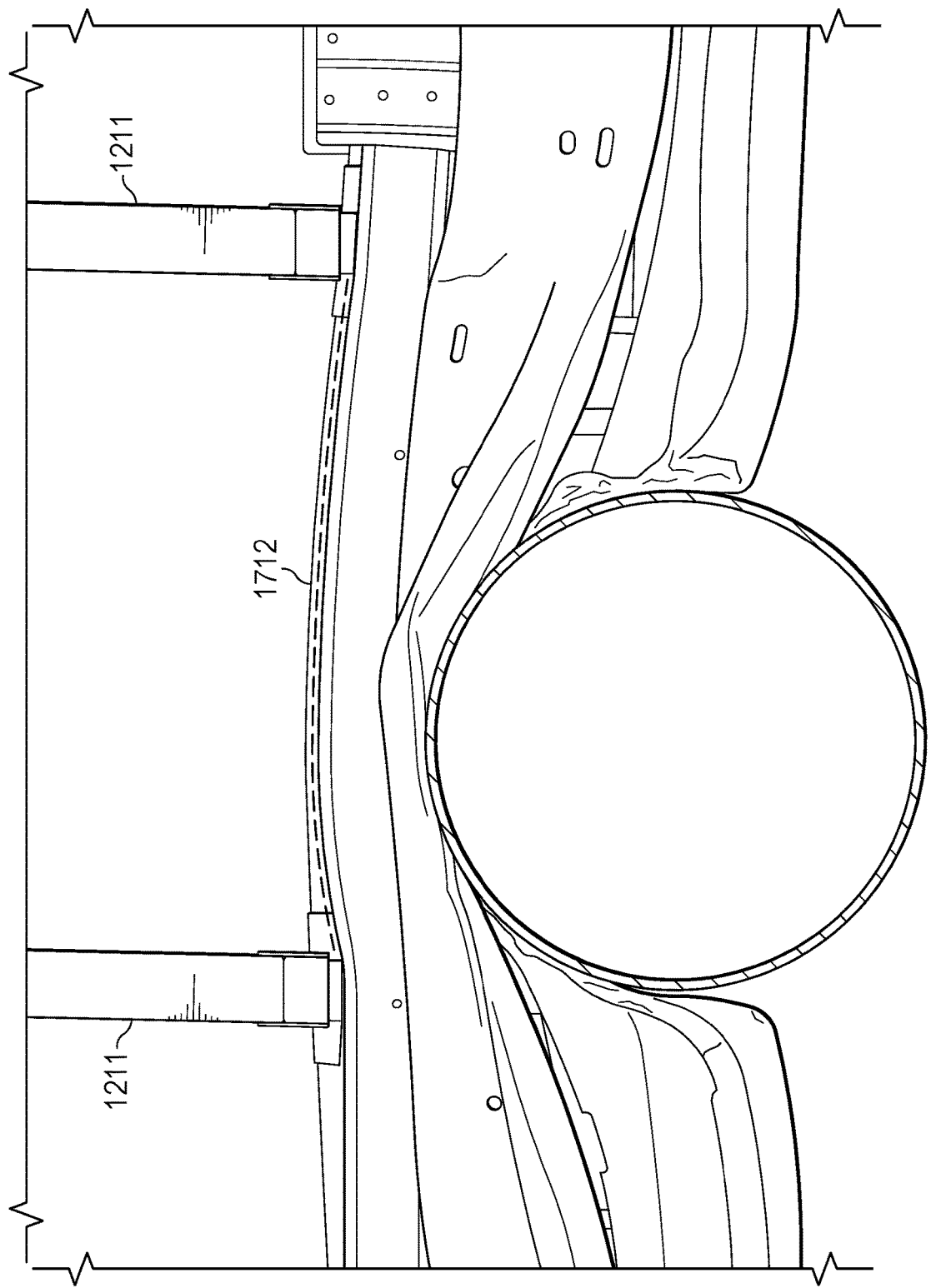
FIGS. 18 and 19 illustrate deflection of a sill during side impact with a pole.
Figure 19:
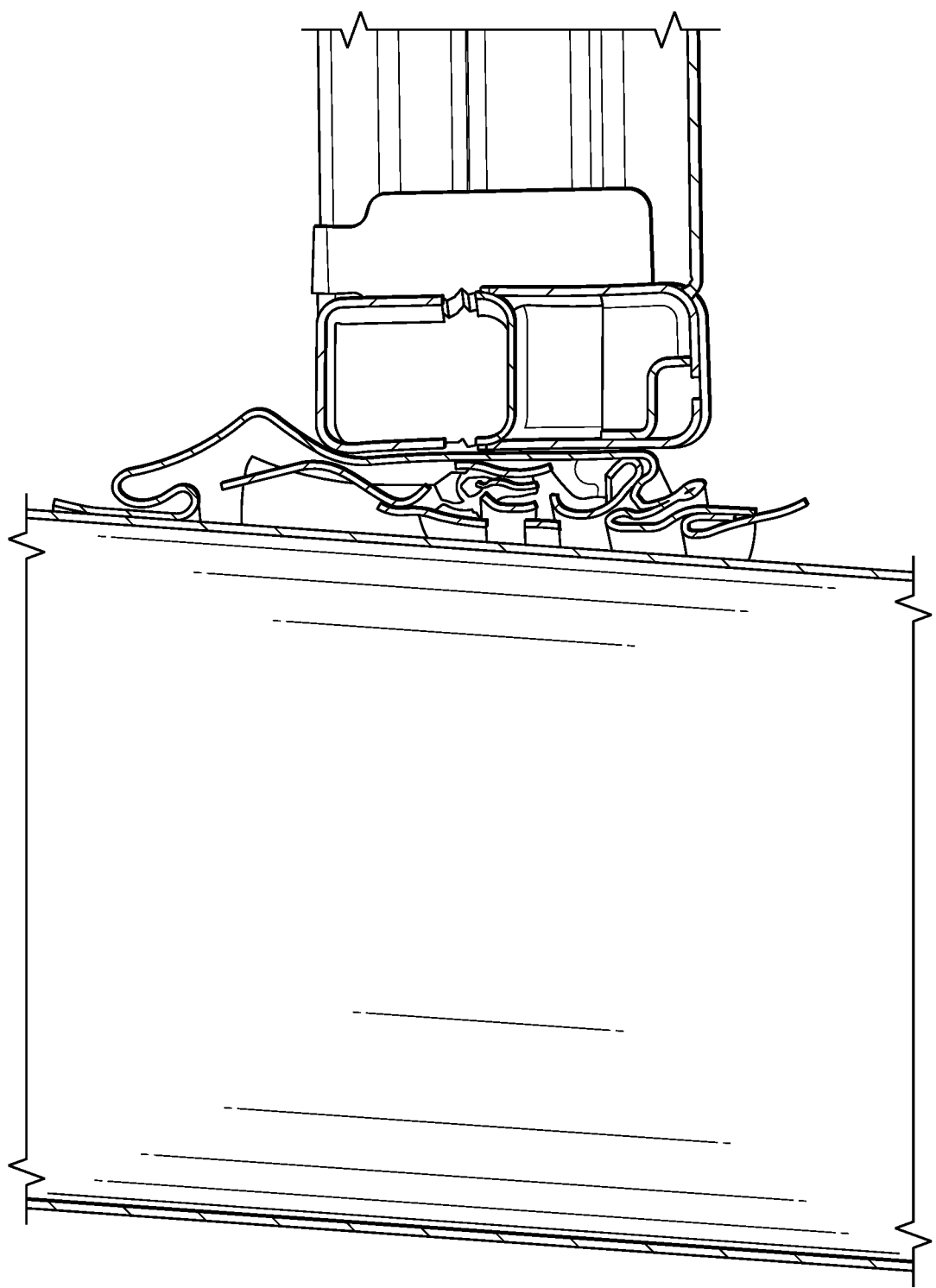

FIGS. 18 and 19 illustrate deflection of a sill during side impact with a pole. Under side pole impact conditions, the sill inner surface 1712 deforms and occupies gap between the sill and battery structures. In FIG. 18, the deformed shape of the structure is shown under a computer aided engineering simulation of a 20 mile per hour (mph) side pole impact. FIG. 19 is a side section view of the simulation. Sill inner surface 1712 bulges inboard under the crush load of energy absorber member 1502. As depicted in FIGS. 18 and 19, when the body-in-white energy absorber starts crushing under impact loading, the skateboard stiffener 1711 pushes the skateboard sill inner surface 1712 towards the battery structure resulting in bulging between the cross-members 1211.

Figure 20:
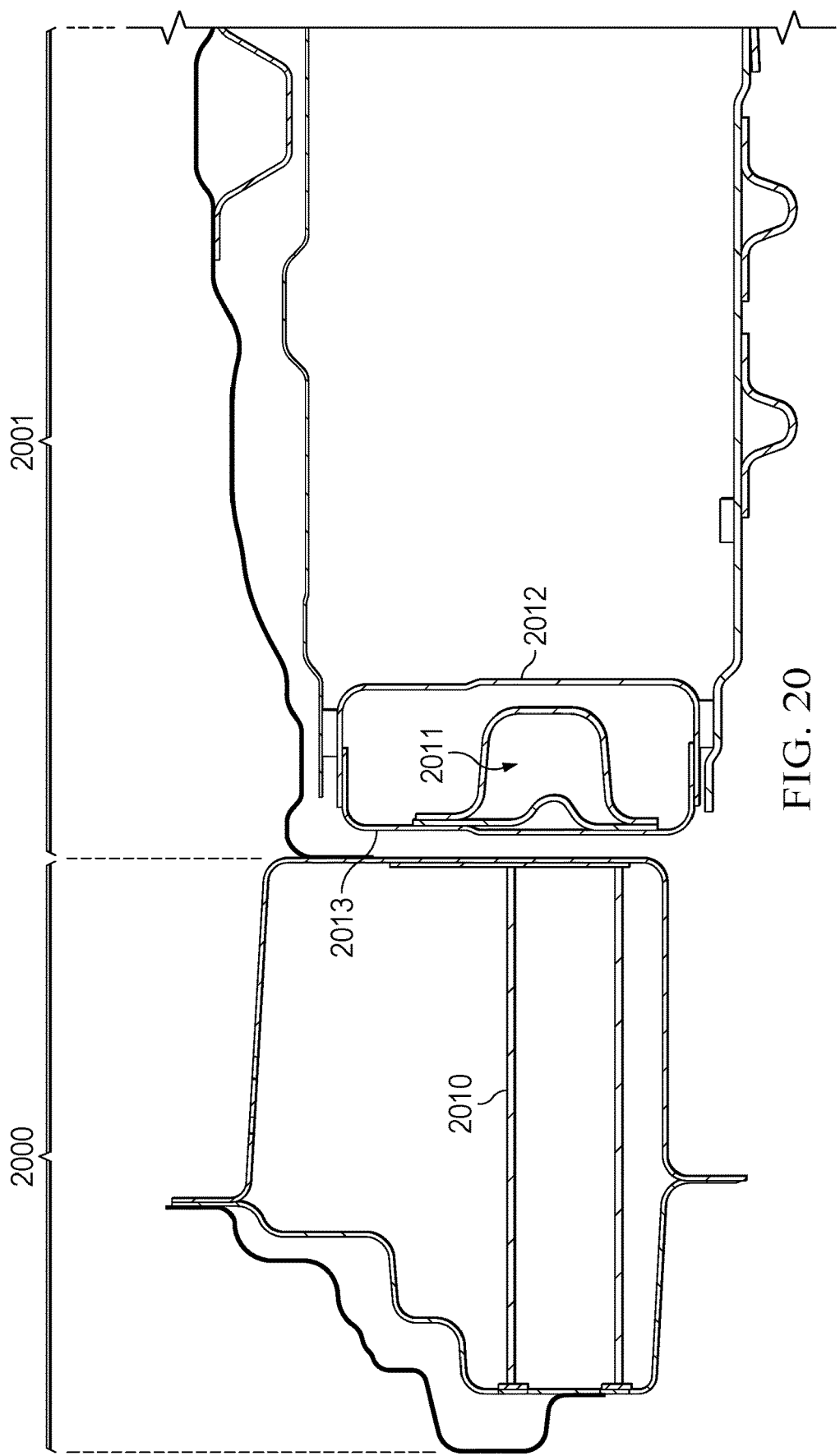
FIGS. 20 and 21 show a reinforcement concept that efficiently transfers a side impact load from the body-in-white energy absorber member to the crossmembers.
Figure 21:
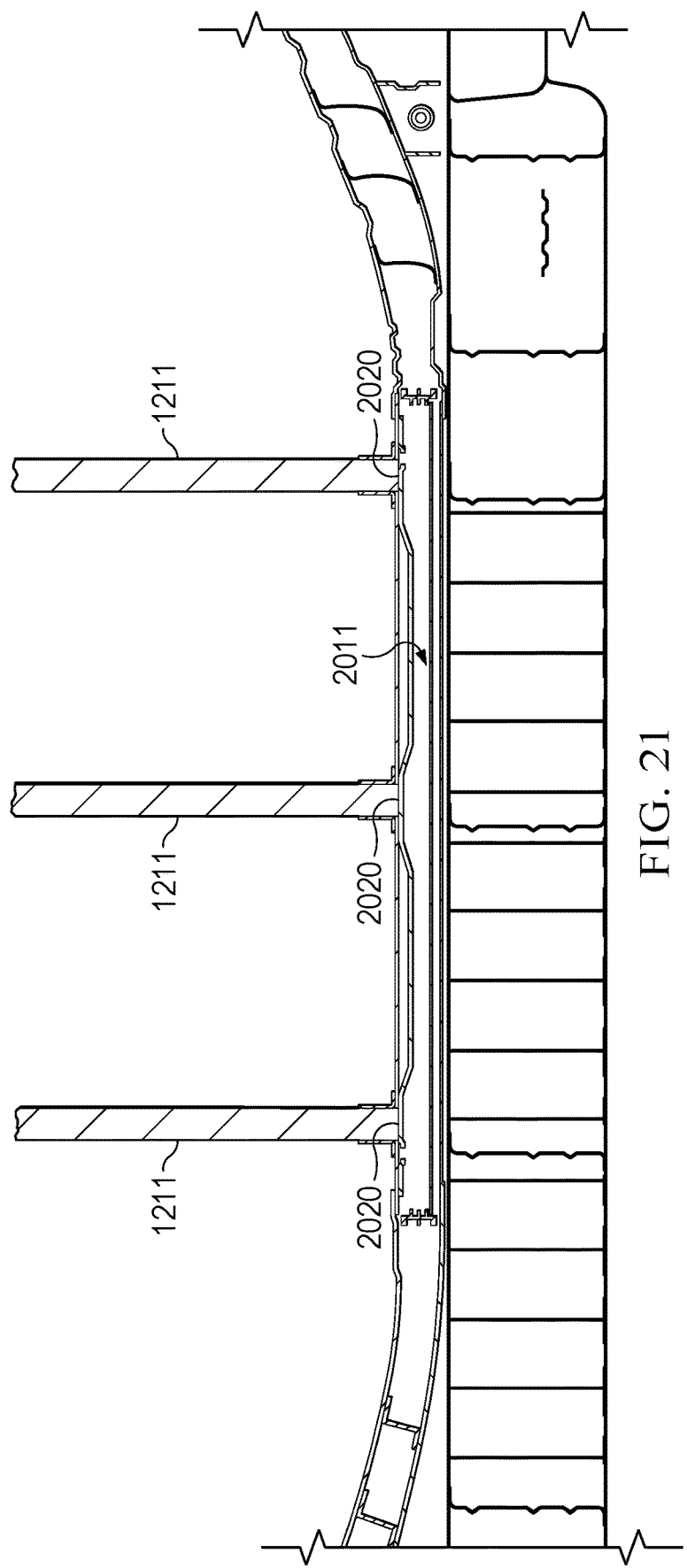
Figure 22A:
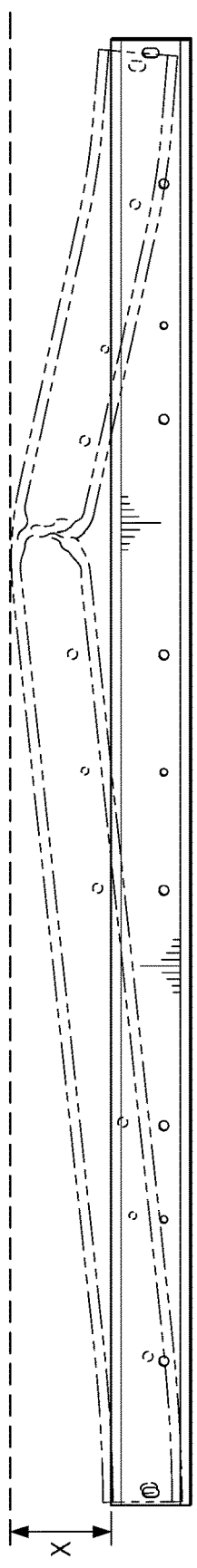
FIGS. 22A, 22B, and 22C are comparative results of simulations illustrating the difference in deflection for the same side impact.
Figure 22B:
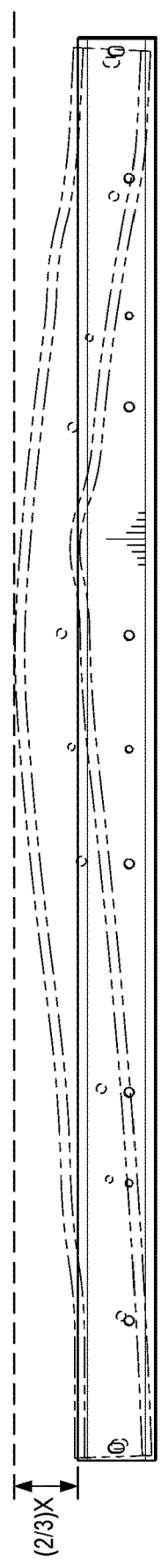
Figure 22C:
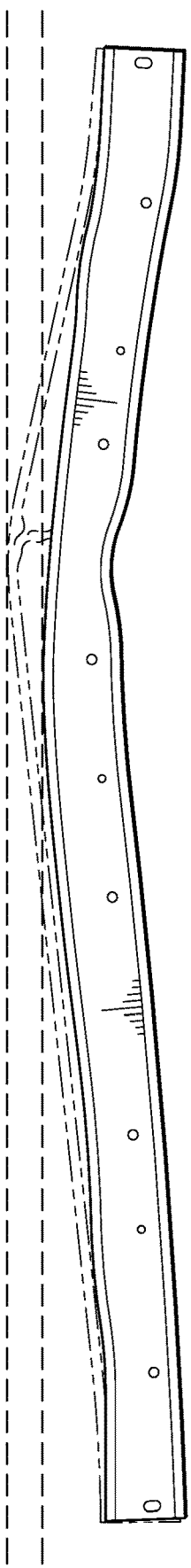

To reduce bulging of the sill inner surface 1712 during certain side impacts, changes may be made only to the sill section in the skateboard assembly, with the battery bracket and module position retained. FIGS. 20 and 21 show a reinforcement concept that efficiently transfers a side impact load from the body-in-white energy absorber member to the skateboard crossmembers in accordance with the present disclosure. Reinforcement 2011 is formed in such way that touch points between the crossmember 1211 to the sill inner surface 2012 are at crossmember support points 2020, where crossmember 1211 supports the sill. Away from the crossmembers 1211, the face of reinforcement 2011 is offset, to provide clearance with sill inner surface 2012. Under 20 mph side pole impact, as the body-in-white energy absorber member begins to crush, the energy absorber member loads the sill reinforcement 2011, the sill reinforcement 2011 will only push sill inner surface 2012 at the crossmember support points 2020. As sill reinforcement 2011 deforms, the offset face (between crossmember support points 2020) now moves towards the sill inner surface 2012, delaying the contact of sill reinforcement 2011 with the sill inner surface 2012. In the process, deformation of the sill inner surface 2012 is reduced to around two-thirds of that illustrated in FIG. 18. The CAE simulations of FIGS. 22A, 22B, and 22C illustrate the difference in deflection for the same 20 mph side impact with a pole. FIG. 22A depicts the deformation of a sill resulting from a 20 mph side impact with a pole for the design of FIG. 17, overlaid with the outline of an undeformed sill. FIG. 22B depicts the deformation of a sill resulting from a 20 mph side impact with a pole, also overlaid with the outline of an undeformed sill, for the design of FIGS. 20-21 and 24. FIG. 22C illustrates the two deformed sills overlaid.

Figure 23A:
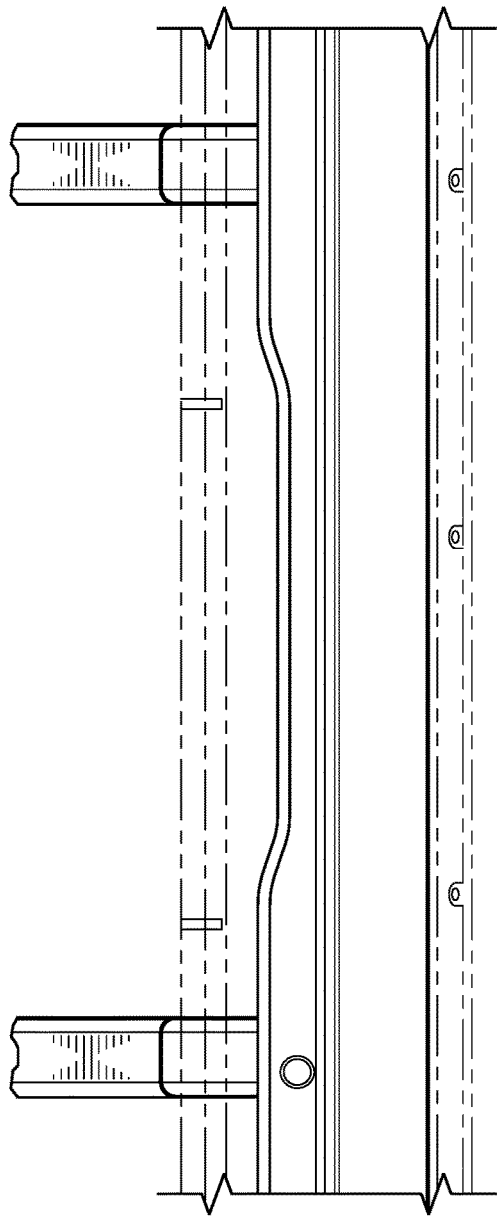
FIGS. 23A through 23C shows various versions of a reinforcement.
Figure 23B:
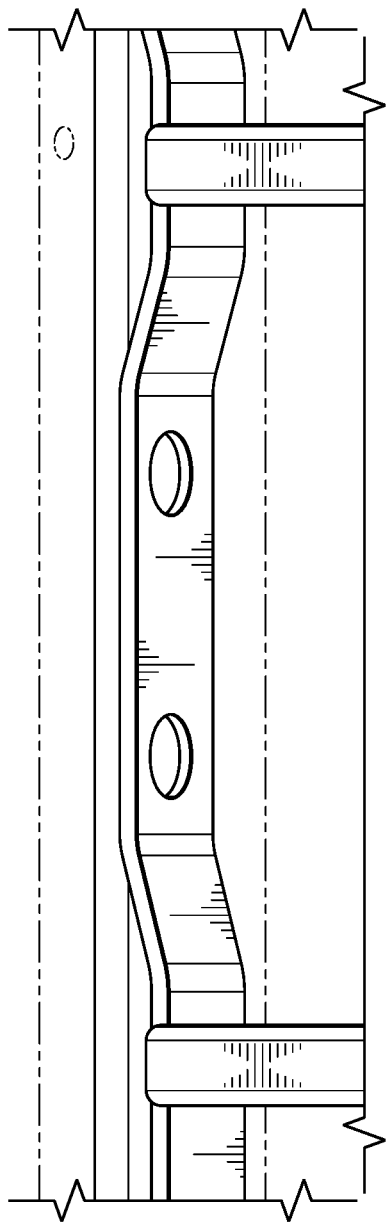
Figure 23C:
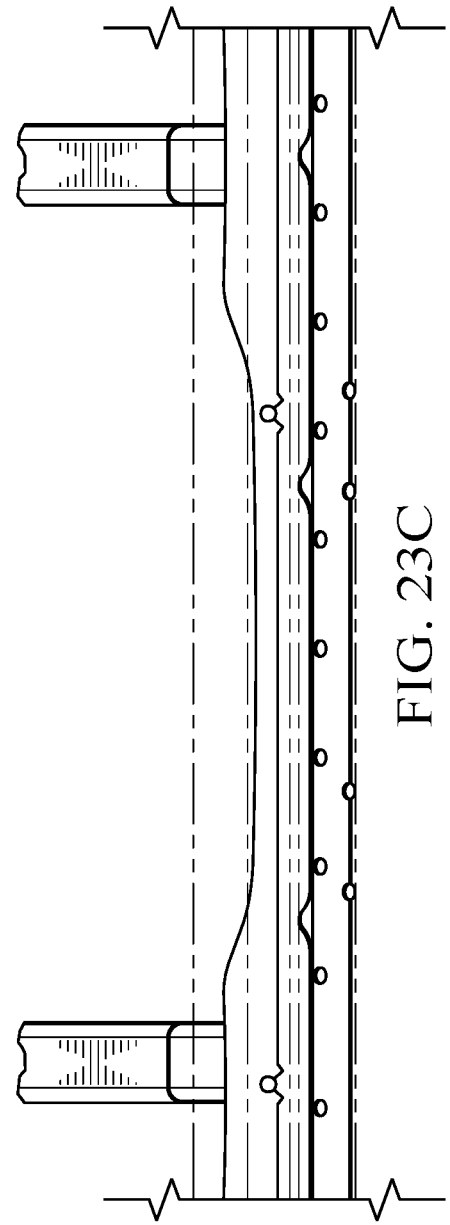

As shown in FIG. 20, the sill section is modified in the present disclosure to include two channel sections welded at top and bottom faces. FIGS. 23A through 23C shows various versions of the reinforcement 2011, welded either to the sill inner surface or the sill outer surface. FIG. 23A depicts a two piece stamped reinforcement with a formed plate that is spot welded to the sill inner surface. FIG. 23B depicts a two piece stamped reinforcement with a formed plate having weld gun access holes to weld onto the sill outer surface. FIG. 23C depicts a two piece reinforcement with a roll formed section and a support plate to weld onto the sill outer surface.

Figure 24:
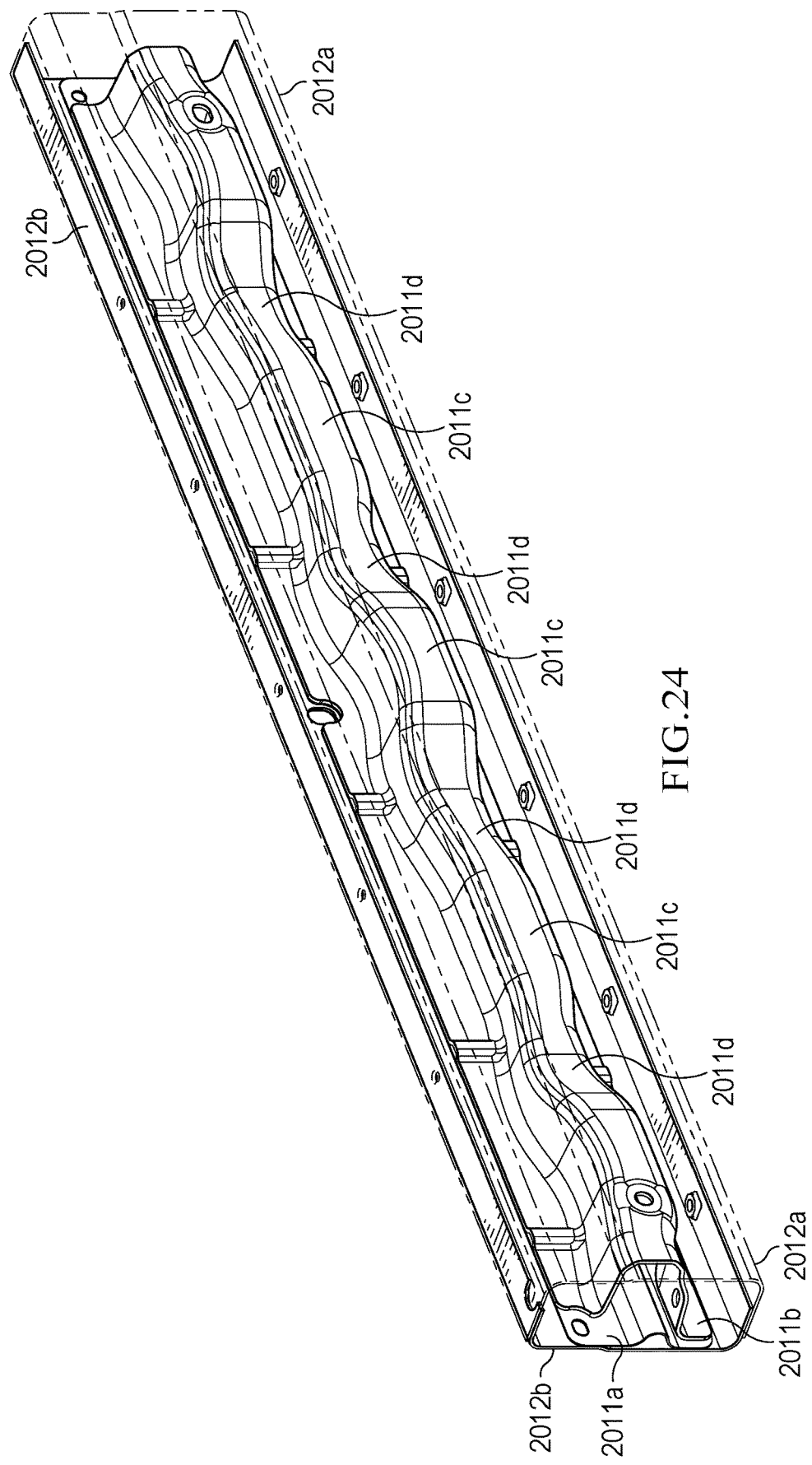
FIGS. 24 and 25 show the design of a sill section with reinforcement.
Figure 25:
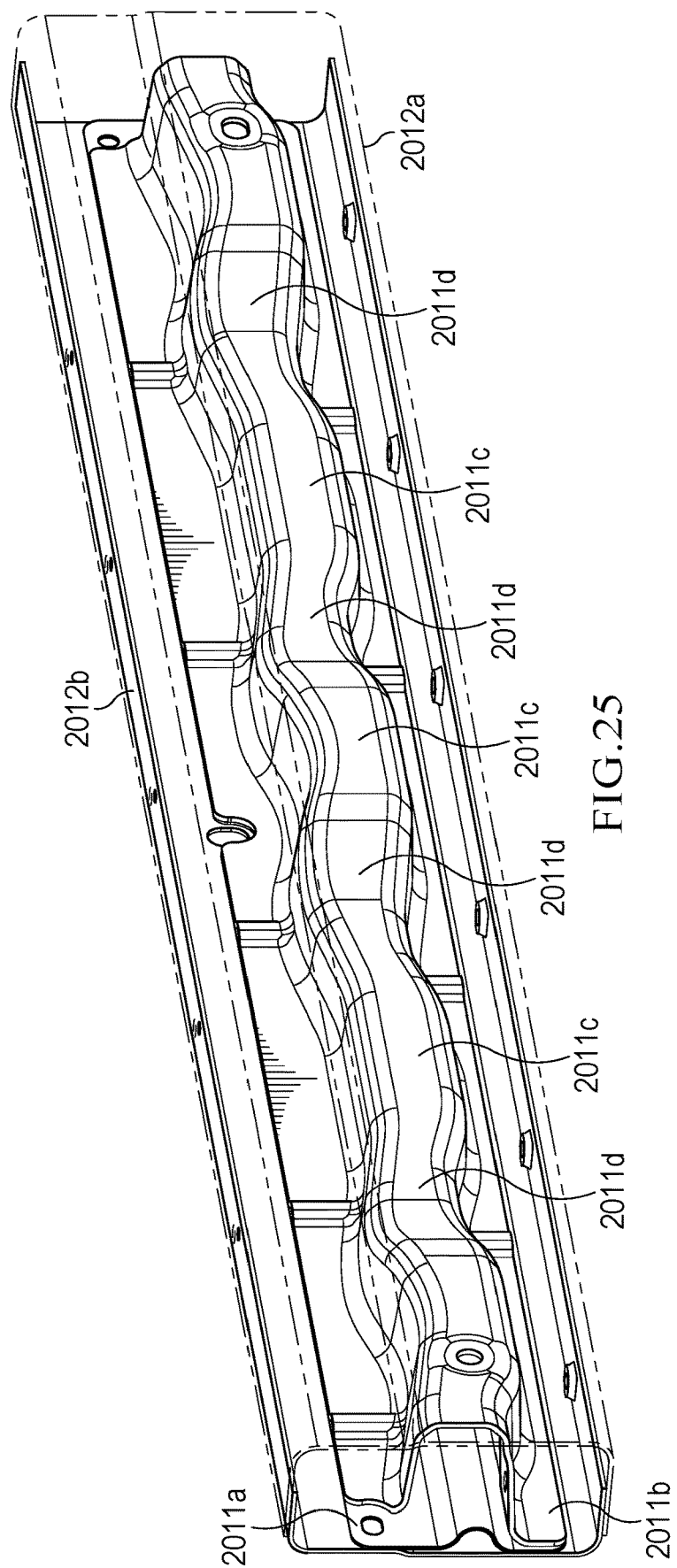

FIGS. 24 and 25 show the design of a sill section with reinforcement as described in connection with FIGS. 20-21 and 23C, which may be readily manufactured. The U-shaped sill inner piece 2012*a* and U-shaped sill outer piece 2012*b* combine to form the sill and enclose the reinforcement assembly 2011. Reinforcement assembly 2011 includes a support 2011*a* and a roll formed reinforcement member 2011*b*. Support 2011*a* includes a straight, U-shaped projecting surface with flanges to either side. The projecting face of support 2011*b* protrudes only a small distance—much less than halfway—across the space between sill inner piece 2012*a* and sill outer piece 2012*b*. Reinforcement member 2011*b* also has a generally U-shaped projection with flanges, but with relatively lower projection faces 2011*c* to align with the body-in-white energy absorber members. That is, the faces 2011*c* of reinforcement member 2011*b* protrude less far across the space between sill inner piece 2012*a* and sill outer piece 2012*b* than do the faces 2011*d* in regions that align with where the sill section is to be mounted to the crossmembers. The protrusion of reinforcement member 2011*b* at the locations of projection faces 2011*d* are also smoothly offset upward to provide a larger welding flange at the bottom thereof, for welding support 2011*a* and member 2011*b* onto the sill outer piece 2012*b*. The displacement results in a wavy shape to the member 2011*b* for reinforcement 2011, while providing adequate stiffness to the sill section and assisting in load transfer to the crossmembers during side pole impacts. The wavy shape of member 2011*b* is thus in two directions: a direction transverse to the wide dimension of the sill section and a direction transverse to a narrow dimension of the sill section.

The reduction in deflection of the sill during side pole impacts is a function of the material and thickness combinations used in the design of the sill structure. Currently available material grades and thicknesses feasible for automated manufacturing processes are used. For example, sill inner piece 2012*a*, sill outer piece 2012*b*, and support 2011*a* may be stamped from 1.8 millimeter (mm) thick CR1500 steel, and reinforcement member 2011*b* may be roll formed from 2.2 mm USIBOR 1500 steel. However, following the approach discussed above, further reduction or elimination altogether of deflection of the sill inner surface may be possible as higher strength materials suitable for use in conventional manufacturing processes become available in the future.

Current industry practice involves reinforcement designs which use a cross section like that in FIG. 17. As noted above, one drawback of this approach is that the inner surface of the sill moves inboard under the crush load of energy absorber member(s). In addition, EVs that use an enclosure to mount battery pack on the vehicle underbody do not have a crossmember in the vehicle underbody to support the sill inner surface in resisting deformation. This forces a higher clearance requirement between battery pack and side sill (or comparable structure). With lesser clearance, such designs need to have a "rigid" sill section that will not deform under a crush load, a sill section design that requires bulky reinforcements which increased overall mass and reduced energy efficiency. By contrast, the architecture described herein uses the battery packs as part of the structural members to support crash loads through a crossmember supporting the sill inner surface. The design removes costlier sill section stiffeners that must be used for other designs, and consists of sheet metal stamped/roll formed sections that are easier to manufacture and maintain assembly tolerances. As the deflection of the sill inner surface is reduced during side impacts, battery system safety margin increases in case of side pole impact.

Although many embodiments exhibit energy storage systems and associated safety components and structures within embodiments of vehicle platforms, it will be understood that various combinations of such systems and their structural and functional components may be included or omitted in any number of designs included the many embodiments of vehicle platforms as well as the associated impact safety features.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A vehicle side impact absorption structure, comprising:
   a side sill mounted between a rocker and crossmembers supporting one or more battery packs; and
   a reinforcement mounted within and along a length of the side sill proximate to an outer surface of the side sill, the reinforcement including flanges on either side of a projecting portion, the projecting portion projecting across an interior of the side sill toward an inner surface of the side sill and comprising first faces aligned with regions of the side sill that mount to the crossmembers and second faces in regions between the first faces,
   wherein the first faces project further toward the inner surface of the side sill than the second faces.

2. The vehicle side impact absorption structure according to claim 1, wherein the first faces each contact an interior surface of the side sill that is aligned with a contact region between the side sill and one of the crossmembers.

3. The vehicle side impact absorption structure according to claim 1, wherein the first faces are laterally offset from the second faces to provide larger welding areas, the projecting portion forming a structure that is wavy in two directions.

4. The vehicle side impact absorption structure according to claim 1, further comprising:
   a support plate disposed between the reinforcement and the side sill, the support plate comprising flanges at two opposing edges of the support plate and a straight, projecting face between the flanges.

5. The vehicle side impact absorption structure according to claim 4, wherein the side sill comprises two U-shaped members forming an enclosure, the reinforcement and the support plate mounted within the enclosure.

6. The vehicle side impact absorption structure according to claim 4, wherein the side sill is mounted adjacent energy absorbing crush cans.

7. The vehicle side impact absorption structure according to claim 4, wherein the support plate is stamped and has a first thickness, and wherein the reinforcement is roll formed and has a second thickness greater than the first thickness.

8. The vehicle side impact absorption structure according to claim 4, wherein the support plate and reinforcement are welded to an interior surface of the side sill opposite the side sill outer surface.

9. A skateboard framework including the vehicle side impact absorption structure according to claim 1, wherein the skateboard framework includes the crossmembers and the side sill is mounted to the crossmembers, the skateboard framework further comprising:
   one or more battery packs mounted to the crossmembers by brackets, wherein at least one of the battery packs is positioned proximate to an inner surface of the side sill.

10. A vehicle including the vehicle side impact absorption structure according to claim 1, the vehicle further comprising:
    a cabin mounted to a framework including the side sill; and
    wheels connected to one or more axels mounted to the framework.

11. A method of forming a vehicle side impact absorption structure, the method comprising:
    mounting a side sill between a rocker and crossmembers supporting one or more battery packs; and
    mounting a reinforcement within and along a length of the side sill proximate to an outer surface of the side sill, the reinforcement including flanges on either side of a projecting portion, the projecting portion projecting across an interior of the side sill toward an inner surface of the side sill and comprising first faces aligned with regions of the side sill that mount to the crossmembers and second faces in regions between the first faces, wherein the first faces project further toward the inner surface of the side sill than the second faces.

12. The method according to claim 11, wherein the first faces each contact an interior surface of the side sill that is aligned with a contact region between the side sill and one of the crossmembers.

13. The method according to claim 11, wherein the first faces are laterally offset from the second faces to provide larger welding areas, the projecting portion forming a structure that is wavy in two directions.

14. The method according to claim 11, further comprising:
disposing a support plate between the reinforcement and the side sill, the support plate comprising flanges at two opposing edges of the support plate and a straight, projecting face between the flanges.

15. The method according to claim 14, wherein the side sill comprises two U-shaped members forming an enclosure, the reinforcement and the support plate mounted within the enclosure.

16. The method according to claim 14, wherein the side sill is mounted adjacent energy absorbing crush cans.

17. The method according to claim 14, wherein the support plate is stamped and has a first thickness, and wherein the reinforcement is roll formed and has a second thickness greater than the first thickness.

18. The method according to claim 14, wherein the support plate and reinforcement are welded to an interior surface of the side sill opposite the side sill outer surface.

19. The method according to claim 11, further comprising:
forming a skateboard framework including the vehicle side impact absorption structure, wherein the skateboard framework includes the crossmembers and the side sill is mounted to the crossmembers; and
mounting one or more battery packs to the crossmembers by brackets, wherein at least one of the battery packs is positioned proximate to an inner surface of the side sill.

20. The method according to claim 11, further comprising:
forming a vehicle including the vehicle side impact absorption structure by:
mounting a cabin to a framework including the side sill; and
connecting wheels to one or more axels mounted to the framework.

* * * * *